United States Patent
Yamazaki

(10) Patent No.: US 9,946,944 B2
(45) Date of Patent: Apr. 17, 2018

(54) IMAGE RECORDING DEVICE, IMAGE DEFECT DETECTION DEVICE, AND IMAGE DEFECT DETECTION METHOD

(71) Applicant: FUJIFILM Corporation, Tokyo (JP)

(72) Inventor: Yoshirou Yamazaki, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/450,652

(22) Filed: Mar. 6, 2017

(65) Prior Publication Data

US 2017/0177962 A1 Jun. 22, 2017

Related U.S. Application Data

(63) Continuation of application No. PCT/JP2015/074470, filed on Aug. 28, 2015.

(30) Foreign Application Priority Data

| Sep. 22, 2014 | (JP) | ................... | 2014-192815 |
| Sep. 22, 2014 | (JP) | ................... | 2014-192816 |
| Sep. 22, 2014 | (JP) | ................... | 2014-192817 |

(51) Int. Cl.
*G06K 9/03* (2006.01)
*H04N 1/00* (2006.01)
(Continued)

(52) U.S. Cl.
CPC .......... *G06K 9/036* (2013.01); *G06K 9/6201* (2013.01); *G06T 7/11* (2017.01); *G06T 7/90* (2017.01);
(Continued)

(58) Field of Classification Search
None
See application file for complete search history.

(56) References Cited

U.S. PATENT DOCUMENTS

| 7,581,798 | B2 | 9/2009 | Arazaki | |
| 2006/0209109 | A1 | 9/2006 | Arazaki | |
| 2014/0268207 | A1* | 9/2014 | Fukase | ................. G06K 15/027 358/1.14 |

FOREIGN PATENT DOCUMENTS

| JP | H 07-092103 A | 4/1995 |
| JP | H1048149 A * | 8/1996 |

(Continued)

OTHER PUBLICATIONS

International Search Report (ISR) (PCT Form PCT/ISA/210), in PCT/JP2015/074470, dated Nov. 24, 2015.
(Continued)

*Primary Examiner* — Sumati Lefkowitz
*Assistant Examiner* — Jiangeng Sun
(74) *Attorney, Agent, or Firm* — McGinn I. P. Law Group, PLLC.

(57) ABSTRACT

An image defect detection device that divides an original print image and a print image printed on the basis of the original print image into corresponding regions, acquires an image feature amount of each divided region, extracts a strength of a difference of each divided region between the original print image and the print image, calculates an image defect detection time indicating a time required to detect a defect of each divided region of the print image from the image feature amount and the strength of the difference of each divided region, calculates an expected image defect value indicating a possibility of presence of a defect in each divided region of the print image from the image feature amount and the strength of the difference of each divided region, determines an order of detection of the image defect of the divided region of the print image.

19 Claims, 40 Drawing Sheets

(51) Int. Cl.
   *G06T 7/11*     (2017.01)
   *G06K 9/62*     (2006.01)
   *G06T 7/90*     (2017.01)
   *H04N 1/56*     (2006.01)

(52) U.S. Cl.
   CPC ......... *H04N 1/00005* (2013.01); *H04N 1/56* (2013.01); *G06K 2009/6213* (2013.01); *G06T 2207/10008* (2013.01); *G06T 2207/30144* (2013.01)

(56) References Cited

FOREIGN PATENT DOCUMENTS

| JP | 2005-205693 A | 8/2005 |
|---|---|---|
| JP | 2005-205796 A | 8/2005 |
| JP | 2006-289947 A | 10/2006 |
| JP | 2007-265088 A | 10/2007 |
| JP | 2008-064486 A | 3/2008 |
| JP | 2008-089379 A | 4/2008 |
| JP | 2008-180586 A | 8/2008 |
| JP | 2009-133741 A | 6/2009 |
| JP | 2011-046019 A | 3/2011 |
| JP | 2011-137736 A | 7/2011 |
| JP | 2011-138263 A | 7/2011 |
| JP | 2013-250190 A | 12/2013 |
| JP | 2014-044712 A | 3/2014 |
| JP | 2014-074710 A | 4/2014 |
| JP | 2014-163789 A | 9/2014 |

OTHER PUBLICATIONS

Written Opinion of the ISA/JPO (PCT/ISA/237) and English translation thereof.
Japanese Office Action in Japanese Application No. 2014-192817 dated Jul. 18, 2017 with an English translation thereof.
Japanese Office Action dated Nov. 1, 2017, in Japanese counterpart Application No. 2014-192817, with an English translation thereof.

* cited by examiner

FIG. 4A

| LEVEL | HUE, CHROMA OF COLOR |
|---|---|
| 1 | LOW CHROMA |
| 2 | MEDIUM-HIGH CHROMA, CYAN |
| 3 | MEDIUM-HIGH CHROMA, MAGENTA |
| 4 | MEDIUM-HIGH CHROMA, YELLOW |
| 5 | MEDIUM-HIGH CHROMA, RED |
| 6 | MEDIUM-HIGH CHROMA, GREEN |
| 7 | MEDIUM-HIGH CHROMA, BLUE |

FIG. 4B

| LEVEL | BRIGHTNESS OF COLOR |
|---|---|
| 1 | 0 TO 20 |
| 2 | 20 TO 40 |
| 3 | 4 TO 60 |
| 4 | 60 OR MORE |

FIG. 4C

| LEVEL | DIRECTION OF FREQUENCY COMPONENT |
|---|---|
| 1 | −22.5 TO 22.5° |
| 2 | 22.5 TO 67.5° |
| 3 | 67.5 TO 112.5° |
| 4 | NONE |

FIG. 4D

| LEVEL | CONTRAST OF FREQUENCY COMPONENT |
|---|---|
| 1 | LOW (LESS THAN 0.10) |
| 2 | MEDIUM (0.10 TO 0.25) |
| 3 | HIGH (0.25 OR MORE) |

FIG. 4E

| LEVEL | FREQUENCY OF FREQUENCY COMPONENT |
|---|---|
| 1 | LOW (LESS THAN 0.25 cycle/mm) |
| 2 | MEDIUM (0.25 TO 1.00 cycle/mm) |
| 3 | HIGH (1.00 cycle/mm OR MORE) |

FIG. 4F

| LEVEL | PROCESSING TIME (CALCULATION COMPLEXITY) |
|---|---|
| A | LONG |
| B | SLIGHTLY LONG |
| C | NORMAL |
| D | SLIGHTLY SHORT |
| E | SHORT |

FIG. 4G

| LEVEL | EXPECTED IMAGE DEFECT VALUE |
|---|---|
| I | HIGH |
| II | SLIGHTLY HIGH |
| III | NORMAL |
| IV | SLIGHTLY LOW |
| V | LOW |

FIG. 5

| | COLOR | | FREQUENCY COMPONENT | | | PROCESSING TIME (CALCULATION COMPLEXITY) | EXPECTED IMAGE DEFECT VALUE |
|---|---|---|---|---|---|---|---|
| | HUE, CHROMA | LOW CHROMA | DIRECTION | CONTRAST | FREQUENCY | | |
| 1 | BRIGHTNESS | 0 TO 20 | -22.5 TO 22.5° | LOW (LESS THAN 0.1) | LOW (LESS THAN 0.25 cycle/mm) | E (SHORT) | II (SLIGHTLY HIGH) |
| 2 | BRIGHTNESS | 0 TO 20 | -22.5 TO 22.5° | LOW (LESS THAN 0.1) | MEDIUM (1 TO 0.25 cycle/mm) | E (SHORT) | II (SLIGHTLY HIGH) |
| 3 | BRIGHTNESS | 0 TO 20 | -22.5 TO 22.5° | LOW (LESS THAN 0.1) | HIGH (1 cycle/mm OR MORE) | E (SHORT) | II (SLIGHTLY HIGH) |
| 4 | BRIGHTNESS | 0 TO 20 | -22.5 TO 22.5° | MEDIUM (0.1 TO 0.25) | LOW (LESS THAN 0.25 cycle/mm) | C (NORMAL) | II (SLIGHTLY HIGH) |
| 5 | BRIGHTNESS | 0 TO 20 | -22.5 TO 22.5° | MEDIUM (0.1 TO 0.25) | MEDIUM (1 TO 0.25 cycle/mm) | C (NORMAL) | III (NORMAL) |
| 6 | BRIGHTNESS | 0 TO 20 | -22.5 TO 22.5° | MEDIUM (0.1 TO 0.25) | HIGH (1 cycle/mm OR MORE) | C (NORMAL) | V (LOW) |
| 7 | BRIGHTNESS | 0 TO 20 | -22.5 TO 22.5° | HIGH (0.25 OR MORE) | LOW (LESS THAN 0.25 cycle/mm) | A (LONG) | III (NORMAL) |
| 8 | BRIGHTNESS | 0 TO 20 | -22.5 TO 22.5° | HIGH (0.25 OR MORE) | MEDIUM (1 TO 0.25 cycle/mm) | A (LONG) | IV (SLIGHTLY LOW) |
| 9 | BRIGHTNESS | 0 TO 20 | -22.5 TO 22.5° | HIGH (0.25 OR MORE) | HIGH (1 cycle/mm OR MORE) | A (LONG) | V (LOW) |
| 10 | BRIGHTNESS | 0 TO 20 | 22.5 TO 67.5° | LOW (LESS THAN 0.1) | LOW (LESS THAN 0.25 cycle/mm) | E (SHORT) | II (SLIGHTLY HIGH) |
| 11 | BRIGHTNESS | 0 TO 20 | 22.5 TO 67.5° | LOW (LESS THAN 0.1) | MEDIUM (1 TO 0.25 cycle/mm) | E (SHORT) | II (SLIGHTLY HIGH) |
| 12 | BRIGHTNESS | 0 TO 20 | 22.5 TO 67.5° | LOW (LESS THAN 0.1) | HIGH (1 cycle/mm OR MORE) | E (SHORT) | II (SLIGHTLY HIGH) |
| | ⋮ | ⋮ | ⋮ | ⋮ | ⋮ | ⋮ | ⋮ |
| | BRIGHTNESS | 0 TO 20 | NONE | LOW (LESS THAN 0.1) | LOW (LESS THAN 0.25 cycle/mm) | E (SHORT) | I (HIGH) |
| | ⋮ | ⋮ | ⋮ | ⋮ | ⋮ | ⋮ | ⋮ |
| | ⋮ | ⋮ | ⋮ | ⋮ | ⋮ | ⋮ | ⋮ |
| | ⋮ | ⋮ | ⋮ | ⋮ | ⋮ | ⋮ | ⋮ |

FIG. 6A

| LEVEL | DIFFERENTIAL IMAGE CONTRAST |
|---|---|
| 1 | A (GREAT) |
| 2 | B (SLIGHTLY GREAT) |
| 3 | C (NORMAL) |
| 4 | D (SLIGHTLY SMALL) |
| 5 | E (SMALL) |

FIG. 6B

| LEVEL | PROCESSING TIME (CALCULATION COMPLEXITY) |
|---|---|
| A | LONG |
| B | SLIGHTLY LONG |
| C | NORMAL |
| D | SLIGHTLY SHORT |
| E | SHORT |

FIG. 6C

| LEVEL | EXPECTED IMAGE DEFECT VALUE |
|---|---|
| I | HIGH |
| II | SLIGHTLY HIGH |
| III | NORMAL |
| IV | SLIGHTLY LOW |
| V | LOW |

FIG. 7A

|   | DIFFERENTIAL IMAGE CONTRAST | PROCESSING TIME | EXPECTED IMAGE DEFECT VALUE |
|---|---|---|---|
| 1 | A (GREAT) | D (SLIGHTLY SHORT) | I (HIGH) |
| 2 | B (SLIGHTLY GREAT) | C (NORMAL) | I (HIGH) |
| 3 | C (NORMAL) | B (SLIGHTLY LONG) | II (SLIGHTLY HIGH) |
| 4 | D (SLIGHTLY SMALL) | A (LONG) | III (NORMAL) |
| 5 | E (SMALL) | B (SLIGHTLY LONG) | IV (SLIGHTLY LOW) |

FIG. 7B

|   | DIFFERENTIAL IMAGE CONTRAST | PROCESSING TIME | EXPECTED IMAGE DEFECT VALUE |
|---|---|---|---|
| 1 | A (GREAT) | B (SLIGHTLY LONG) | II (SLIGHTLY HIGH) |
| 2 | B (SLIGHTLY GREAT) | A (LONG) | III (NORMAL) |
| 3 | C (NORMAL) | B (SLIGHTLY LONG) | IV (SLIGHTLY LOW) |
| 4 | D (SLIGHTLY SMALL) | C (NORMAL) | V (LOW) |
| 5 | E (SMALL) | D (SLIGHTLY SHORT) | V (LOW) |

FIG. 7C

|   | DIFFERENTIAL IMAGE CONTRAST | PROCESSING TIME | EXPECTED IMAGE DEFECT VALUE |
|---|---|---|---|
| 1 | A (GREAT) | C (NORMAL) | I (HIGH) |
| 2 | B (SLIGHTLY GREAT) | B (SLIGHTLY LONG) | II (SLIGHTLY HIGH) |
| 3 | C (NORMAL) | A (LONG) | III (NORMAL) |
| 4 | D (SLIGHTLY SMALL) | B (SLIGHTLY LONG) | IV (SLIGHTLY LOW) |
| 5 | E (SMALL) | C (NORMAL) | V (LOW) |

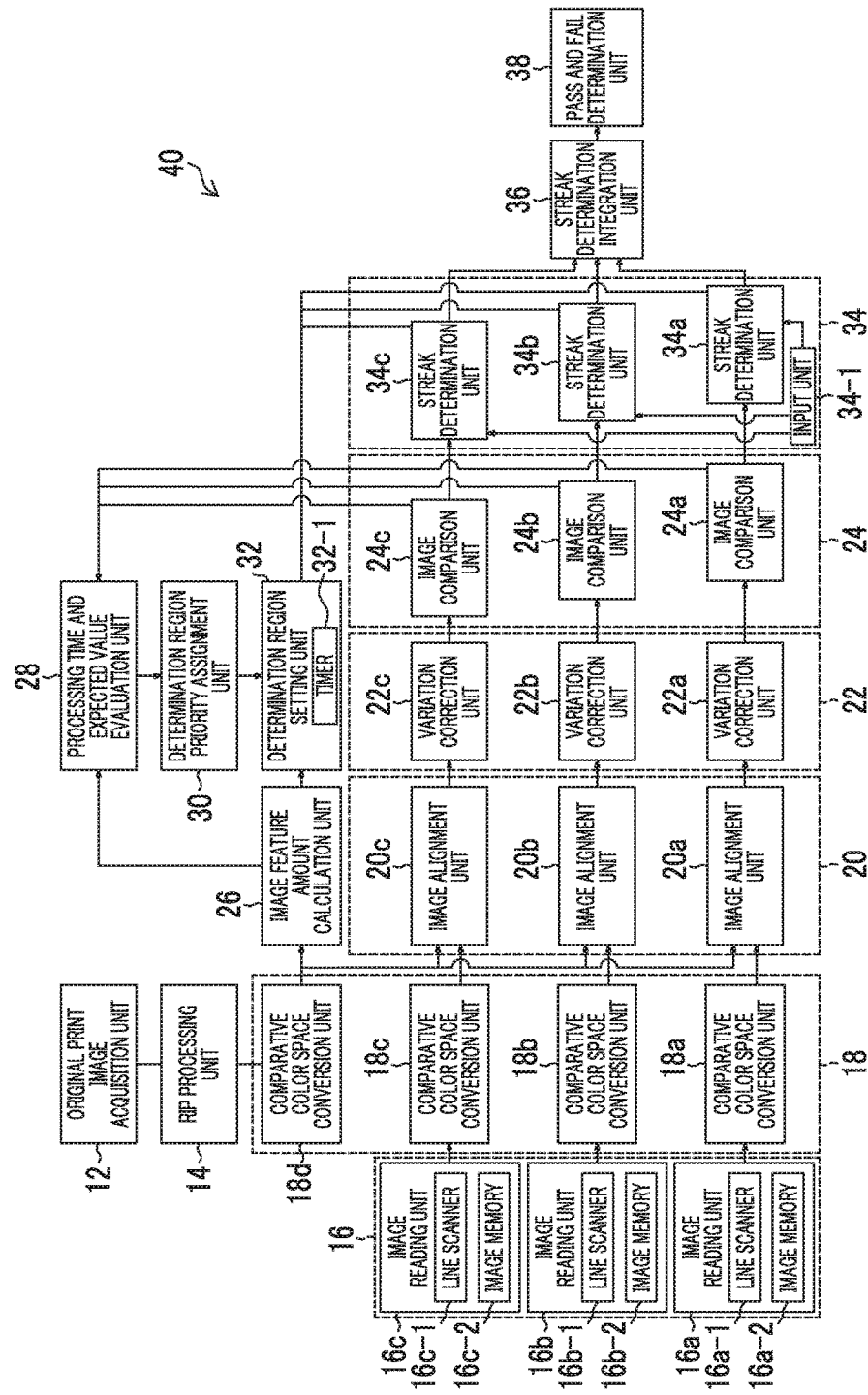

FIG. 21A

| IMAGE FEATURE AMOUNT |
|---|
| ENTIRE IMAGE |
| USED COLOR RANGE |
| RATIO OF CHARACTER/IMAGE REGION |
| NUMBER AND SIZE OF FACES |
| AREA PERCENTAGE OF SUBSTANTIALLY UNIFORM REGION |
| IDENTITY WITHIN IMAGE |

FIG. 21B

| PRINTING USE ||
|---|---|
| LARGE CLASSIFICATION | MEDIUM CLASSIFICATION |
| CATALOG | HI |
| FLYER | MID |
| PHOTO ALBUM | LOW |

FIG. 21C

| PRINTING CONDITIONS |
|---|
| PAPER |
| COATED PAPER/THICK |
| COATED PAPER/NORMAL |
| COATED PAPER/THIN |
| MATTE PAPER/THICK |
| MATTE PAPER/NORMAL |
| MATTE PAPER/THIN |
| SEMI-COATED PAPER/THICK |
| SEMI-COATED PAPER/NORMAL |
| SEMI-COATED PAPER/THIN |

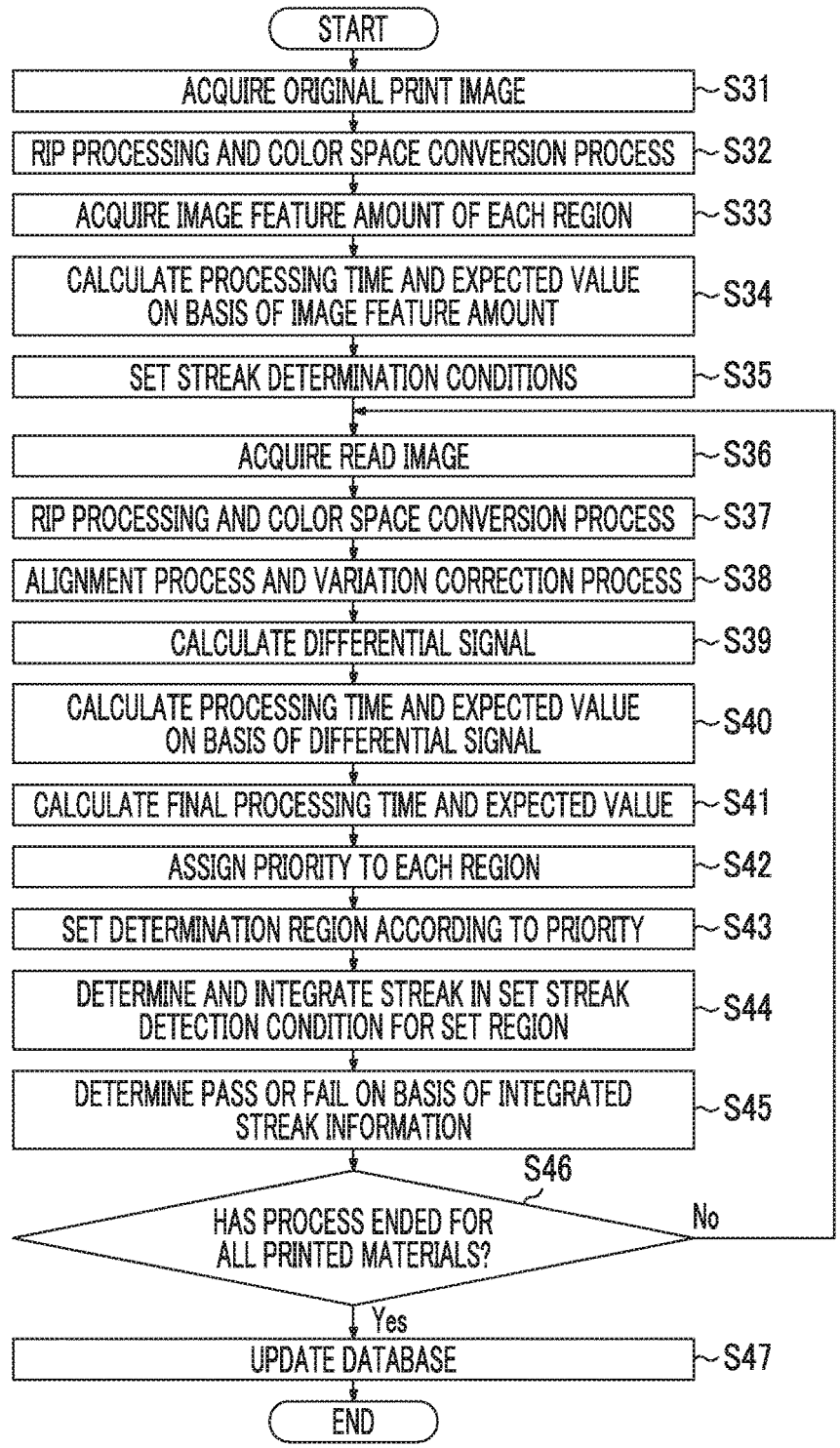

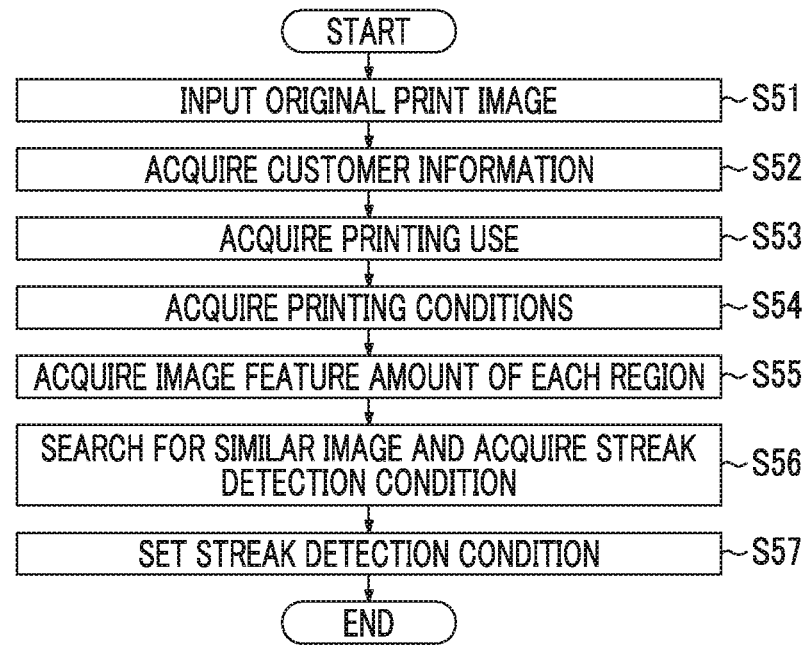
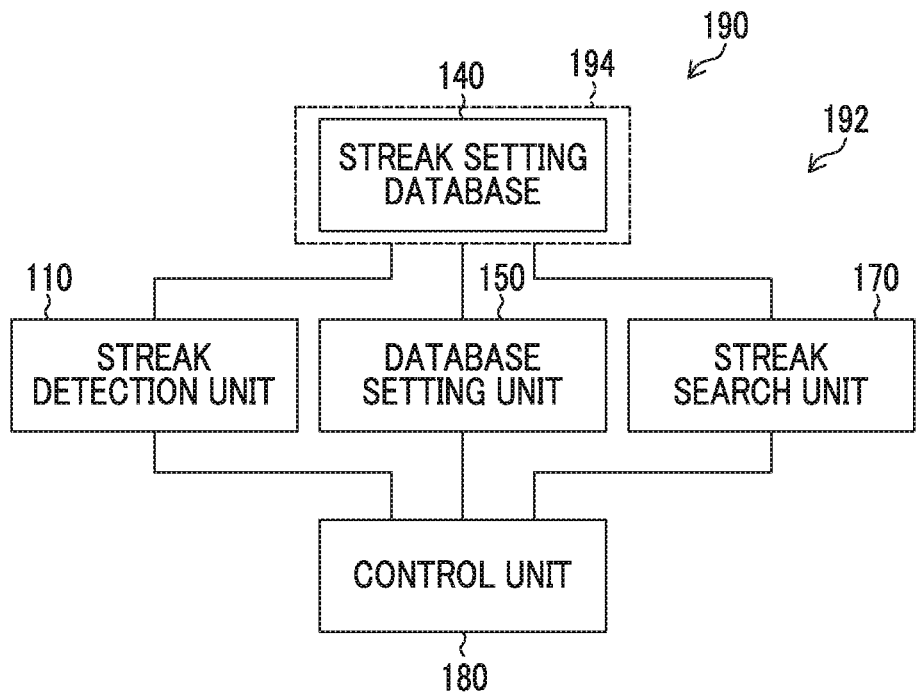

FIG. 32A

| IMAGE FEATURE AMOUNT |
|---|
| ENTIRE IMAGE |
| USED COLOR RANGE |
| RATIO OF CHARACTER AND IMAGE REGION |
| NUMBER AND SIZE OF FACES |
| AREA PERCENTAGE OF SUBSTANTIALLY UNIFORM REGION |
| IDENTITY WITHIN IMAGE |

FIG. 32B

| PRINTING USE | |
|---|---|
| LARGE CLASSIFICATION | MEDIUM CLASSIFICATION |
| CATALOG | HI |
| FLYER | MID |
| PHOTO ALBUM | LOW |

FIG. 32C

| PRINTING CONDITIONS |
|---|
| PAPER |
| COATED PAPER/THICK |
| COATED PAPER/NORMAL |
| COATED PAPER/THIN |
| MATTE PAPER/THICK |
| MATTE PAPER/NORMAL |
| MATTE PAPER/THIN |
| SEMI-COATED PAPER/THICK |
| SEMI-COATED PAPER/NORMAL |
| SEMI-COATED PAPER/THIN |

FIG. 32D

| LEVEL | STREAK QUALITY REQUIREMENT |
|---|---|
| I | HIGH |
| II | SLIGHTLY HIGH |
| III | NORMAL |
| IV | SLIGHTLY LOW |
| V | LOW |

IMAGE RECORDING DEVICE, IMAGE DEFECT DETECTION DEVICE, AND IMAGE DEFECT DETECTION METHOD

CROSS-REFERENCE TO RELATED APPLICATIONS

This application is a Continuation of PCT International Application No. PCT/JP2015/074470 filed on Aug. 28, 2015, which claims priority under 35 U.S.C. § 119(a) to Japanese Patent Applications No. 2014-192815 filed on Sep. 22, 2014, No. 2014-192816 filed on Sep. 22, 2014, and No. 2014-192817 filed on Sep. 22, 2014. Each of the above applications is hereby expressly incorporated by reference, in their entirety, into the present application.

BACKGROUND OF THE INVENTION

1. Field of the Invention

The present invention relates to an image recording device, an image defect detection device, and an image defect detection method, and particularly, to an image processing technology for performing a high-accuracy image defect detection process within a certain time.

2. Description of the Related Art

Since it is necessary for a process of detecting an image defect such as a streak of a printed material to be caused to end within a predetermined time for a printed material which is printed at regular time intervals, and for a detection process for the next printed material to be prepared, it is necessary to end the process in a short time. Further, it is conceivable to use a calculation device having a high-speed processing capability in order to end a detection process in a short time, but there is a problem in that a device cost increases.

For such a first problem, JP2011-137736A describes a technology for setting a determination region in a square shape of 3×3 pixels for first image data that is original print data and second image data obtained by reading a printed material printed on the basis of the first image data, performing a first comparison determination of a pixel value for each pixel, and performing a second comparison determination using pixels not used in the first comparison determination for a determination region in which the number of pixels determined to be defective print pixels is within a certain range with respect to the determination region. According to the technology described in JP2011-137736A, it is possible to speed up a test process for a printed material.

Further, a process of detecting an image defect for a determination of pass and fail of a printed material is performed according to a detection condition set in advance. Therefore, the number of sheets insufficient due to failure is empirically determined in advance, the number of sheets required for output is increased, and print is performed. However, if detection conditions are too severe, the number of fail sheets increases and the number of pass sheets is insufficient. Accordingly, it is necessary for the number of sheets to be added to further increase for the number of sheets required for output. On the other hand, if the detection condition is too loose, there is a problem in that surplus print is caused and productivity is degraded.

For such a second problem, JP2009-133741A describes a technology for setting a high level of a criterion of good and bad in all regions and a slightly defective portion can be detected for all the regions in a case where high-accuracy printing is required, and increasing a level of the criterion of good and bad of a surface on which a product name is printed in the case of a packaging box of sweets or the like and decreasing the level of the criterion of good and bad for a region difficult to view from the outside due to gluing in a box body.

SUMMARY OF THE INVENTION

However, in JP2011-137736A, the test of the printed material cannot end within a predetermined time in some cases. Further, in a case where the test of the printed material cannot end within the predetermined time, high-accuracy examination content is not obtained in some cases if a determination process ends midway.

Further, the detection conditions are determined on the basis of a printing company or user's experience. Thus, a large number of printing tests are required to find optimal detection conditions, and a determination of the detection conditions requires cost and time. In the technology described in JP2009-133741A, the level of the pass and fail criterion can be set according to required accuracy of printing, but there is a problem in that an optimal detection condition cannot be set for each image to be printed.

The present invention has been made in view of such circumstances, and a first object thereof is to provide an image recording device, an image defect detection device, and a method of performing high-accuracy image defect detection within a predetermined time. Further, a second object thereof is to provide an image defect detection device, an image recording device, and a method capable of setting detection conditions of an optimal image defect according to an original print image or an image feature amount of a printed material and appropriately detecting an image defect.

In order to achieve the first object, an image defect detection device comprises: image acquisition means for acquiring an original print image and a print image printed on the basis of the original print image; region division means for dividing the original print image and the print image into corresponding regions; image feature amount acquisition means for acquiring an image feature amount of each divided region; differential strength extraction means for extracting a strength of a difference of each divided region between the original print image and the print image; expected image defect value calculation means for calculating an expected image defect value indicating a possibility of presence of a defect in each divided region of the print image from the image feature amount and the strength of the difference of each divided region; image defect detection order determination means for determining an order of detection of the image defect of the divided region of the print image from the expected image defect value; and image defect detection means for detecting an image defect of the print image in the determined order.

According to this aspect, since the original print image and the print image are divided into corresponding regions, the image feature amount of each divided region is acquired, the strength of a difference in each divided region is extracted, the expected image defect value indicating a possibility of presence of a defect in each divided region of the print image is calculated from the image feature amount and the strength of the difference of each divided region, the order of detection of the image defect of the divided region of the print image is determined from the expected image defect value, and the image defect of the print image is detected in the determined order, it is possible to perform high-accuracy image defect detection within a predetermined time.

It is preferable that image defect detection time calculation means for calculating an image defect detection time indicating a time required to detect a defect of each divided region of the print image from the image feature amount and the strength of the difference of each divided region is comprised, and the image defect detection order determination means determines an order of detection of an image defect of the divided region of the print image from the image defect detection time and the expected image defect value. Thus, it is possible to perform high-accuracy image defect detection within a predetermined time.

The image defect detection order determination means may determine the order as an order of descending image defect detection efficiency that is a quotient obtained by dividing the expected image defect value by the image defect detection time. Thus, it is possible to appropriately determine the order.

It is preferable for the image defect detection time calculation means to calculate the image defect detection time from the visibility of the image defect of each divided region. Accordingly, it is possible to appropriately calculate an image defect detection time.

It is preferable for the image defect detection order determination means to determine the order as an order of the descending expected image defect value. With this determination, the appropriate order can be determined.

It is preferable for the expected image defect value calculation means to calculate the expected image defect value from visibility of the image defect of each divided region. Accordingly, it is possible to appropriately calculate the expected image defect value.

It is preferable for the region division means to perform division into a region for each the image feature amount. Thus, it is possible to appropriately detect an image defect.

The region division means may perform the division using at least one of chroma or brightness of color as the image feature amount. Further, the region division means may perform the division using at least one of a direction, contrast, or a frequency of a frequency component as the image feature amount. Thus, it is possible to appropriately detect an image defect.

It is preferable for the image acquisition means to acquire a reading result in reading means of the image printed on the basis of the original print image as a print image. Thus, it is possible to appropriately detect an image defect from the printed image.

The image acquisition means may acquire a dividing and reading result in a plurality of reading means of the image printed on the basis of the original print image as a divided print image, the image defect detection order determination unit may determine an order of detection of an image defect of the divided region of the print image for each divided print image, and the image defect detection means may detect an image defect in the determined order for each divided print image. Thus, it is possible to appropriately detect an image defect for an image printed to be larger than the reading means.

It is preferable that a plurality of image defect detection means are included for each of the divided print image and detect an image defect of the corresponding divided print image, and the image defect detection means that has ended the detection of the image defect of the corresponding divided print image among the plurality of image defect detection means performs detection of the image defect of the divided print image of which the detection of the defect does not end. Accordingly, it is possible to detect the image defect in the plurality of image defect detection means for the divided print image for which detection of the defect does not end.

In order to achieve the first object, an aspect of an image recording device comprises: original print image acquisition means for acquiring an original print image; transport means for transporting a plurality of print media at first time intervals; printing means for printing an image on the printing medium transported by the transport means on the basis of the original print image; reading means for reading the printed image to acquire a print image; region division means for dividing the original print image and the print image into corresponding regions; image feature amount acquisition means for acquiring an image feature amount of each divided region; differential strength extraction means for extracting strength of a difference in each divided region between the original print image and the print image; expected image defect value calculation means for calculating an expected image defect value indicating a possibility of presence of a defect in each divided region of the print image from the image feature amount and the strength of the difference of each divided region; image defect detection order determination means for determining an order of detection of the image defect of the divided region of the print image from the expected image defect value; image defect detection means for detecting an image defect of the print image in the determined order, the image defect being detected in a time shorter than the first time interval for one recording medium; determination means for performing a good and bad determination of the print image on the basis of the detected image defect; and output means for outputting a result of the determination of the determination means.

According to this aspect, since the original print image and the print image are divided into corresponding regions, the image feature amount of each divided region is acquired, the strength of a difference in each divided region is extracted, the expected image defect value indicating a possibility of presence of a defect in each divided region of the print image is calculated from the image feature amount and the strength of the difference of each divided region, the order of detection of the image defect of the divided region of the print image is determined from the expected image defect value, and the image defect of the print image is detected in the determined order, it is possible to perform high-accuracy image defect detection within a predetermined time.

In order to achieve the first object, an aspect of an image defect detection method comprises: an image acquisition step of acquiring an original print image and a print image printed on the basis of the original print image; a region division step of dividing the original print image and the print image into corresponding regions; an image feature amount acquisition step of acquiring an image feature amount of each divided region; a differential strength extraction step of extracting a strength of a difference of each divided region between the original print image and the print image; an expected image defect value calculation step of calculating an expected image defect value indicating a possibility of presence of a defect in each divided region of the print image from the image feature amount and the strength of the difference of each divided region; an image defect detection order determination step of determining an order of detection of the image defect of the divided region of the print image from the expected image defect value; and an image defect detection step of detecting an image defect of the print image in the determined order.

According to this aspect, since the original print image and the print image are divided into corresponding regions, the image feature amount of each divided region is acquired, the strength of a difference in each divided region is extracted, the expected image defect value indicating a possibility of presence of a defect in each divided region of the print image is calculated from the image feature amount and the strength of the difference of each divided region, the order of detection of the image defect of the divided region of the print image is determined from the expected image defect value, and the image defect of the print image is detected in the determined order, it is possible to perform high-accuracy image defect detection within a predetermined time.

In order to achieve the first object, an aspect of a program that causes a computer to execute an image defect detection method includes: an image acquisition step of acquiring an original print image and a print image printed on the basis of the original print image; a region division step of dividing the original print image and the print image into corresponding regions; an image feature amount acquisition step of acquiring an image feature amount of each divided region; a differential strength extraction step of extracting a strength of a difference of each divided region between the original print image and the print image; an expected image defect value calculation step of calculating an expected image defect value indicating a possibility of presence of a defect in each divided region of the print image from the image feature amount and the strength of the difference of each divided region; an image defect detection order determination step of determining an order of detection of the image defect of the divided region of the print image from the expected image defect value; and an image defect detection step of detecting an image defect of the print image in the determined order.

According to this aspect, since the original print image and the print image are divided into corresponding regions, the image feature amount of each divided region is acquired, the strength of a difference in each divided region is extracted, the expected image defect value indicating a possibility of presence of a defect in each divided region of the print image is calculated from the image feature amount and the strength of the difference of each divided region, the order of detection of the image defect of the divided region of the print image is determined from the expected image defect value, and the image defect of the print image is detected in the determined order, it is possible to perform high-accuracy image defect detection within a predetermined time.

In order to achieve the second object, an aspect of the image defect detection device comprises: original print image acquisition means for acquiring an original print image; image feature amount analysis means for analyzing the image feature amount of the original print image; a database in which a strength of an image defect, an image feature amount of a position of the image defect, and information on whether or not the image defect is an allowable defect are associated and recorded as an image defect detection condition; search means for searching for the database using the image feature amount of the original print image as a query to acquire the image defect detection conditions with an image feature amount similar to the original print image; and image defect detection means for detecting an image defect from a printed material on which the original print image is printed on the basis of the acquired detection condition.

According to this aspect, since the database in which the strength of the image defect, the image feature amount of a position of the image defect, and the information on whether or not the image defect is an allowable defect are associated and recorded as image defect detection conditions is searched for using the image feature amount of the original print image as a query to acquire the image defect detection conditions with an image feature amount similar to the original print image, and an image defect is detected from a printed material on which the original print image is printed on the basis of the acquired detection condition, it is possible to set an optimal image defect detection condition according to the original print image and to appropriately detect an image defect from a printed material printed on the basis of the original print image.

It is preferable for judgment means for judging whether or not the detected image defect is an allowable defect; and determination means for determining whether the printed material is good or bad on the basis of a result of the judgment of the judgment means to be further comprised. Thus, it is possible to appropriately determine whether the printed material is good or bad.

It is preferable for image defect information acquisition means for acquiring strength of an image defect present in the printed material, and an image feature amount at a position of the image defect; and updating means for recording the acquired strength of the image defect, the image feature amount at the position of the image defect, and the judgment result of the judgment means in the database in association with one another as image defect detection conditions to be further comprised. Thus, it is possible to improve accuracy of the database.

It is preferable that customer information acquisition means for acquiring customer information of the original print image is further comprised, the updating means records the acquired customer information in association with the acquired strength of the image defect, the image feature amount at the position of the image defect, and the determination result of the determination means in the database as image defect detection conditions, and the search means searches for the database using the customer information of the original print image as a query. Thus, it is possible to set the detection conditions according to customers.

It is preferable that printing use acquisition means for acquiring a printing use of the original print image is further comprised, the updating means records the acquired printing use in association with the acquired strength of the image defect, the image feature amount at the position of the image defect, and the determination result of the determination means in the database as image defect detection conditions, and the search means searches for the database using the printing use of the original print image as a query. Accordingly, it is possible to set the detection conditions according to the printing use such as a catalog, a flyer, or a photo album.

It is preferable that printing condition acquisition means for acquiring printing conditions of the original print image is included, the updating means records the acquired printing conditions in association with the acquired strength of the image defect, the image feature amount at the position of the image defect, and the determination result of the determination means in the database as image defect detection conditions, and the search means searches for the database using the print conditions of the original print image as a query. Further, it is preferable for the printing conditions to include at least one of information on a type or information on a thickness of paper. Thus, it is possible to set the detection conditions according to the printing conditions such as the type or thickness of the paper.

It is preferable for the image feature amount to include at least one of a color range, a ratio of a character region and an image region, the number and size of faces of persons, an area percentage of a uniform region, or identity within an image. Thus, it is possible to appropriately set detection conditions according to the original print image.

In order to achieve the second object, an aspect of the image defect detection method comprises: an original print image acquisition step of acquiring an original print image; an image feature amount analysis step of analyzing the image feature amount of the original print image; a search step of searching for a database in which a strength of an image defect, an image feature amount of a position of the image defect, and information on whether or not the image defect is an allowable defect are associated and recorded as image defect detection conditions using the image feature amount of the original print image as a query to acquire the image defect detection conditions with an image feature amount similar to the original print image; and an image defect detection step of detecting an image defect from a printed material printed on the basis of the original print image using the acquired detection condition.

According to this aspect, since the database in which the strength of the image defect, the image feature amount of a position of the image defect, and the information on whether or not the image defect is an allowable defect are associated and recorded as image defect detection conditions is searched for using the image feature amount of the original print image as a query to acquire the image defect detection conditions with an image feature amount similar to the original print image, and an image defect is detected from a printed material on which the original print image is printed on the basis of the acquired detection condition, it is possible to set an optimal image defect detection condition according to the original print image and to appropriately detect an image defect from a printed material printed on the basis of the original print image.

In order to achieve the second object, an aspect of a program that causes a computer to execute an image defect detection method, comprises: an original print image acquisition step of acquiring an original print image; an image feature amount analysis step of analyzing the image feature amount of the original print image; a search step of searching for a database in which a strength of an image defect, an image feature amount of a position of the image defect, and information on whether or not the image defect is an allowable defect are associated and recorded as image defect detection conditions using the image feature amount of the original print image as a query to acquire the image defect detection conditions with an image feature amount similar to the original print image; and an image defect detection step of detecting an image defect from a printed material printed on the basis of the original print image using the acquired detection condition.

A program that causes a computer to execute the image defect detection method, and a computer-readable non-transitory medium having the program recorded thereon are included in this aspect. Thus, it is possible to set an optimal image defect detection condition according to the original print image and to appropriately detect an image defect from a printed material printed on the basis of the original print image.

In order to achieve the second object, an aspect of the image defect detection device comprises: image defect addition setting means for setting a position of an image defect that is intentionally added to an original print image; image feature amount acquisition means for acquiring an image feature amount of a position of the original print image at which the image defect is added; defect-added image generation means for generating a defect-added image by adding the image defect at the position of the original print image set by the image defect addition setting means; determination result acquisition means for acquiring a result of a determination as to whether the added image defect of the printed material on which the defect-added image is printed by a print head is an image defect allowable in a printed material; and detection condition setting means for setting an image defect detection condition from the image feature amount of the position at which the image defect is added and the determination result.

According to this aspect, since the defect-added image obtained by adding the image defect to the original print image is generated, the result of the determination as to whether the added image defect of the printed material on which the defect-added image is printed by the print head is an image defect allowable in the printed material is acquired, and the image defect detection condition is set from the image feature amount of the position at which the image defect is added and the determination result, it is possible to set an optimal image defect detection condition according to the original print image.

It is preferable that the image defect addition setting means sets strength of the image defect to be added, and the detection condition setting means sets an image defect detection condition from the strength of the added image defect. Thus, it is possible to set the detection conditions according to the strength of the image defect.

It is preferable for the image defect detection means for detecting an image defect from the printed material on which the original print image is printed by the print head on the basis of the set detection conditions to be included. Thus, it is possible to appropriately detect the image defect from the printed material of the original print image.

It is preferable for determination means for performing a good and bad determination of the printed material on the basis of a result of detection of the image defect detection means to be included. Thus, it is possible to appropriately determine whether the printed material is good or bad.

It is preferable that the print head is an ink jet head including a plurality of nozzles that jets ink, the image defect detection device comprises recording element information acquisition means for acquiring information on the plurality of nozzles constituting the ink jet head, and the image defect addition setting means sets a position of the nozzle having a history of occurrence of abnormal jetting in the past among the plurality of nozzles to the position of the image defect of the added image defect. Thus, it is possible to add the image defect at a position at which the image defect is highly likely to occur and to appropriately set the detection conditions.

It is preferable that the print head includes a plurality of connected modules, the defect-added image is printed in a single pass scheme by the print head, the image defect detection device comprises module information acquisition means for acquiring information on the plurality of modules constituting the print head, and the image defect addition setting means sets a connection position of the plurality of modules to the position of the added image defect. Thus, it is possible to add the image defect at a position at which the image defect is highly likely to occur and to appropriately set the detection conditions.

It is preferable that required quality level acquisition means for acquiring a quality level indicating a degree of quality required for the printed material; and analysis means for analyzing a visibility level indicating a degree of visibility of an image defect at each position of the original print image are comprised, and the image defect addition setting means sets a position of the first visibility level in the original print image as a position of the added image defect in a case where the required quality level is a first quality level, and sets a position of a second visibility level relatively higher than the first visibility level in the original print image as the position of the added image defect in a case where the required quality level is a second quality level relatively lower than the first quality level. Accordingly, since the image defect can be added at a position at which the visibility level is higher when the required quality level is relatively low, it is possible to set the detection conditions according to the required quality level.

It is preferable for the image defect addition setting means to set a position and a length of a streak intentionally added to the original print image. Thus, it is possible to set the detection conditions according to the position and the length of the streak.

In order to achieve the second object, an aspect of an image defect detection device comprises: determination result acquisition means for acquiring a result of a determination as to whether an added image defect of a printed material on which a chart image to which an image defect is added at a predetermined position and strength is printed is an image defect allowable in a printed material; image feature amount acquisition means for acquiring an image feature amount of a position of the chart image in which the image defect is added; and detection condition setting means for setting an image defect detection condition from the strength of the added image defect, the image feature amount of the position at which the image defect is added, and the determination result.

According to this aspect, since the result of the determination as to whether the added image defect of the printed material on which the chart image to which the image defect is added at the predetermined position and strength is printed is the image defect allowable in the printed material is acquired, and the image defect detection condition is set from the strength of the added image defect, the image feature amount of the position at which the image defect is added, and the determination result, it is possible to set optimal image defect detection condition according to the image feature amount.

In order to achieve the second object, an aspect of an image recording device comprises: image defect addition setting means for setting a position of an image defect that is intentionally added to an original print image; image feature amount acquisition means for acquiring an image feature amount of a position of the original print image at which the image defect is added; defect-added image generation means for generating a defect-added image by adding the image defect at the position of the original print image set by the image defect addition setting means; printing means for printing the defect-added image on a printing medium using a print head and outputting the printing medium as a printed material; determination result acquisition means for acquiring a result of a determination as to whether the added image defect of the printed material on which the defect-added image is printed is an image defect allowable in a printed material; and detection condition setting means for setting an image defect detection condition from the image feature amount of the position at which the image defect is added and the determination result, in which the printing means prints the original print image on a printing medium using a print head and outputs the printing medium as a printed material, and the image recording device further comprises image defect detection means for detecting an image defect from a printed material on which the original print image is printed on the basis of the set detection condition, and determination means for determining whether the printed material on which the original print image is printed is good or bad on the basis of a result of detection of the image defect detection means.

In order to achieve the second object, an aspect of an image recording device comprises: printing means for printing a chart image to which an image defect is added at a predetermined position and strength on a printing medium using a print head, and outputting the printing medium as a printed material; determination result acquiring means for acquiring a result of a determination as to whether the added image defect of the printed material on which the chart image is printed is an image defect allowable in the printed material; image feature amount acquisition means for acquiring an image feature amount of the position at which the image defect of the chart image is added; and detection condition setting means for setting image defect detection conditions from strength of the added image defect, the image feature amount of the position at which the image defect is added, and the determination result, in which the printing means prints the original print image on a printing medium using a print head and outputs the printing medium as a printed material, and the image recording device further comprises image defect detection means for detecting an image defect from a printed material on which the original print image is printed on the basis of the set detection condition, and determination means for determining whether the printed material on which the original print image is printed is good or bad on the basis of a result of detection of the image defect detection means.

According to this aspect, since the chart image to which an image defect is added at a predetermined position and strength is printed and output as a printed material, the result of a determination as to whether the added image defect of the printed material is an image defect allowable in the printed material is acquired, and the image defect detection conditions is set from the strength of the added image defect, the image feature amount of the position at which the image defect is added, and the determination result, it is possible to set an optimal image defect detection condition according to the image feature amount.

In order to achieve the second object, an aspect of an image defect detection method comprises: an image defect addition setting step of setting a position of an image defect that is intentionally added to an original print image; an image feature amount acquisition step of acquiring an image feature amount of a position of the original print image at which the image defect is added; a defect-added image generation step of generating a defect-added image by adding the image defect at the position of the original print image set in the image defect addition setting step; a determination result acquisition step of acquiring a result of a determination as to whether the added image defect of the printed material on which the defect-added image is printed by a print head is an image defect allowable in a printed material; and a detection condition setting step of setting an image defect detection condition from the image feature amount of the position at which the image defect is added and the determination result.

According to this aspect, since the defect-added image obtained by adding the image defect to the original print image is generated, the result of the determination as to whether the added image defect of the printed material on which the defect-added image is printed by the print head is an image defect allowable in the printed material is acquired, and the image defect detection condition is set from the image feature amount of the position at which the image defect is added and the determination result, it is possible to set an optimal image defect detection condition according to the original print image.

In order to achieve the second object, an aspect of an image defect detection method comprises: a determination result acquisition step of acquiring a result of a determination as to whether an added image defect of a printed material on which a chart image to which an image defect is added at a predetermined position and strength is printed is an image defect allowable in a printed material; an image feature amount acquisition step of acquiring an image feature amount of a position of the chart image in which the image defect is added; and a detection condition setting step of setting an image defect detection condition from the strength of the added image defect, the image feature amount of the position at which the image defect is added, and the determination result.

According to this aspect, since the result of the determination as to whether the added image defect of the printed material on which the chart image to which the image defect is added at the predetermined position and strength is printed is the image defect allowable in the printed material is acquired, and the image defect detection condition is set from the strength of the added image defect, the image feature amount of the position at which the image defect is added, and the determination result, it is possible to set an optimal image defect detection condition according to the image feature amount.

A program that causes a computer to execute the image defect detection method, and a computer-readable non-transitory medium having the program recorded thereon are included in this aspect. Thus, it is possible to set an optimal image defect detection condition.

According to the present invention, it is possible to perform high-accuracy image defect detection within a predetermined time.

According to the present invention, it is possible to set an optimal image defect detection condition according to the original print image. Further, it is possible to set an optimal image defect detection condition corresponding to the image feature amount. Thus, it is possible to appropriately detect an image defect from a printed material printed on the basis of the original print image.

BRIEF DESCRIPTION OF THE DRAWINGS

FIGS. 4A to 4G are diagrams illustrating classification of an image feature amount acquired by an image feature amount calculation unit and classification of a processing time and an expected image defect value calculated by a processing time and expected value evaluation unit.

FIG. 5 is a diagram illustrating a table in which an image feature amount, a processing time, and an expected image defect value are associated.

FIGS. 6A to 6C are diagrams illustrating classification of differential image contrast acquired by an image comparison unit, and classification of a processing time and an expected image defect value calculated by a processing time and expected value evaluation unit.

FIGS. 7A to 7C are diagrams illustrating a table in which a differential image contrast, a processing time, and an expected image defect value are associated.

FIG. 9 is a block diagram illustrating a schematic configuration of an image defect detection device.

FIGS. 21A to 21C are diagrams illustrating classification of printing use, printing conditions, and an image feature amount of a printed material.

FIG. 22 is a flowchart illustrating a method of detecting a streak of a printed material.

FIG. 23 is a flowchart illustrating a method of setting streak determination conditions.

FIG. 24 is a block diagram illustrating a schematic configuration of the streak detection system.

FIGS. 32A to 32D are diagrams illustrating classification of printing use, printing conditions, and an image feature amount and classification of streak quality requirements.

DESCRIPTION OF THE PREFERRED EMBODIMENTS

Hereinafter, preferred embodiments of the present invention will be described in detail with reference to the accompanying drawings.

First Embodiment

A streak detection device 10 according to a first embodiment (an example of an image defect detection device) divides a print image into a plurality of regions, and determines a priority for detecting a streak which is an image defect for a plurality of divided regions, and detects a streak of each region of the print image in the determined priority. This priority is determined on the basis of an expected image defect value indicating a possibility of presence of at least a streak.

[Entire Configuration of the Streak Detection Device]

Figure 1:
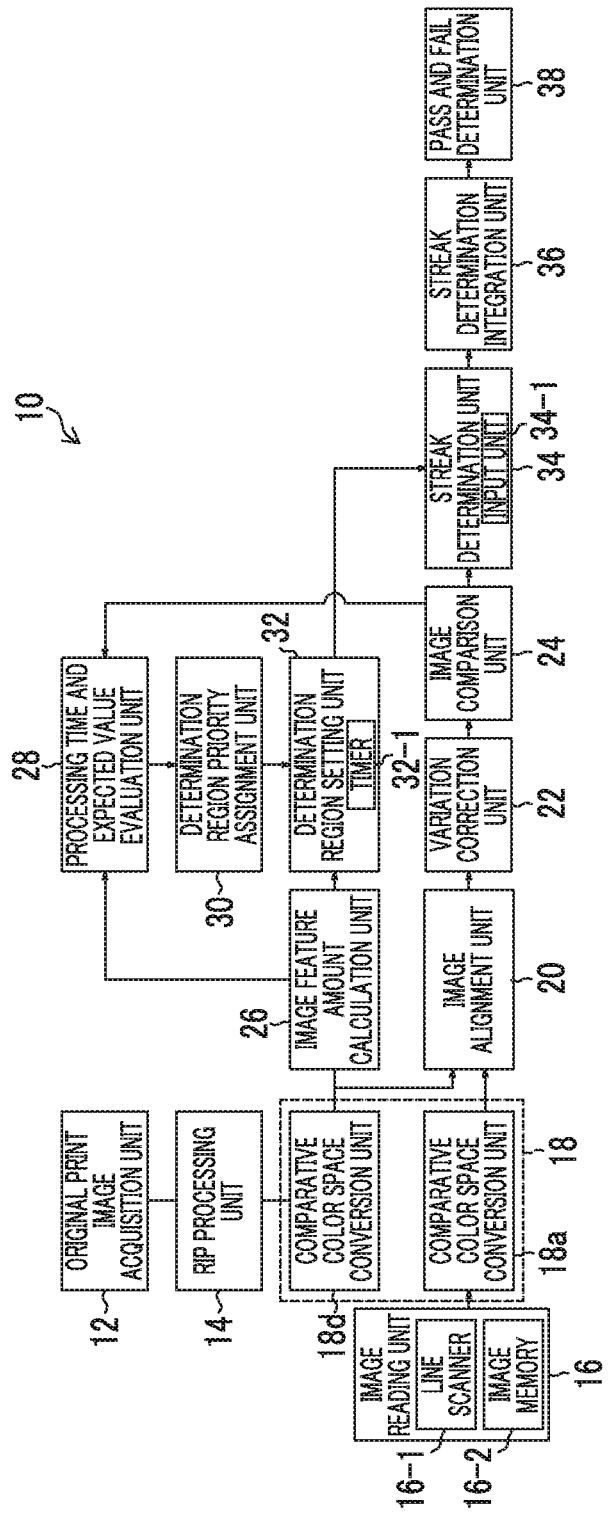
FIG. 1 is a block diagram illustrating a schematic configuration of a streak detection device.

As illustrated in FIG. 1, the streak detection device 10 includes an original print image acquisition unit 12, a raster image processor (RIP) processing unit 14, an image reading unit 16, a comparative color space conversion unit 18, an image alignment unit 20, a variation correction unit 22, an image comparison unit 24, an image feature amount calculation unit 26, a processing time and expected value evaluation unit 28, a determination region priority assignment unit 30, a determination region setting unit 32 a streak determination unit 34, a streak determination integration unit 36, and a pass and fail determination unit 38.

Figures 2A, 2B, 2C:
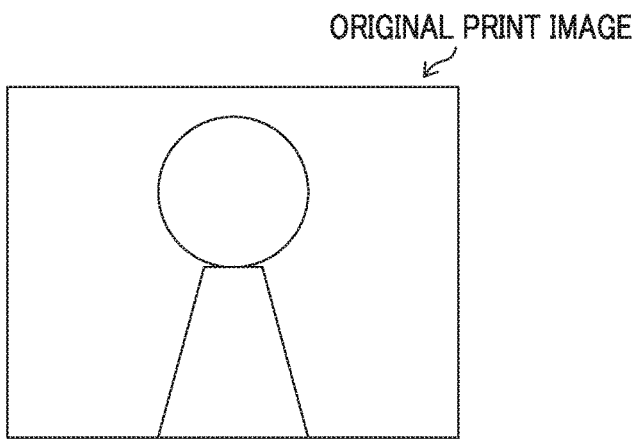
FIGS. 2A to 2C are diagrams illustrating an example of an original print image and an example in which the original print image is divided into respective regions.

The original print image acquisition unit 12 (an example of image acquisition means and an example of original print image acquisition means) acquires an original print image of a printing job that is a target of a streak defect detection process. Here, the printing job refers to a processing unit of one chunk to be printed on the basis of the original print image. Further, the original print image is original data of an image printed on a printed material. FIG. 2A illustrates an example of the original print image.

The RIP processing unit 14 performs an RIP processing on the acquired original print image. The RIP processing is a conversion process of converting an original print image described using a page description language (PDL) or the like into image data in a raster format. For the RIP processing, a known method may be.

The image reading unit 16 (an example of image acquisition means) includes a line scanner 16-1 and an image memory 16-2, and reads a plurality of printed materials printed on the basis of the original print image using the line scanner 16-1, acquires each read image (an example of the print image) that is a reading result, and stores the read image in the image memory 16-2. The image reading unit 16 may be input means for acquiring image data read by a line scanner outside the device, as a read image.

The comparative color space conversion unit 18 converts both of the read image read by the image reading unit 16 and the original print image subjected to the RIP processing in the RIP processing unit 14 into the same color space in order to compare the read image read by the image reading unit 16 with the original print image subjected to the RIP processing in the RIP processing unit 14. For the color space conversion process, a known scheme can be used.

The image alignment unit 20 performs an alignment process on the read image subjected to the color conversion in the comparative color space conversion unit 18 and the original print image using a correspondence relationship determined in the printing conditions as an initial value. For the alignment process, a known technology such as template matching or a phase only method can be used.

The variation correction unit 22 removes a variation of the pixel signal at a low frequency caused by reading of the line scanner 16-1 from the read image subjected to the alignment process in the image alignment unit 20.

The image comparison unit 24 (an example of region division means and an example of differential strength extraction means) divides the reading image and the original print image into regions of interest (ROIs) which are minimum analysis units (an example of division into corresponding regions), and compares the read image with the original print image for each ROI to calculate a difference in the image signal between corresponding pixels, and outputs an intensity of the differential signal (an example of an strength of the difference; differential image contrast) and the corresponding position information. Areas of the respective ROIs are equal, and n ROIs are set. FIG. 2B is a diagram illustrating an example of ROIs set in the original print image. In this example, a total of 54 ROIs of 9 columns in a vertical direction×6 rows in a horizontal direction are set.

The image feature amount calculation unit 26 (an example of region division means and an example of image feature amount acquisition means) divides the original print image subjected to color space conversion into the same ROIs as in the image comparison unit 24, and calculates frequency characteristics of each ROI and an image feature amount such as color. FIG. 2C is a diagram illustrating an example of the image feature amount of each ROI of the original print image, and ROI indicated by the same hatching indicates an ROI having a close image feature amount.

The processing time and expected value evaluation unit 28 (an example of image defect detection time calculation means) calculates an estimate of the image defect detection time (processing time) indicating a time required to detect a streak of each ROI of the read image on the basis of the differential signal and the position information thereof input from the image comparison unit 24, and the image feature amount input from the image feature amount calculation unit 26.

Further, the processing time and expected value evaluation unit 28 (an example of expected image defect value calculation means) calculate an expected image defect value indicating a possibility of presence of the streak of each ROI of the read image on the basis of the differential signal and the position information thereof input from the image comparison unit 24, and the image feature amount input from the image feature amount calculation unit 26.

The determination region priority assignment unit 30 (an example of image defect detection order determination means) determines a priority of a streak determination process to be described below for each ROI.

The determination region setting unit 32 sequentially sets the ROI on which the streak determination process is to be performed on the basis of the priority determined in the determination region priority assignment unit 30, and outputs a result of the setting to the streak determination unit 34. The determination region setting unit 32 includes a timer 32-1, and measures a time from the start of the streak determination process for one printed material using the timer 32-1. In a case where a predetermined time has elapsed from the start of the streak determination process, the determination region setting unit 32 ends the streak determination process in the streak determination unit 34 to be described below.

The streak determination unit 34 performs a streak determination process on the ROI output in the determination region setting unit 32 for the read image. The streak determination process is a process of detecting an image defect candidate present in the read image on the basis of the differential signal of the read image, comparing the detected image defect candidate with the feature amount of the streak, and determining an image defect candidate similar to the feature amount of the streak to be a streak. Here, the streak is a linear image defect caused due to landing of dots deviating from an ideal position, and includes a black streak of which concentration is higher than the surroundings, and a white streak of which concentration is lower than the surroundings.

Further, the streak determination unit 34 includes an input unit 34-1, and a user can input a streak determination criterion from the input unit 34-1. The streak determination criterion can be set, for example, in three steps including "severe", "normal", and "sweet". The streak determination criterion is set to "severe" when a fine streak is required to be determined, and the streak determination criterion is set to "sweet" in a case where the fine streak is not required to be determined.

The streak determination integration unit 36 integrates the positions of the streak in the image determined by the streak determination unit 34, and determines a streak evaluation and a streak position of the read printed material. The pass and fail determination unit 38 performs a pass and fail determination as to whether a print material of the read image is suitable as a printed material to be output on the basis of the streak evaluation and the streak position integrated in the streak determination integration unit 36.

[Streak Detection Method]

Figure 3:
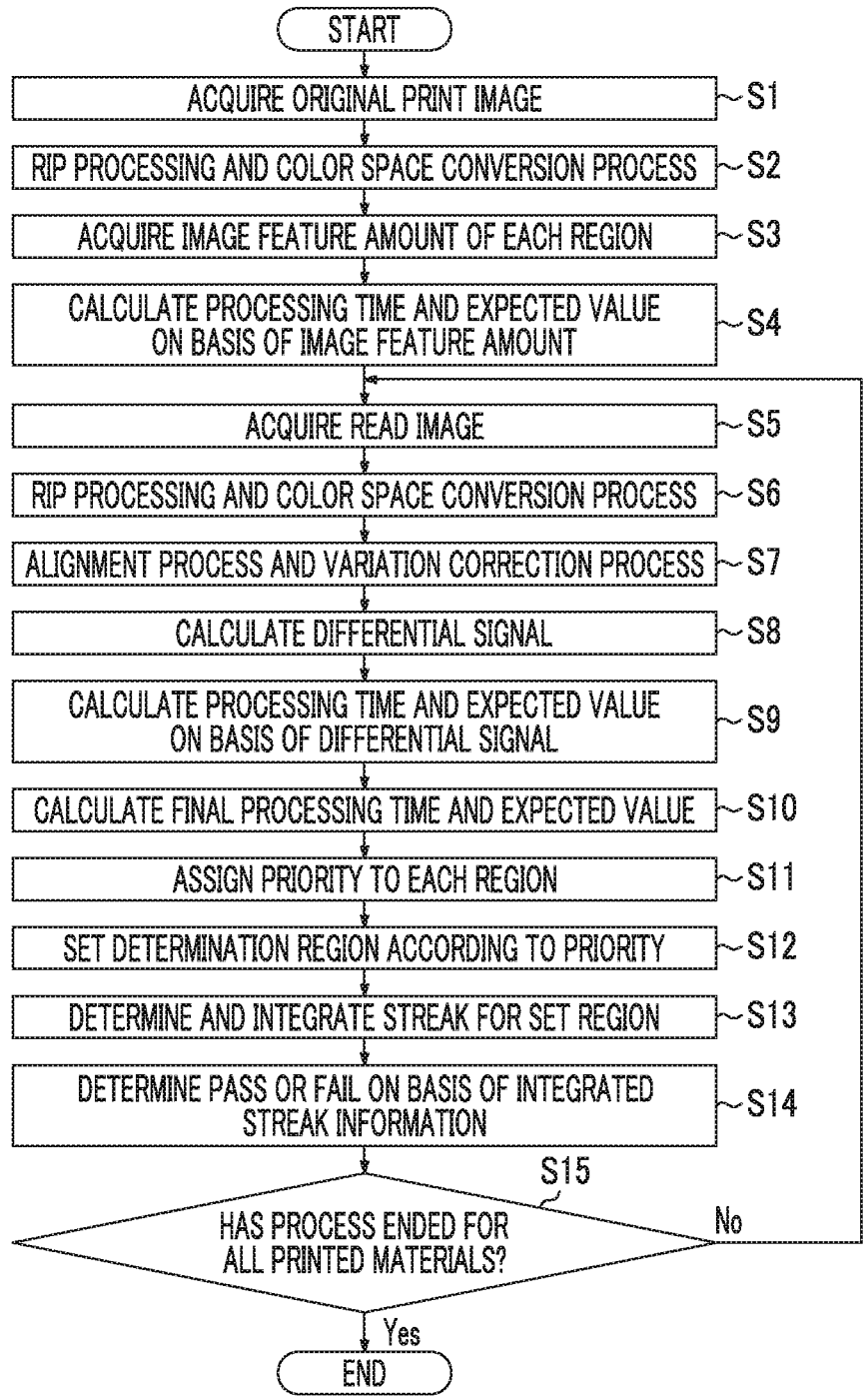
FIG. 3 is a flowchart illustrating a method of detecting a streak of a printed material.

Next, a method of detecting a streak of a printed material using the streak detection device 10 (an example of an image defect detection method) will be described with reference to FIG. 3.

First, the original print image acquisition unit 12 acquires an original print image (step S1; an example of an image acquisition step). Subsequently, the RIP processing unit 14 performs an RIP processing on the acquired original print image. The comparative color space conversion unit 18d converts the original print image after the RIP processing into a color space (for example, L*a*b*space) for image comparison with the read image (step S2).

Then, the image feature amount calculation unit 26 divides the original print image subjected to the color space conversion into ROIs that are minimum analysis units, and acquires the image feature amount of each ROI (step S3; an example of a region division step, and an example of an image feature amount acquisition step). The image feature amount calculation unit 26 acquires hue, chroma, and brightness for color and a direction, contrast, and a frequency for a frequency component as the image feature amount of each ROI.

The image feature amount calculation unit 26 classifies hue and chroma of color into seven levels including "low chroma", "medium-high chroma, cyan", "medium-high chroma, magenta", "medium-high chroma, yellow", "medium-high chroma, red", "medium-high chroma, green", and "medium-high chroma, blue" according to a viewing rate of the image defect, as illustrated in FIG. 4A. Further, the image feature amount calculation unit 26 classifies the brightness of the color into four levels including "0 to 20", "20 to 40", "40 to 60", and "60 or more" according to a viewing rate of the image defect, as illustrated in FIG. 4B.

Further, the image feature amount calculation unit 26 classifies the direction of the frequency component into four levels including "−22.5 to 22.5°", "22.5 to 67.5°", "67.5 to 112.5°", and "none" according to a viewing rate of the image defect, as illustrated in FIG. 4C. A direction of the frequency component indicates a degree in a case where a streak direction based on characteristics of a printer printing a printing job is 0°. For example, in a case where a streak occurs in a longitudinal direction of the printed material from characteristics of a printer for a rectangular printed material, the direction indicates an angle in a case where the longitudinal direction of the printed material is 0° and a lateral direction is 90°. Further, even in a case where the direction of the frequency component is rotated by 180°, the classification is similarly performed.

Further, the image feature amount calculation unit 26 classifies the contrast into three levels including "low" (less than 0.1 when expressed as a value from a minimum value 0 to a maximum value 1), "medium" (0.1 to 0.25), and "high" (0.25 or more) according to the viewing rate of the streak, as illustrated in FIG. 4D. Further, the image feature amount calculation unit 26 classifies the frequency into three levels including "low (less than 0.25 cycle/mm)", "medium (0.25 to 1 cycle/mm)", and "high (1 cycle/mm or more) according to the viewing rate of the streak, as illustrated in FIG. 4E.

Then, the processing time and expected value evaluation unit 28 calculates an image defect detection time (processing time) $T1_i$ indicating a time required to detect a streak of each ROI of the original print image, and an expected image defect value $E1_i$ indicating a possibility of presence of the streak (step S4). i is an identification number i (i=1 to N) for identifying each of n ROIs. The processing time $T1_i$ is calculated on the basis of a streak calculation complexity according to the image feature amount (visibility of image defect) of each ROI. A relationship between the image feature amount and the streak calculation complexity is stored as a table in advance. The expected image defect value $E1_i$ is calculated on the basis of the image feature amount (visibility of image defect) of each ROI.

The processing time and expected value evaluation unit 28 classifies the processing time $T1_i$ into five levels including "A: long", "B: slightly long", "C: normal", "D: slightly short", and "E: short", as illustrated in FIG. 4F. Further, the processing time and expected value evaluation unit 28 classifies the expected image defect value E1i into five levels including "I: high", "II: slightly high", "III: normal", "IV: slightly low", and "V: low", as illustrated in FIG. 4G.

A table in which a combination of all of hue and chroma of color of seven levels, brightness of color of five levels, a direction of a frequency component of four levels, contrast of the frequency component of three levels, and a frequency of the frequency component of three levels that are the image feature amounts of each ROI are associated with the processing time $T1_i$ and the expected image defect value $E1_i$ may be included in the storage unit (not illustrated). In this case, the processing time and expected value evaluation unit 28 can read the processing time $T1_i$ and the expected image defect value $E1_i$ from this table according to the image feature amount of each ROI.

FIG. 5 illustrates an example of this table. For example, if color hue and chroma of color is "low chroma", brightness of the color is "0 to 20", a direction of a frequency component is "None", contrast of the frequency component is "low (less than 0.1)", and a frequency of the frequency component is "low (less than 0.25 cycle/mm)", the processing time $T1_i$ can be classified into "E: short" and the expected image defect value E1i can be classified into "I: high". That is, in a case where the image is close to black solid, it is very easy for the streak to be determined, and visibility of the streak is high.

In the table illustrated in FIG. 5, an image of a combination of the respective levels of the hue and chroma of the color, the brightness of the color, the direction of the frequency component, the contrast of the frequency component, and the frequency of the frequency component is created, and an expected image defect value is determined on the basis of the visibility in a case where a streak (image defect) has occurred in the image. Further, an evaluation experiment is performed using a streak detection test program to measure a calculation time until required detection accuracy arrives and determine the processing time.

On the other hand, the image reading unit 16 reads the printed material that is a streak detection target to acquire the read image (step S5; an example of an image acquisition step). The comparative color space conversion unit 18a converts this read image into a color space (for example, L*a*b*space) for image comparison with the original print image (step S6).

Further, the image alignment unit 20 performs an alignment process on the original print image subjected to the color space conversion in step S2 and the read image subjected to the color space conversion in step S6, and the variation correction unit 22 removes a variation of the pixel signal at a low frequency caused by reading from the read image after the alignment process (step S7).

Then, the image comparison unit 24 divides the original print image and the read image after the alignment into ROIs and calculates an intensity (differential image contrast) of a differential signal between corresponding pixels of each ROI (step S8; an example of a region division step and an example of a differential strength extraction step). Here, the intensity of the differential signal is a square sum of a difference between pixels since the differential signal between pixels includes a positive or negative sign.

The image comparison unit 24 classifies the differential image contrast into five levels including "A: high", "B: slightly high", "C: normal", "D: slightly low", and "E: low" in an order of descending differential image contrast, as illustrated in FIG. 6A.

Then, the processing time and expected value evaluation unit 28 calculates an image defect detection time (processing time) $T2_i$ indicating a time required to detect a streak and an expected image defect value $E2_i$ indicating a possibility of presence of the streak, of each ROI of the read image, on the basis of the intensity (differential image contrast) of the differential signal calculated by the image comparison unit 24 (step S9).

The processing time and expected value evaluation unit 28 classifies the processing time $T2_i$ into five levels including "A: long", "B: slightly long", "C: normal", "D: slightly short", and "E: short" in an order of descending processing time, as illustrated in FIG. 6B. Further, the processing time and expected value evaluation unit 28 classifies the expected image defect value E2i into five levels including "I: high", "II: slightly high", "III: normal", "IV: slightly low", and "V: low" in an order of descending expected values, as illustrated in FIG. 6C.

The processing time and expected value evaluation unit 28 may include, in a storage unit (not illustrated), a table in which the processing time $T2_i$ is associated with the expected image defect value $E2_i$ as illustrated in FIG. 7, for the differential image contrast of five levels of each ROI.

Here, the processing time and expected value evaluation unit 28 adjusts the processing time $T2_i$ or the expected image defect value $E2_i$ to be assigned to each differential image contrast according to a previously input streak determination criterion.

As illustrated in FIG. 7A, in a case where the streak criterion is "severe", that is, in a case where a fine streak is required to be determined, an ROI of which the differential image contrast is at D level (slightly small) is a threshold value of the streak determination. Therefore, since precise calculation is required in a streak determination process for the ROI at level D, level A (long) is assigned to the processing time $T2_i$ in the ROI at level D, and level III (normal) is assigned to the expected image defect value $E2_i$. Further, since precise calculation is required for the ROI of which the differential image contrast is at level E (small), level B (slightly long) is assigned to the processing time $T2_i$. Further, since it is considered that there is a fine streak for the ROI of which the differential image contrast is level A (great) to level C (normal), a great expected image defect value $E2_i$ at level I (high) or level II (slightly high) is assigned.

Further, as illustrated in FIG. 7B, in a case where the streak criterion is "sweet", that is, in a case where a fine streak is not required to be determined, the ROI of which the differential image contrast is at level B (slightly great) is a streak determination threshold value. Therefore, since precise calculation is required in a streak determination process for the ROI at level B, level A (long) is assigned to the processing time $T2_i$, and level III (normal) is assigned to the expected image defect value $E2_i$. Further, since it is considered that streaks do not so much exist in the ROI of which the differential image contrast is level C (normal) to level E (small), a small expected image defect value at level IV (slightly low) or level V (low) is assigned.

Further, as illustrated in FIG. 7C, in a case where the streak criterion is "normal", the ROI of which the differential image contrast is at level C (normal) is a streak determination threshold value. Therefore, since precise calculation is required for processing time for the ROI at level C, level A (long) is assigned, and level III (normal) is assigned to the expected image defect value. Further, great expected image defect values at level I (high) and level II (slightly great) are assigned to ROIs of which the differential image contrast is at level A (large) and level B (slightly great). Further, small expected image defect values at level IV (slightly low) or level V (low) are assigned to ROIs of which the differential image contrast is at level D (slightly small) and level E (small).

Subsequently, the processing time and expected value evaluation unit 28 calculates a final (total) processing time $T_i$ and expected image defect value $E_i$ from the processing time $T1_i$ and the expected image defect value $E1_i$ for each ROI based on the image feature amount calculated in step S4 and the processing time $T2_i$ and the expected image defect value $E2_i$ for each ROI based on the differential signal calculated in step S9 (step S10; an example of an image defect detection time calculation step and an example of an expected image defect value calculation step).

For example, if color hue and chroma of color of an ROI is "low chroma", brightness of the color is "0 to 20", a direction of a frequency component is "None", contrast of the frequency component is "low (less than 0.1)", and a frequency of the frequency component is "low (less than 0.25 cycle/mm)", the processing time $T1_i$ is classified into "E: short" and the expected image defect value $E1_i$ is classified into "I: high", as illustrated in FIG. 5.

Further, in a case where the streak determination criterion of this ROI is "normal" and the differential image contrast is "C: normal", the processing time $T2_i$ is classified into "A: long" and the expected image defect value $E2_i$ is classified into "III: normal", as illustrated in FIG. 7C.

Further, the processing time and expected value evaluation unit 28 sets the total processing time $T_i$ of this ROI to the longer of "E: short" of the processing time $T1_i$ and "A: long" of the processing time $T2_i$, and the total expected image defect value $E_i$ to a product "I×III" of $E1_i$ and $E2_i$.

Similarly, the processing time $T_i$ and the expected image defect value $E_i$ are calculated for all ROIs.

Then, the determination region priority assignment unit 30 assigns a priority for performing a streak determination process on each ROI of the read image (step S11; an example of an image defect detection order determination step). In this embodiment, a higher priority is assigned to the ROI in which the total expected image defect value $E_i$ of each ROI calculated in step S10 is greater (an example of an order of a descending expected image defect value).

Further, a quotient obtained by dividing the expected image defect value $E_i$ by the processing time $T_i$, that is, an image defect detection efficiency $V_i = E_i/T_i$ that is an expected image defect value per unit processing time may be calculated and a higher priority may be assigned to the ROI in which this image defect detection efficiency $V_i$ is higher.

The determination region setting unit 32 sets the ROI on which the streak determination unit 34 performs a streak determination among all the ROIs of the read image, on the basis of this priority (step S12).

The streak determination unit 34 sequentially performs the streak determination on the ROIs set in the determination region setting unit 32 (step S13; an example of an image defect detection step). Here, the determination region setting unit 32 measures a time from the start of the streak determination process using the timer 32-1. In a case where a test time has elapsed from the start of the streak determination process, the streak determination process in the streak determination unit 34 is caused to end. This test time is determined from, for example, a period in which the printed material is printed in the printing job in advance. Therefore, in the ROI on which the streak determination process is performed in the streak determination unit 34, a sum total $\Sigma E_i$ of expected image defect values $E_i$ is maximal and a total sum $\Sigma T_i$ of the processing times $T_i$ is equal to or less than the test time.

A streak determination result in the streak determination unit 34 is integrated in the streak determination integration unit 36, and the streak determination integration unit 36 determines a streak evaluation and a streak position of the printed material of the read image. The pass and fail determination unit 38 determines whether the printed material of the read image passes and fails on the basis of the integrated streak information (step S14).

Further, the pass and fail determination unit 38 determines whether or not the streak determination process has been performed on all printed materials of the printing job (step S15). In a case where there is the printed material on which the streak determination process has not been performed, the process returns to step S5 in which the same process is performed. In a case where the streak determination process had ended for all the printed materials, the process ends.

Thus, according to this embodiment, the read image obtained by reading the printed material is divided into the respective regions, the processing time required for the streak determination process is evaluated for each divided region, a region on which the streak determination is to be performed and processing content are set so that the streak determination process ends within a predetermined set test time, and the streak determination process is performed from a region in which a streak is highly likely to occur. Accordingly, even when a calculation device with relatively slow processing capability is used, it is possible to perform high-accuracy image defect detection within a predetermined time.

Although the detection of the streak that is the image defect of the printed material has been described by way of example in this embodiment, an image defect other than the streak can be detected. As the image defect, a state in which a correct amount of ink is not applied to a correct position on paper or a state in which an object other than the ink is adhered to a medium is considered.

The state in which a correct amount of ink is not applied to a correct position on paper is as follows:

White streak: Ink is insufficient or is not applied, a shape is long in a predetermined direction, and a length in a direction perpendicular to the predetermined direction is on the order of image resolution Black streak: Ink is excessively applied, a shape is long in a predetermined direction, and a length in a direction perpendicular to the predetermined direction is on the order of image resolution Secondary color streak, and multi-order color streak: At least one of a plurality of inks is insufficient or excessive, a shape is long in a predetermined direction, and a length in a direction perpendicular to the predetermined direction is on the order of image resolution Character missing: A portion of ink constituting the characters is insufficient or not attached Extra ink adhesion of characters: characters cannot be recognized due to attachment of extra ink to a region of the characters, and ink dripping: Ink is attached to a place in which there is originally no ink, and a shape is substantially circular.

Banding: A period of an insufficient or excessive ink change in which a state in which ink is insufficient or excessive is continued is at a relatively low frequency.

Unevenness: A period of an insufficient or excessive ink change in which a state in which ink is insufficient or excessive is continued is at a relatively high frequency.

Color reproduction: There is a deviation of an amount (color difference) that is unallowable from color reproduction of a target.

Meanwhile, states in which an object other than the ink is adhered to a medium are as follows:

Paper powder: Paper powder is attached to a printed material

Foreign matter and dust: foreign materials other than the paper are attached to a printed material Further, although the streak determination process is not performed on the ROI in which a sum $\Sigma T_i$ of the processing time $T_i$ exceeds the test time in this embodiment, in a case where $\Sigma T_i$>test time, the streak determination process is replaced with a process with a small amount of calculation so that the streak determination process for all the ROIs ends without exceeding a test time.

Further, in this embodiment, the streak determination process has been performed in an order of ROIs with higher priority, but the order of performing the streak determination process is not limited to the priority as long as the streak determination process can be performed on the ROIs with high priority within a test time. For example, an aspect in which the streak determination process for the ROI with the highest priority is performed after the streak determination process for the ROI with second higher priority is performed can be adopted. That is, in a case where there is an ROI on which the streak determination process cannot be performed within the test time, the priority of such an ROI may be lower than the ROI subjected to the streak determination process.

Further, although the priority is assigned to each ROI and the streak determination process is performed on each ROI in the assigned priority, division into regions with a close image feature amount (similar image feature amount) (an example of regions with each image feature amount) may be performed, a map in which regions with a close image feature amount are collected may be created, a priority may be assigned to each region with the close image feature amount, and the streak determination process may be performed on each region according to the assigned priority. Here, at least one of the hue and chroma of the color, the brightness of the color, the direction of the frequency component, the contrast of the frequency component, or the frequency of the frequency component illustrated in FIG. 4 may be used as the image feature amount.

Figure 8:
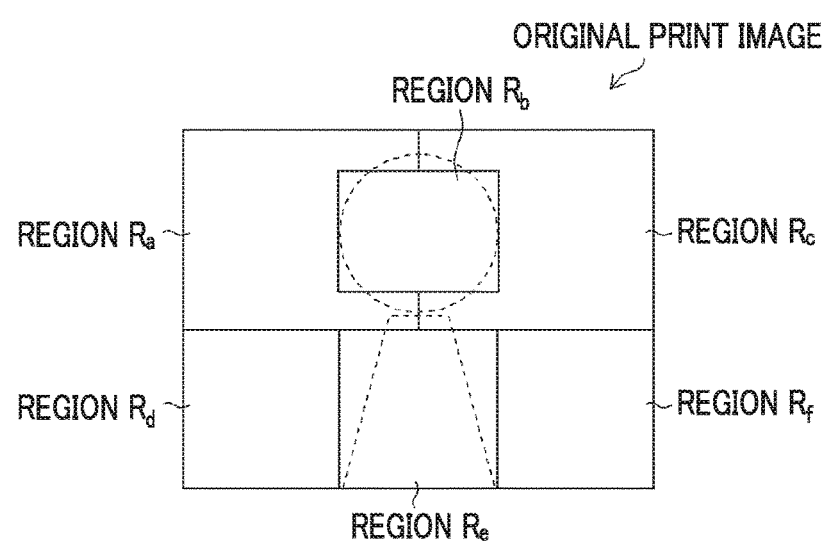
FIG. 8 illustrates an example of a map in which regions with close image feature amounts are collected.

FIG. 8 illustrates an example of a map in which regions with close image feature amounts are collected on the basis of the image feature amount of each ROI of the original print image illustrated in FIG. 2C. Here, the original print image is divided into six regions including a region $R_a$, a region $R_b$, a region $R_c$, a region Rd, a region $R_e$, and a region $R_f$. On the basis of this map, the processing time and expected value evaluation unit 28 may calculate the processing time $T_i$ and the expected image defect value $E_i$ for each of the regions $R_a$ to $R_f$ and the determination region priority assignment unit 30 may assign the priority.

Even in a case where the original print image is divided into the regions with similar image feature amounts, it is possible to perform high-accuracy image defect detection within a predetermined time.

Second Embodiment

A streak detection device according to a second embodiment acquires a plurality of divided and read images by dividing and reading a print image using a plurality of line scanners, and performs a streak determination process on each divided and read image, similar to the first embodiment.

[Entire Configuration of Streak Detection Device]

A streak detection device 40 according to the second embodiment will be described with reference to FIG. 9. The same portions as in FIG. 1 are denoted with the same reference numerals and detailed description thereof will be omitted.

An image reading unit 16 includes an image reading unit 16a, an image reading unit 16b, and an image reading unit 16c. The image reading unit 16a includes a line scanner 16a-1 and an image memory 16a-2, the image reading unit 16b includes a line scanner 16b-1 and an image memory 16b-2, and the image reading unit 16c includes a line scanner 16c-1 and an image memory 16c-2.

Figure 10A:
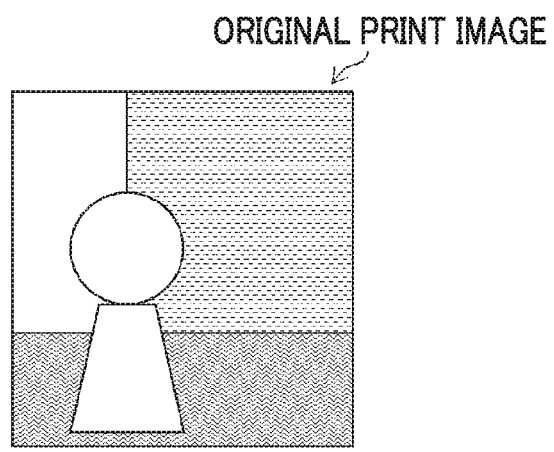
FIGS. 10A and 10B are diagrams illustrating an example of an original print image and a divided and read image.
Figure 10B:
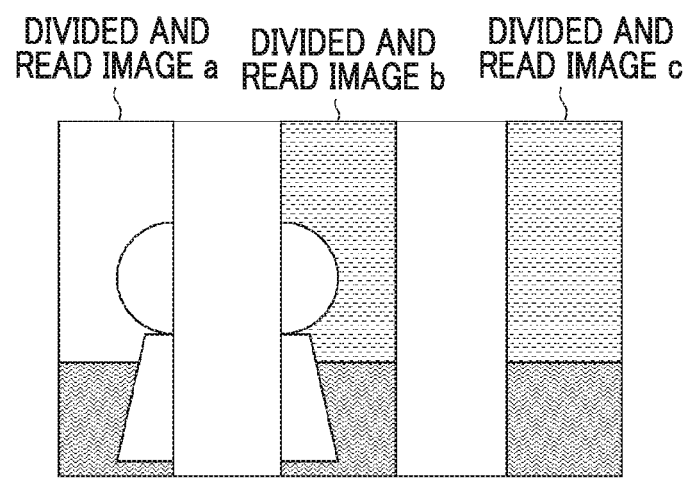

The image reading unit 16 divides and reads one printed material in three using the three image reading units 16a, 16b, and 16c to acquire three divided and read images. FIG. 10A illustrates an example of an original print image, and FIG. 10B illustrates divided and read images a, b, and c (example of divided print images) obtained by reading the printed material printed on the basis of the original print image using the image reading units 16a, 16b, and 16c.

The comparative color space conversion unit 18 includes a comparative color space conversion unit 18a, a comparative color space conversion unit 18b, a comparative color space conversion unit 18c, and a comparative color space conversion unit 18d. The comparative color space conversion unit 18 converts each image into the same color space in order to compare the divided and read images a, b, and c acquired by the image reading units 16a, 16b, and 16c with the original print image subjected to the RIP processing in the RIP processing unit 14. Here, the comparative color space conversion unit 18a converts the divided and read image a into the color space, the comparative color space conversion unit 18b converts the divided and read image b into the color space, the comparative color space conversion unit 18c converts the divided and read image c into the color space, and the comparative color space conversion unit 18d converts the original print image subjected to the RIP processing into the color space.

The image alignment unit 20 includes an image alignment unit 20a, an image alignment unit 20b, and an image alignment unit 20c. The image alignment unit 20 performs an alignment process on the divided and read image a, b, and c and the original print image subjected to the color conversion in the comparative color space conversion unit 18 using the correspondence relationship determined in the printing conditions as an initial value. Here, the image alignment unit 20a performs alignment of the divided and read image a and the original print image, the image alignment unit 20b performs alignment of the divided and read image b and the original print image, and the image alignment unit 20c performs alignment of the divided and read image c and the original print image.

The variation correction unit 22 includes a variation correction unit 22a, a variation correction unit 22b, and a variation correction unit 22c. The variation correction unit 22 removes a variation of the pixel signal at a low frequency caused by reading of the line scanners 16a-1, 16a-2, and 16a-3 from the divided and read images a, b, and c subjected to the alignment process in the image alignment unit 20. Here, the variation correction unit 22a removes a variation of the pixel signal at a low frequency of the divided and read image a, the variation correction unit 22b removes a variation of the pixel signal at a low frequency of the divided and read image b, and the variation correction unit 22c removes a variation of the pixel signal at a low frequency of the divided and read image c.

The image comparison unit 24 includes an image comparison unit 24a, an image comparison unit 24b, and an image comparison unit 24c. The image comparison unit 24 compares the divided and read images a, b, and c with the original print image, calculates a difference in the image signal between corresponding pixels, and outputs a differential signal (differential image) and corresponding position information. Here, the image comparison unit 24a compares the divided and read image a with the original print image, the image comparison unit 24b compares the divided and read image b with the original print image, and the image comparison unit 24c compares the divided and read image c with the original print image. The image comparison units 24a, 24b, and 24c compare each divided image with the original print image for each ROI that is a minimum analysis unit.

The processing time and expected value evaluation unit 28 calculate an estimate of an image defect detection time (processing time) indicating a time required to detect a streak of each ROI of the divided and read images a, b and c on the basis of the differential signal in the divided and read images a, b, and c input from the image comparison units 24a, 24b, and 24c and the original print image, the position information thereof, and the image feature amount input from the image feature amount calculation unit 26. Further, the processing time and expected value evaluation unit 28 calculates an expected image defect value indicating a possibility of presence of the streak of each ROI on the basis of the intensity of the differential signal of the image feature amount of each ROI of the divided and read images a, b and c.

The determination region priority assignment unit 30 determines a priority in which the streak determination process for each ROI is performed on each divided and read image. The determination region setting unit 32 sequentially sets ROIs on which the streak determination process is to be performed in each divided and read image, on the basis of the priority determined in the determination region priority assignment unit 30, and outputs a result of the setting to the streak determination unit 34 for each divided and read image.

The streak determination unit 34 includes a streak determination unit 34a, a streak determination unit 34b, a streak determination unit 34c, and an input unit 34-1. The streak determination unit 34 performs the streak determination process on the ROIs output in the determination region setting unit 32 for each of the divided and read images a, b and c. Here, the streak determination unit 34a performs the streak determination for the divided and read image a, the streak determination unit 34b performs the streak determination for the divided and read image b, and the streak determination unit 34c performs the streak determination for the divided and read image c.

Further, the user can input the streak determination criterion from the input unit 34-1. The input streak determination criterion is input to the streak determination units 34a, 34b, and 34c in common.

The streak determination integration unit 36 integrates positions in the images of the streaks of the divided and read images a, b, and c determined by the streak determination units 34a, 34b, and 34c and determines a streak evaluation and a streak position of the read printed material.

Thus, according to this embodiment, the plurality of divided and read images are acquired by dividing and reading the printed material using the plurality of line scanners. Then, each divided and read image is divided into respective regions, the processing time required for the streak determination process is evaluated for each divided region, a region on which the streak determination is to be performed and processing content are set so that the streak determination process ends within a predetermined set test time, and the streak determination process is performed from a region in which a streak is highly likely to occur in each divided and read image, similar to the first embodiment. Thus, even in a case where the printed material is divided and divided, it is possible to perform high-accuracy image defect detection within a predetermined time using a calculation device with relatively slow processing capability.

In this embodiment, the streak determination units 34a, 34b, and 34c perform the streak determinations of divided and read images a, b, and c, respectively, but a variation is generated in the processing time of the streak determination process of each divided and read image. Therefore, in a case where the processing times exceeds the test time and there is the divided and read image in which the streak determination process of all the ROIs cannot be performed, the process may be performed in the streak determination unit for the divided and read image that does not exceed the test time. For example, in a case where the process ends without exceeding the test time since a sum $\Sigma T_i$ of the processing time $T_i$ of all ROIs is short in the divided and read image a, and a sum $\Sigma T_i$ of the processing time of all ROIs exceeds the processing time in the divided and read image b, the streak determination unit 34a (an example of image defect detection means that has ended the detection of the image defect of the divided print image) after the streak determination process of the divided and read image a has ended is caused to perform the streak determination process of the ROIs exceeding of the test time of the divided and read image b (an example of the divided print image for which the defect detection has not ended).

Third Embodiment

Even when some of functions of the streak detection device 10 or the streak detection device 40 are disposed in a server, it is possible to perform high-accuracy image defect detection within a predetermined time.

Figure 11:
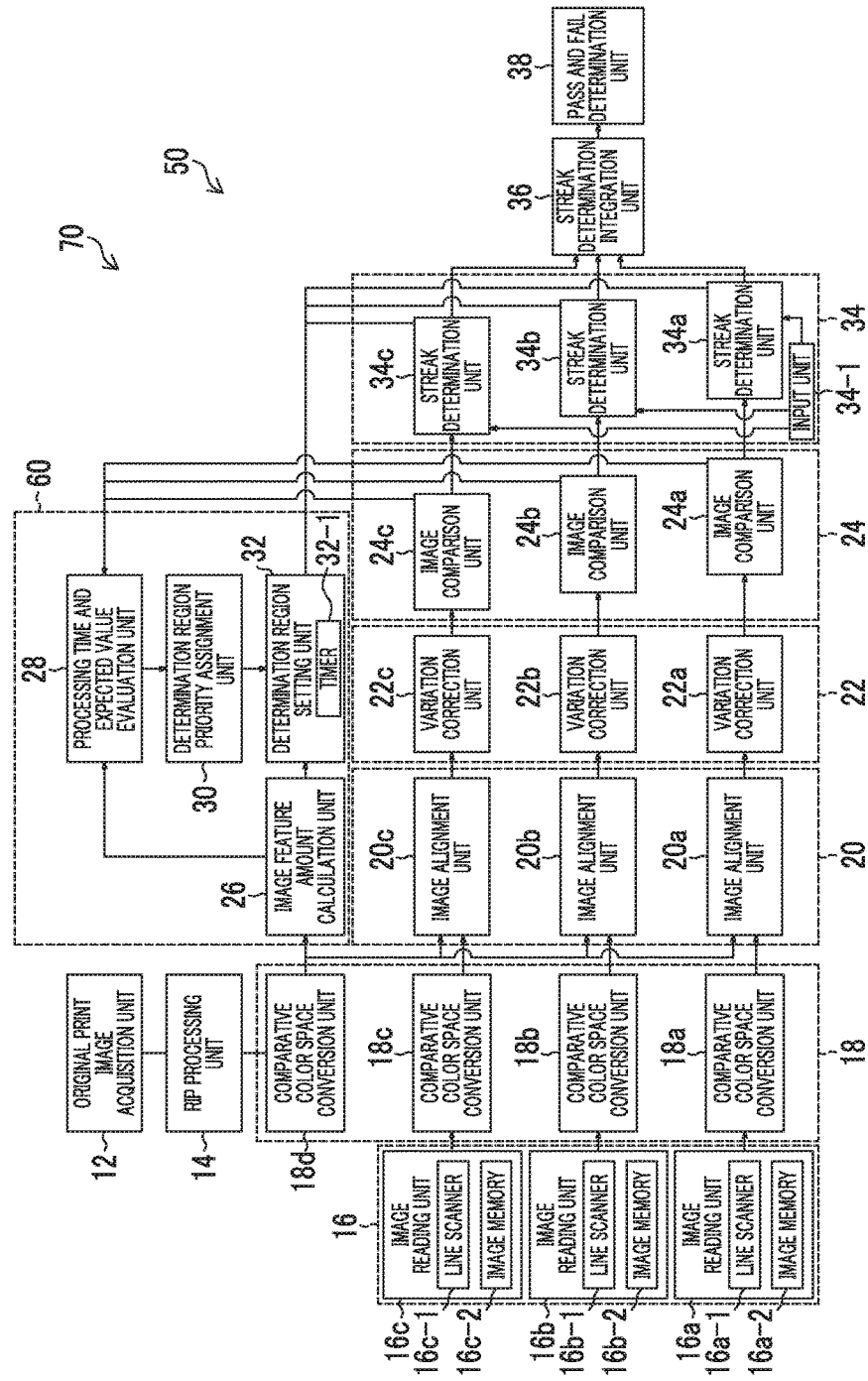
FIG. 11 is a block diagram illustrating a schematic configuration of a streak detection system.

The streak detection system 70 illustrated in FIG. 11 includes a streak detection device 50 and a streak detection server 60. The same portions as in the streak detection device 40 illustrated in FIG. 9 are denoted with the same reference numerals, and detailed description thereof will be omitted.

The streak detection device 50 includes an original print image acquisition unit 12, a RIP processing unit 14, an image reading unit 16, a comparative color space conversion unit 18, an image alignment unit 20, a variation correction unit 22, an image comparison unit 24, a streak determination unit 34, a streak determination integration unit 36, and a pass and fail determination unit 38. Further, the streak detection server 60 includes an image feature amount calculation unit 26, a processing time and expected value evaluation unit 28, a determination region priority assignment unit 30, and a determination region setting unit 32.

The streak detection device 50 and the streak detection server 60 are connected so that the streak detection device 50 and the streak detection server 60 can communicate over a network such as a local area network (LAN) or a wide area network (WAN), and can perform the same process as the streak detection device 40 by performing transmission and reception of information using a predetermined protocol. Therefore, it is possible to perform high-accuracy image defect detection within a predetermined time.

In the streak detection system, sharing a streak detection and streak detection server of each function is not limited to the example illustrated in FIG. 11, it can be appropriately determined.

Figure 12:
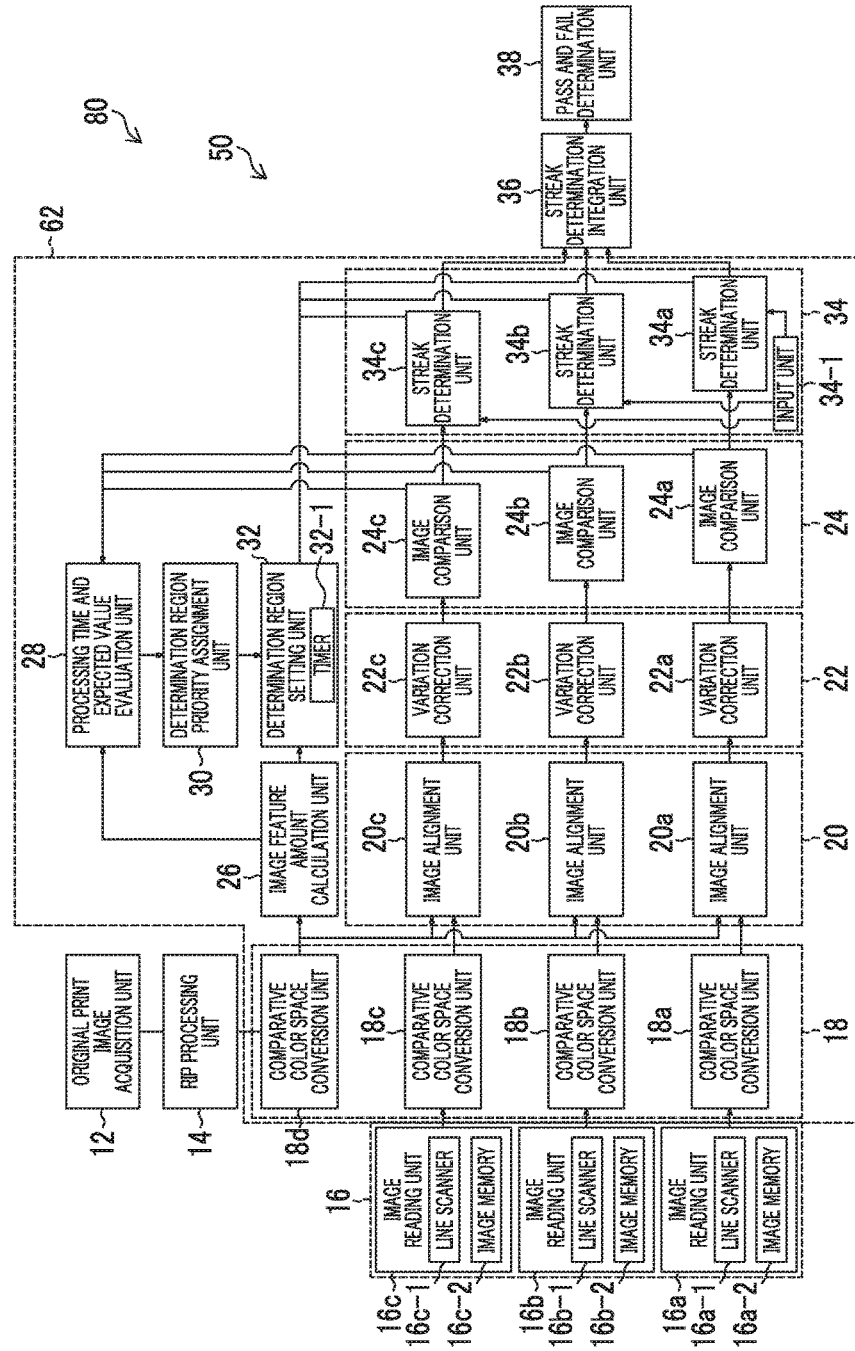
FIG. 12 is a block diagram illustrating a schematic configuration of the streak detection system.

In the streak detection system 80 illustrated in FIG. 12, the streak detection device 50 includes the original print image acquisition unit 12, the RIP processing unit 14, the image reading unit 16, the streak determination integration unit 36, and the pass and fail determination unit 38, and the streak detection server 62 includes the comparative color space conversion unit 18, the image alignment unit 20, the variation correction unit 22, the image comparison unit 24, the image feature amount calculation unit 26, the processing time and expected value evaluation unit 28, the determination region priority assignment unit 30, the determination region setting unit 32, and the streak determination unit 34.

Figure 13:
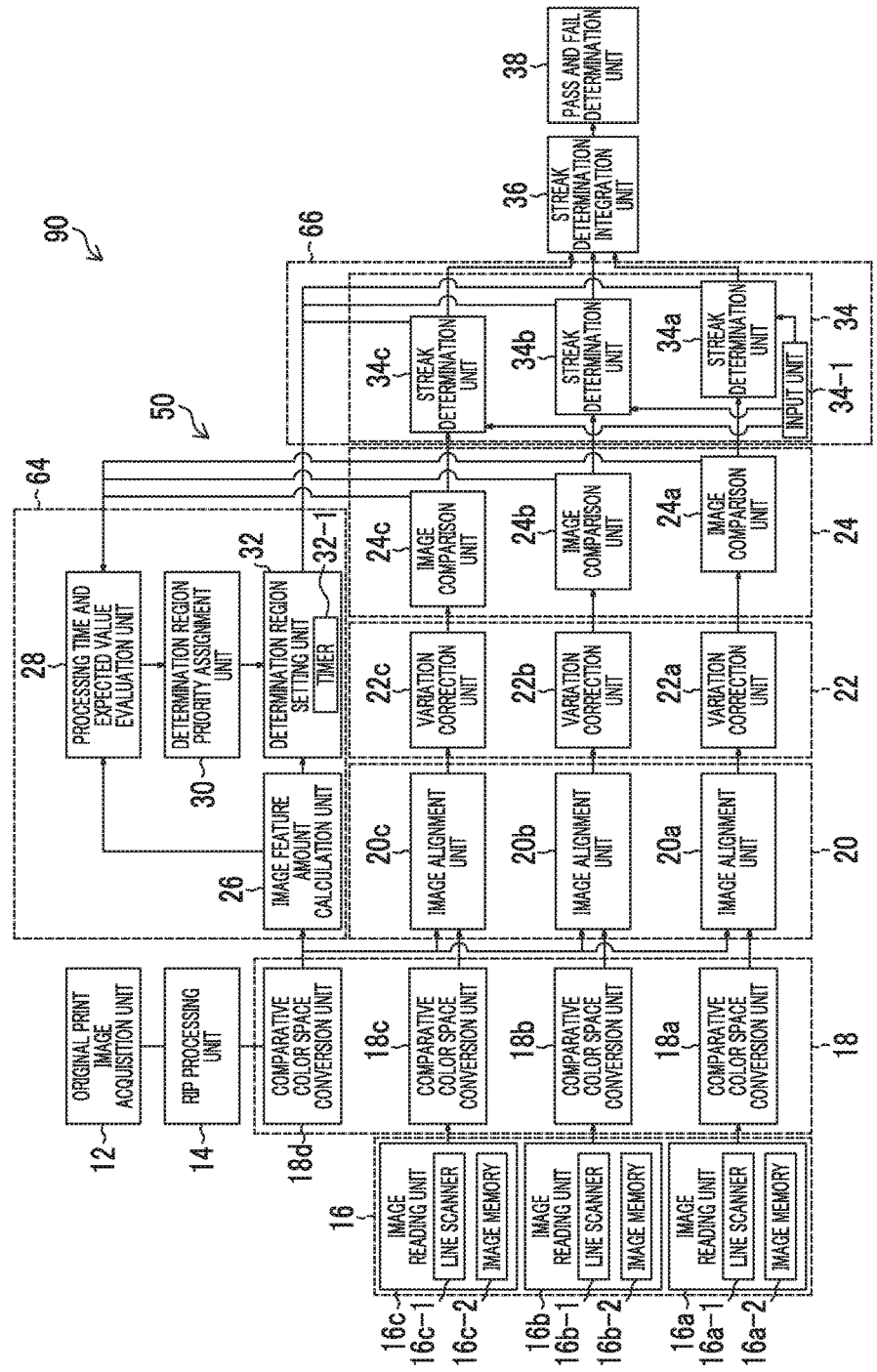
FIG. 13 is a block diagram illustrating a schematic configuration of the streak detection system.

Further, the streak detection system illustrated in FIG. 13 uses two servers. In the streak detection system 90, the streak detection device 50 includes the original print image acquisition unit 12, the RIP processing unit 14, the image reading unit 16, the comparative color space conversion unit 18, the image alignment unit 20, the variation correction unit 22, the image comparison unit 24, the streak determination integration unit 36, and the pass and fail determination unit 38, and a first streak detection server 64 includes the image feature amount calculation unit 26, the processing time and expected value evaluation unit 28, the determination region priority assignment unit 30, the determination region setting unit 32, the second streak detection server 66, and the streak determination unit 34.

Even when this configuration is adopted, it is possible to perform high-accuracy image defect detection within a predetermined time.

Fourth Embodiment

The streak detection devices 10 and 40 and the streak detection systems 70, 80, and 90 can constitute a printer in combination with various printing means. Here, an ink jet recording device (an example of an image recording device) to which the streak detection device 10 is applied will be described by way of example.

[Entire Configuration of Ink Jet Recording Device]

Figure 14:
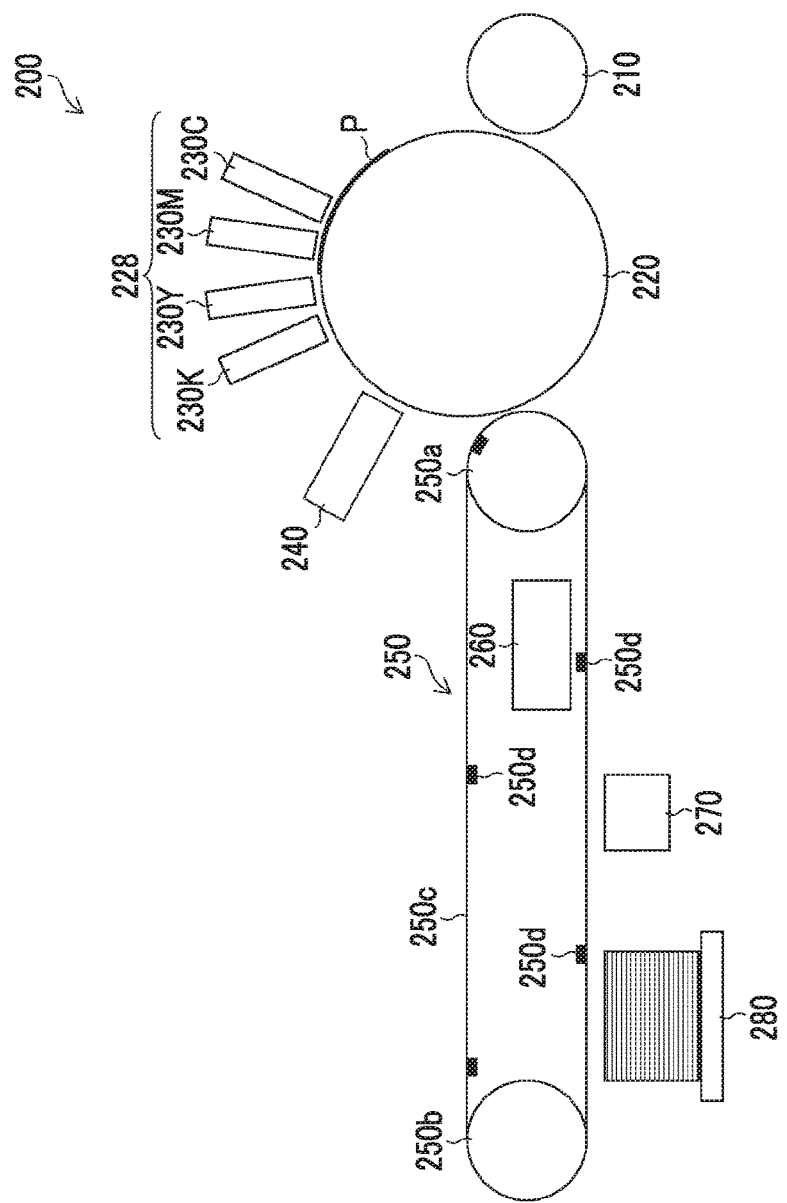
FIG. 14 is an entire configuration diagram illustrating an entire schematic configuration of an ink jet recording device.

As illustrated in FIG. 14, the ink jet recording device 200 is a printer that jets ink of four colors including cyan (C), magenta (M), yellow (Y), and black (K) to paper P (an example of a print medium) that is a sheet, to record a color image. For the sheet, general-purpose printing paper is used, and for the ink, aqueous ink is used. Here, the general-purpose printing paper is not a so-called ink jet paper, and refers to paper mainly composed of cellulose such as coated paper that is used for general offset printing or the like. Further, the aqueous ink refers to ink obtained by dissolving or dispersing a coloring material such as a dye or a pigment into water or a water-soluble solvent.

As illustrated in FIG. 14, the ink jet recording device 200 includes, for example, a transport drum 210, a recording drum 220, an ink jet head unit 228, an in-line sensor 240, a chain gripper 250, a heater 260, a stamper 270, a paper discharge tray 280.

The transport drum 210 transports the paper P supplied from the paper supply unit (not illustrated) and passes the paper P to the recording drum 220.

The recording drum 220 functions as paper holding means for holding a paper P, and functions as paper transport means for transporting the paper P. The recording drum 220 receives the paper P from the transport drum 210 and transports the paper P to the chain gripper 250. The recording drum 220 is formed in a cylindrical shape, and is driven by a motor (not illustrated) serving as a driving means and rotated. A gripper (not illustrated) is included on an outer circumferential surface of the recording drum 220, and a leading end of the paper P is gripped by the gripper. The recording drum 220 grips the leading end of the paper P using the gripper and is rotated to transport the paper P to the chain gripper 250 while the paper P being wound around the circumferential surface.

Further, in the recording drum 220, a plurality of suction holes (not illustrated) are formed in a predetermined pattern on the circumferential surface. The paper P wound around the circumferential surface of the recording drum 220 is sucked from the suction holes, and accordingly, is transported while being sucked and held on the circumferential surface of the recording drum 220. Accordingly, it is possible to transport the paper P with high flatness.

The ink jet head unit 228 is printing means including an ink jet head 230C that jets ink droplets of cyan (C) in an ink jet scheme, an ink jet head 230M that jets ink droplets of magenta (M) in an ink jet scheme, an ink jet head 230Y that jets ink droplets of yellow (Y) in an ink jet scheme, and an ink jet head 230K that jets ink droplets of black (K) in an ink jet scheme. The respective ink jet heads 230C, 230M, 230Y, and 230K are arranged at predetermined intervals along a transport path of the paper P by the recording drum 220.

Each of the ink jet heads 230C, 230M, 230Y, and 230K includes a line head and is formed with a length corresponding to a maximum paper width. Each of the ink jet heads 230C, 230M, 230Y, and 230K is arranged so that a nozzle surface (a surface on which the nozzle is arranged) faces a circumferential surface of the recording drum 220.

Each of the ink jet heads 230C, 230M, 230Y, and 230K jets ink droplets from the nozzle formed on the nozzle surface to the recording drum 220 to record an image on the paper P transported by the recording drum 220 in a single pass scheme.

The in-line sensor 240 functions as image reading means for reading the image recorded on the paper P. The in-line sensor 240 is installed on the downstream side of the ink jet head unit 228 relative to a transporting direction of the paper P of the recording drum 220 and is configured with, for example, a line scanner. The In-line sensor 240 reads the image recorded by the ink jet heads 230C, 230M, 230Y, and 230K from the paper P transported by the recording drum 220.

The chain gripper 250 is paper transport means for transporting the paper P from the recording drum 220 to the paper discharge tray 280. The chain gripper 250 mainly includes a first sprocket 250a installed near the recording drum 220, a second sprocket 250b installed near the paper discharge tray 280, an endless chain 250c wound around the first sprocket 250a and the second sprocket 250b, a plurality of chain guides (not illustrated) that guide travel of the chain 250c, and a plurality of grippers 250d attached to the chain 250c at regular intervals.

The first sprocket 250a, the second sprocket 250b, the chain 250c, and the chain guide are paired and disposed on both sides in a width direction of the paper P. The gripper 250d is installed to be passed over to the chains 250c provided as a pair.

The first sprocket 250a is disposed near the recording drum 220 so that the paper P passed from the recording drum 220 can be received with the gripper 250d. This first sprocket 250a is pivotally supported in a bearing (not illustrated) and rotatably provided. A motor (not illustrated) is connected to the first sprocket 250a. 250c wound around the first sprocket 250a and the second sprocket 250b travels by driving the motor.

The second sprocket 250b is installed near the paper discharge tray 280 so that the paper P received from the recording drum 220 can be collected in the paper discharge tray 280. That is, an installation position of the second sprocket 250b is an end of the transport path of the paper P by the chain gripper 250. The second sprocket 250b is pivotally supported by a bearing (not illustrated) and rotatably provided.

The chain 250c is formed in an endless shape and is wound around the first sprocket 250a and the second sprocket 250b. Further, the chain guide is disposed at a predetermined position and guides the chain 250c so that the chain 250c travels a predetermined path.

A plurality of grippers 250d are attached to the chain 250c at regular intervals. The attachment interval of the grippers 250d is set according to a reception interval of the paper P from the recording drum 220. That is, the attachment interval is set according to the reception interval of the paper P from the recording drum 220 so that the paper P sequentially passed from the recording drum 220 can be received from the recording drum 220 according to a timing.

The heater 260 is installed inside the chain gripper 250, and performs a drying process by blowing hot air to the surface of the paper P that is transported by the chain gripper 250.

The stamper 270 is disposed on the downstream side of the heater 260 in the transporting direction of the paper P that is transported by the chain gripper 250. The stamper 270 adheres ink to a leading edge of the paper P determined to be a fail product, on the basis of the pass and fail determination result of the streak detection device 10.

The paper discharge tray 280 stacks and collects papers P transported by the chain gripper 250. In the paper discharge tray 280, paper butting members (not illustrated) such as a front paper member, a rear paper member, and lateral paper members are included so that the paper P is orderly stacked.

Further, the paper discharge tray 280 is provided so that the paper discharge tray 280 can be elevated by a paper discharge tray elevating device (not illustrated). Driving of the paper discharge tray elevating device is controlled in conjunction with an increase or decrease of the number of papers P stacked on the paper discharge tray 280 to elevate the paper discharge tray 280 so that the paper P located at the top is always located a constant height.

In the ink jet recording device 200 configured as above, the paper P passed from the transport drum 210 is first is received by the recording drum 220. The recording drum 220 grips the leading end of the paper P using the gripper and is rotated to transport the paper P. In this case, the paper P is sucked from the suction holes of the recording drum 220, and sucked and held on the outer circumferential surface of the recording drum 220.

The paper P is transported in this state, and passes through the respective ink jet heads 230C, 230M, 230Y, and 230K. At the time of this passage, droplets of ink of respective colors including C, M, Y, and K are jet from the respective ink jet heads 230C, 230M, 230Y, and 230K to the surface and a color image is drawn on the surface.

The paper P on which an image is recorded by the ink jet heads 230C, 230M, 230Y, and 230K then passes through the in-line sensor 240. The image recorded on the recording surface is read at the time of the passage in the in-line sensor 240. Since reading is performed in a state in which the paper P is sucked and held on the recording drum 220 when reading is performed, it is possible to perform reading with high accuracy. Thereafter, the paper P is passed to the chain gripper 250 after the adsorption is released.

In the chain gripper 250, when a motor (not illustrated) connected to the first sprocket 250a is driven, the chain 250c travels. The chain 250c travels at the same speed as circumferential speed of the recording drum 220. Further, a timing is aligned so that the paper P passed from the recording drum 220 is receive in each gripper 250d.

In The paper P received in the gripper 250d and transported by the chain gripper 250, a surface opposite to the recording surface comes in sliding contact with an upper surface of a guide plate (not illustrated), and the recording surface is heated by the heater 260. Accordingly, the ink applied on the recording surface is dried.

Further, the paper P determined to be determined to be fail product is transported by the chain gripper 250 and the ink is adhered to the edge by the stamper 270.

The chain gripper 250 releases the paper P on the paper discharge tray 280 and causes the paper P to be stacked on the paper discharge tray 280. The paper discharge tray 280 is elevated so that the paper P located at the top is always located at a constant height.

In a bundle of papers P stacked the paper discharge tray 280, since the ink is attached to the paper P that is a fail product by the stamper 270 when viewed in a stacking direction, it is possible to easily specify the paper P that is a fail paper.

[Control System of Ink Jet Recording Device]

Figure 15:
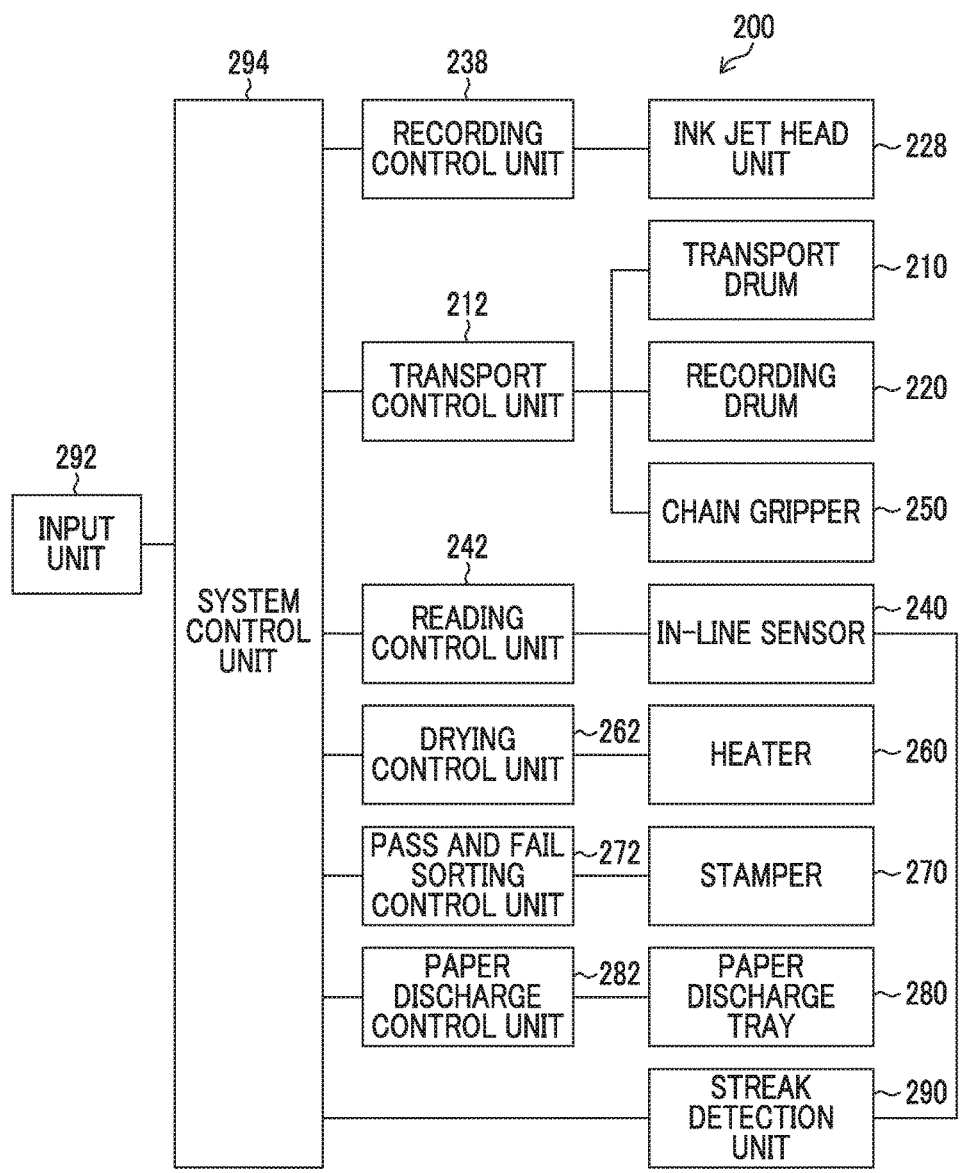
FIG. 15 is a block diagram illustrating a schematic configuration of a control system of the ink jet recording device.

As illustrated in FIG. 15, the ink jet recording device 200 includes, for example, a transport control unit 212, a recording control unit 238, a reading control unit 242, a drying control unit 262, a pass and fail sorting control unit 272, a paper discharge control unit 282, a streak detection unit 290, an input unit 292, and a system control unit 294.

The transport control unit 212 controls the transport drum 210, the recording drum 220, and the chain gripper 250 to transport the paper P. The recording control unit 238 controls the ink jet head unit 228 to jet ink from the ink jet heads 230C, 230M, 230Y, and 230K to the paper P and record the image on a recording surface of the paper P.

The reading control unit 242 controls the in-line sensor 240 to read the image recorded on the recording surface of the paper P. The drying control unit 262 controls the heater 260 to dry the paper P that is transported by the chain gripper 250. The pass and fail sorting control unit 272 (an example of an output means) controls the stamper 270 to adhere ink to a leading edge of the paper P which is a fail product. The paper discharge control unit 282 controls the paper discharge tray 280 to maintain the uppermost position of the stacked papers P to be constant.

For the streak detection unit 290, the streak detection device 10 described with reference to FIG. 1 can be applied. Here, the image reading unit 16 is used as input means for acquiring the image data read by the in-line sensor 240 as the read image. Further, the pass and fail determination unit 38 is determination means for determining whether the printed image is good or bad.

The input unit 292 is a user interface for enabling the user to input information of the printing job such as the original print image or the number of printed sheets.

The system control unit 294 controls, for example, the transport control unit 212, the recording control unit 238, the reading control unit 242, the drying control unit 262, the pass and fail sorting control unit 272, the paper discharge control unit 282, and the streak detection unit 290 on the basis of the printing job input from the input unit 292 to control the entire operation of the ink jet recording device 200 and execute the printing job.

[Test Time of Ink Jet Recording Device]

In the ink jet recording device 200 configured as above, the paper P is supplied from the paper supply unit in a predetermined printing cycle (an example of a first time interval), the paper P is transported by the recording drum 220 in this printing cycle, and an image is recorded on the paper P in the printing cycle by the ink jet head unit 228.

The image recorded by the ink jet head unit 228 is read by the in-line sensor 240 in this printing cycle. Image data read by the in-line sensor 240 is input to the streak detection unit 290, and the pass and fail determination for the paper P (an example of the good and bad determination) is performed within a time of the printing cycle. A result of the pass and fail determination is input to the pass and fail sorting control unit 272, and ink is adhered to the printed material that is a fail product by the stamper 270.

Therefore, the test time for each paper P (printed material) in the streak detection unit 290 is determined in the printing cycle in the ink jet head unit 228. According to the streak detection unit 290 to which the streak detection device 10 is applied, it is possible to perform high-accuracy streak detection within the time of the printing cycle (an example of a time shorter than a first time).

As described above, in a case where the streak determination process does not end for all of the ROIs within the time of the printing cycle, content of the streak determination process may be changed to a process with a small amount of calculation. Further, in a case where the streak determination process is performed on a plurality of divided and read images by a plurality of streak determination units, the streak determination unit which has ended the streak determination process is caused to perform the streak determination process on the divided and read image for which another streak determination process has not ended.

As described above, the ink jet recording device 200 jets ink from the ink jet heads 230C, 230M, 230Y, and 230K that are line heads, to the paper P transported by the recording drum 220 to record the image. Thus, a streak occurring in the ink jet recording device 200 occurs in a direction along the transporting direction of the paper P in the recording drum 220. Thus, the direction of the frequency component described with reference to FIG. 4C in this case indicates an angle in a case where the transporting direction of the paper P is 0°.

Although the paper P of a pass product and the paper P of a fail product are sorted by a stamper in this embodiment, the paper P of a pass product and the paper P of a fail product are divided, accumulated, and sorted in separate paper discharge trays. Further, display means for displaying the determination result of the pass and fail determination unit 38 may be provided.

Fifth Embodiment

A streak detection device 100 (an example of an image defect detection device) according to a fifth embodiment includes a database in which streak determination conditions are recorded. The streak detection device 100 acquires the streak determination conditions for an image with an image feature amount matching or similar to the original print image by searching for the database using the image feature amount of the original print image as a query, and detects a streak from a printed material printed on the basis of the original print image (a printed material on which the original print image is printed) using the acquired streak determination condition.

[Entire Configuration of Streak Detection Device]

Figure 16:
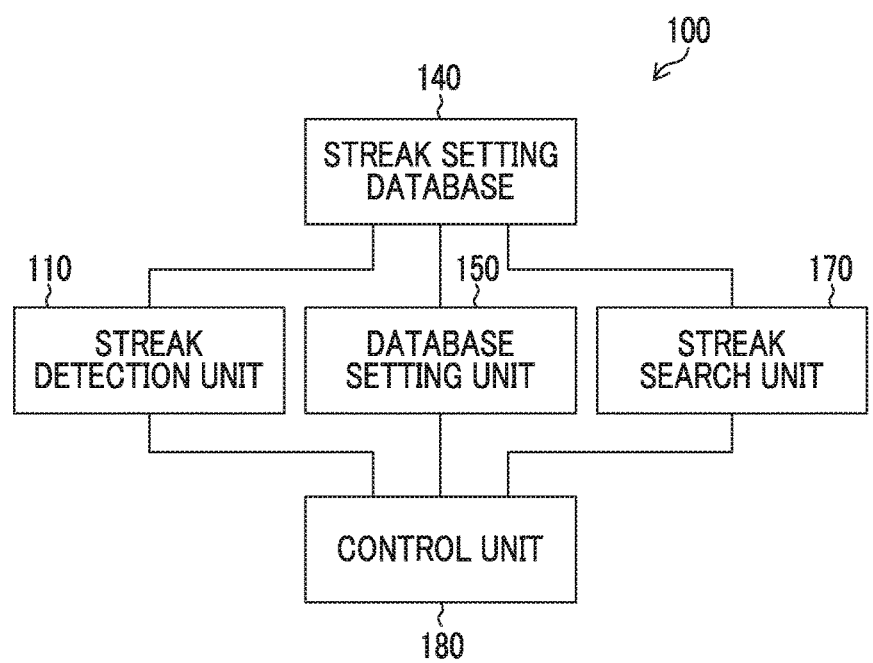
FIG. 16 is a block diagram illustrating a schematic configuration of a streak detection device.

As illustrated in FIG. 16, the streak detection device 100 includes a streak detection unit 110, a streak setting database 140, a database setting unit 150, a streak search unit 170, and a control unit 180.

The streak detection unit 110 compares the original print image with the read image of the printed material printed on the basis of the original print image to detect the streak of the printed material.

The streak setting database 140 includes a large-capacity storage medium such as a hard disk, and a streak determination condition used in the streak detection process of the streak detection unit 110 (an example of an image defect detection condition) is recorded.

The database setting unit 150 analyzes the printed material with the streak on image quality, and builds and updates the streak setting database 140. The streak search unit 170 searches for the streak setting database 140 using the image feature amount of the original print image as a query, and acquires the streak determination condition to be used for the streak determination process in the streak detection unit 110.

The control unit 180 controls all of the streak detection unit 110, the database setting unit 150, and the streak search unit 170.

[Configuration of Streak Detection Unit]

Figure 17:
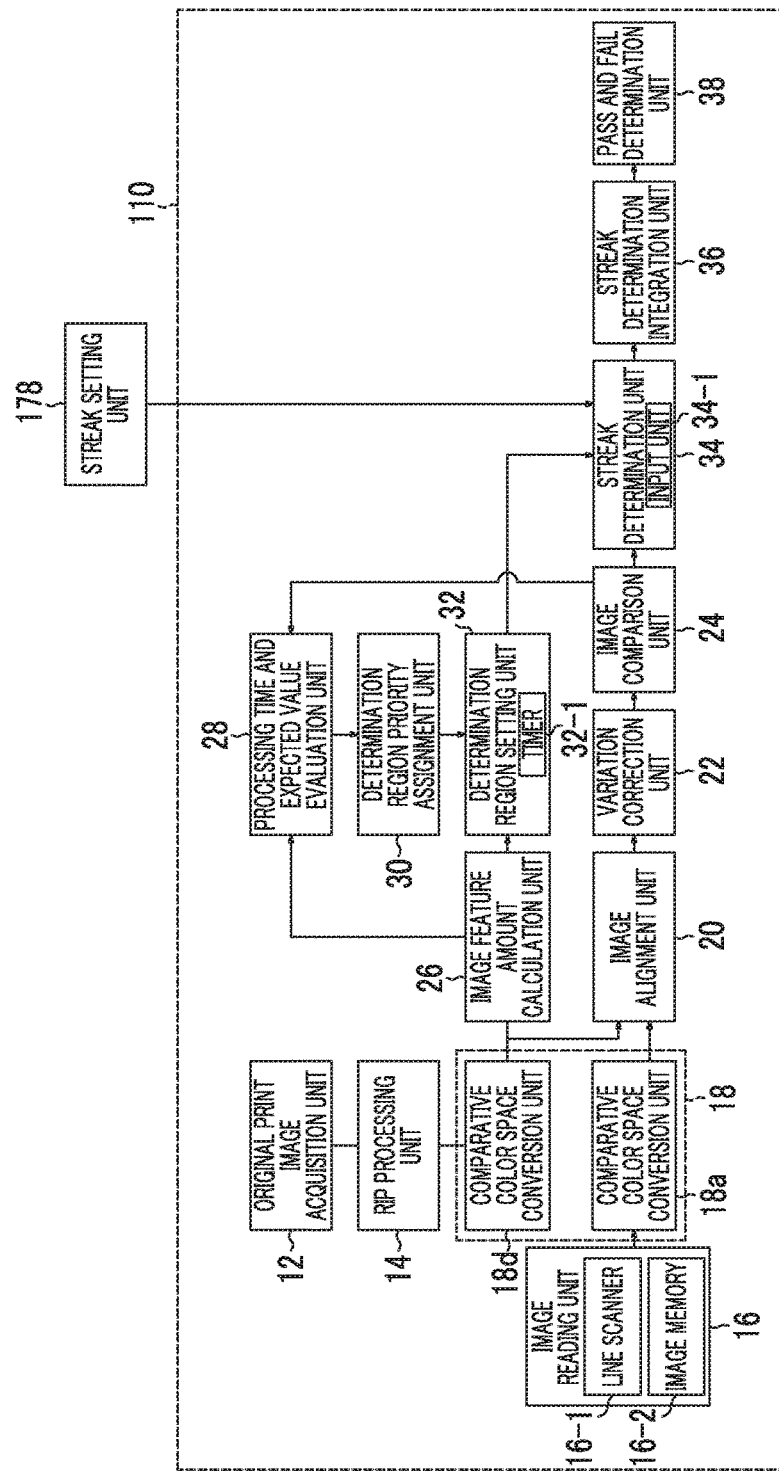
FIG. 17 is a block diagram illustrating a schematic configuration of a streak detection unit.

FIG. 17 illustrates a configuration of a streak detection unit 110. The same portions as in the FIG. 1 are denoted with the same reference numerals, and detailed description thereof will be omitted. As illustrated in FIG. 17, the streak detection unit 110 is configured, similar to the streak detection device 10 illustrated in FIG. 1.

The streak determination unit 34 (an example of image defect detection means) of the streak detection unit 110 performs a streak determination process on the ROI output in the determination region setting unit 32 for the read image. This streak determination process is performed on the basis of the streak determination condition set in the streak setting unit 178 of the streak search unit 170 which will be described below. The streak determination process is a process of detecting an image defect candidate present in the read image on the basis of a differential signal of the read image and comparing the detected image defect candidate with the feature amount of the streak to determine the image defect candidate that is similar to the feature amount of the streak to be the streak.

The streak determination integration unit 36 (an example of judgment means) integrates a position within the image of the streak determined by the streak determination unit 34 and determines a streak evaluation and a streak position of the read printed material (an example of a judgment as to whether or not the image defect is an allowable defect). The pass and fail determination unit 38 (an example of judgment means) performs a pass or fail determination (good or bad determination) as to whether or not the printed material of the read image is suitable as a printed material to be output, on the basis of the streak evaluation and the streak position (an example of a determination result) integrated in the streak determination integration unit 36.

[Configuration of Database Setting Unit]

Figure 18:
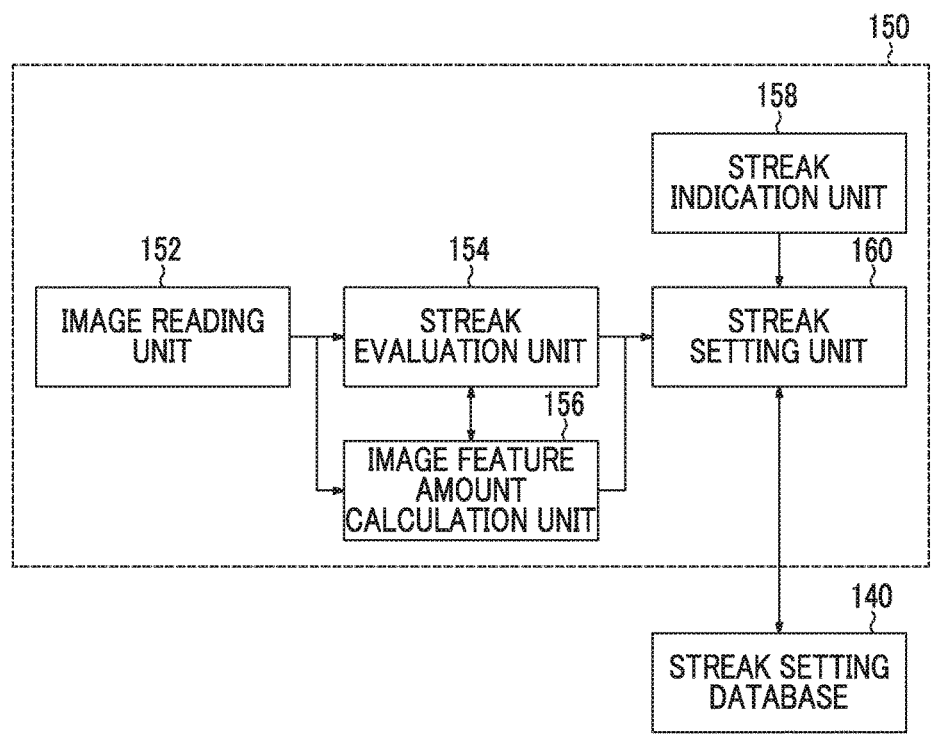
FIG. 18 is a block diagram illustrating a schematic configuration of a database setting unit.

As illustrated in FIG. 18, the database setting unit 150 includes an image reading unit 152, a streak evaluation unit 154, an image feature amount calculation unit 156, a streak indication unit 158, and a streak setting unit 160.

The image reading unit 152 reads the printed material with a streak using a line scanner (not illustrated) and acquires a read image. For the image reading unit 152, the image reading unit 16 of the streak detection unit 110 may be used.

The streak evaluation unit 154 (an example of image defect information acquisition means and an example of image defect information acquisition means) detects a streak from the read image, and calculates a position of the detected streak (streak position) and a strength thereof (streak strength). The user is caused to input the position of the streak from an input unit (not illustrated), and a strength of a streak in the input position may be calculated.

The image feature amount calculation unit 156 (an example of image feature amount analysis means and an example of image defect information acquisition means) calculates the image feature amount of the read image, and acquires a distribution of the image feature amount of the entire read image, and an image feature amount near the streak calculated by the streak evaluation unit 154. For the image feature amount calculation unit 156, the image feature amount calculation unit 26 of the streak detection unit 110 may be used in common.

The streak indication unit 158 (an example of customer information acquisition means, an example of printing use acquisition means, and an example of printing condition acquisition means) is a user interface that causes the user to input a countermeasure against the streak detected by the streak evaluation unit 154 (information on pass or fail (an example of information on whether the image defect is an allowable defect)) or customer information, printing use, and printing conditions of the printed material. The streak indication unit 158 includes, for example, a monitor (not illustrated) for displaying a streak position in the image, and a keyboard (not illustrated) for inputting a countermeasure against the displayed streak position or other information.

The streak setting unit 160 (an example of updating means) stores the streak position and the streak strength calculated by the streak evaluation unit 154, the distribution of the image feature amount of the entire image and an image feature amount near the streak acquired by the image feature amount calculation unit 156, and a countermeasure against the streak, the customer information, the printing use, and the printing conditions of the printed material input from the streak indication unit 158 in the streak setting database 140 in association with one another as the streak setting conditions, to update the streak setting database.

[Configuration of Database Search Unit]

Figure 19:
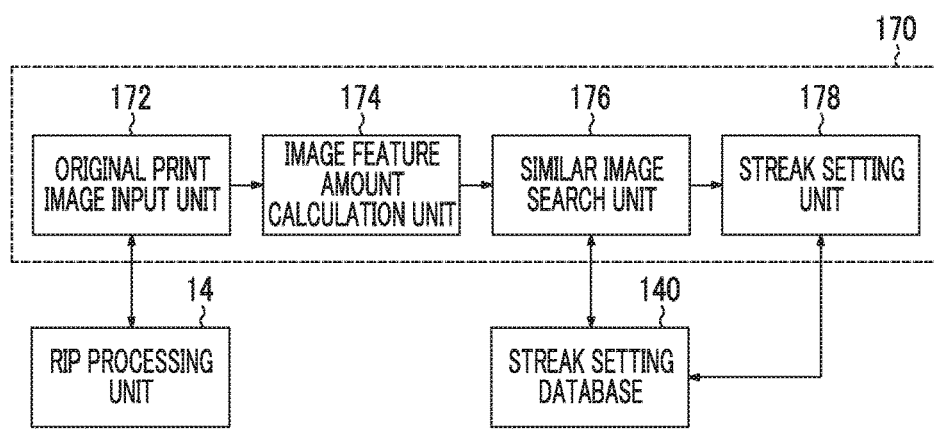
FIG. 19 is a block diagram illustrating a schematic configuration of a database search unit.

As illustrated in FIG. 19, the streak search unit 170 includes an original print image input unit 172, an image feature amount calculation unit 174, a similar image search unit 176, and a streak setting unit 178.

The original print image input unit 172 is input means for acquiring an original print image of a printed material that is a target. Here, the original print image input unit 172 acquires the original print image subjected to the RIP processing from the RIP processing unit 14 of the streak detection unit 110. Further, the original print image input unit 172 includes input means such as a keyboard, a mouse, or a touch panel (all not illustrated), and customer information, printing use, or a printing condition of the original print image is input by the user.

The image feature amount calculation unit 174 calculates the image feature amount of each region of the original print image. For example, the image feature amount calculation unit 174 divides the original print image into ROIs that are minimum analysis units, and calculates the image feature amount of each ROI. Thus, it is possible to recognize a distribution of the image feature amount of the entire original print image. For the image feature amount calculation unit 174, the image feature amount calculation unit 26 of the streak detection unit 110 or the image feature amount calculation unit 156 of the database setting unit 150 may be used in common.

The similar image search unit 176 (an example of search means) searches for the streak setting database 140 using the image feature amount of each region of the original print image calculated by the image feature amount calculation unit 174 as a query to acquire a streak determination condition of an image in which the distribution of the image feature amount of the entire image matches or is similar to the distribution of the image feature amount of the original print image.

Here, the image feature amount is multi-dimensional information such as color information or frequency information. When n is a dimension of the image feature amount, the feature amount of the original print image is $A=\{a1, a2, a3, \ldots, an\}$, and the feature amount of a comparative image is $B=\{b1, b2, b3, \ldots, bn\}$, an absolute value $w1\times|a1-b1|+w2\times|a2-b2|+w3\times|a3-b3|+\cdots+wn\times|an-bn|$ of a weight of a difference of each element $C=A-B=\{a1-b1, a2-b2, a3-b3, \ldots, an-bn\}$ being smaller than a predetermined reference value S is defined as "similar".

The similar image search unit 176 may display the acquired streak determination condition on a monitor or the like (not illustrated) so that the user can recognize the streak determination condition.

The streak setting unit 178 sets the streak determination condition acquired by the similar image search unit 176, for the streak detection unit 110. The streak detection unit 110 performs a streak detection process on the basis of the set streak determination condition. For the streak setting unit 178, the streak setting unit 160 of the database setting unit 150 may be used in common.

[Database Construction Method]

Figure 20:
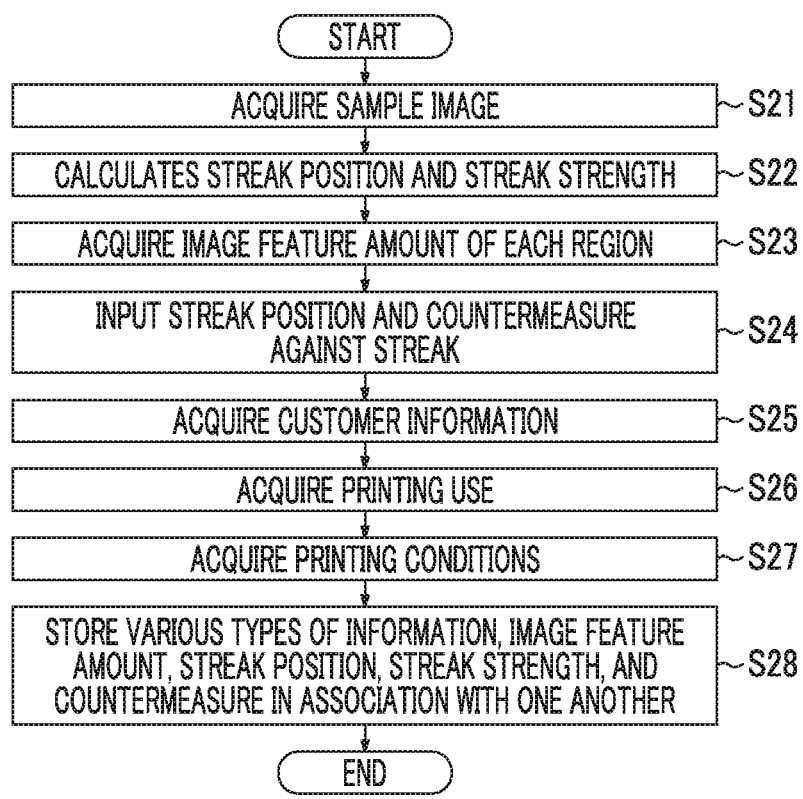
FIG. 20 is a flowchart illustrating a method of constructing a streak setting database.

A method of constructing the streak setting database 140 will be described with reference to FIG. 20.

First, the image reading unit 152 acquires a read image of a sample image with a streak that is a problem on image quality, which is claimed by a user (step S21).

Then, the streak evaluation unit 154 detects the streak from the read image of the sample image, and calculates a streak position and a streak strength (step S22).

Further, the image feature amount calculation unit 156 calculates an image feature amount of the read image of the sample image, and acquires a distribution of the image feature amount of the entire read image, and an image feature amount near the streak detected in the streak evaluation unit 154 (step S23). Here, a used color range in the entire image, a ratio of the character region and the image region, number and size of faces of persons, an area percentage of substantially uniform region, and identity within the image are used as the image feature amount, as illustrated in FIG. 21A. An aspect in which at least one of the used color range in the entire image, the ratio of the character region and the image region, the number and size of faces of persons, the area percentage of substantially uniform region, or the identity within the image is used as the image feature amount can be adopted.

Here, the area percentage of the substantially uniform region is a percentage of a solid region within an image. Further, the identity within the image is a percentage at which a region with the same feature is present in the image. For example, this percentage increases in a case where the same image is imposed plural times in one image.

Subsequently, the user inputs correspondence of pass or fail for the streak detected in the streak evaluation unit 154 from the streak indication unit 158 (step S24).

Further, the user inputs customer information, printing use, and printing conditions of the sample image from the streak indication unit 158 (steps S25, S26, and S27).

As illustrated in FIG. 21B, in this embodiment, the printing use is classified into, for example, three types including "catalog", "flyer", and "photo album" as large classification. Further, each of the large classification is classified into three types including "HI", "MID", and "LOW" in an order of descending demanded quality as medium classification. An aspect in which the large classification is classified into at least two of the types including "catalog", "flyer", and "photo album" as the printing use may be adopted.

Further, as illustrated in FIG. 21C, in this embodiment, the printing conditions are classified into, for example, a type and a thickness of paper. Here, the type of paper is classified into three types including "coated paper", "matte paper", and "semi-coated paper". Further, each paper is classified into three types including "thick", "normal", and "thin". An aspect in which at least one of the type or the thickness of the paper is used as the printing conditions may be adopted.

Finally, the streak setting unit 160 stores the streak position and the streak strength calculated by the streak evaluation unit 154, the distribution of the image feature amount of the entire image and the image feature amount near the streak acquired by the image feature amount calculation unit 156, and a countermeasure against the streak, the customer information, the printing use, and the printing conditions of the printed material input from the streak indication unit 158 in the streak setting database 140 in association with one another as the streak determination conditions.

The streak setting database 140 in which, by performing the above process on a plurality of sample images, the streak position and the streak strength, the image feature amount, the countermeasure against the streak, the customer information, the printing use, and the printing conditions are associated with one another and recorded as the streak determination conditions can be constructed.

[Streak Detection Method]

Next, a method of detecting a streak of a printed material using the streak detection device 100 (an example of an image defect detection method) will be described with reference to FIG. 22.

First, the original print image acquisition unit 12 acquires an original print image (step S31; an example of an image acquisition step). Subsequently, the RIP processing unit 14 performs an RIP processing on the acquired original print image. The comparative color space conversion unit 18b converts the original print image after the RIP processing into a color space (for example, L*a*b*space) for image comparison with the read image (step S32).

Then, the image feature amount calculation unit 26 divides the original print image subjected to the color space conversion into ROIs that are minimum analysis units, and acquires the image feature amount of each ROI (step S33; an example of a region division step, and an example of an image feature amount acquisition step). The image feature amount calculation unit 26 acquires hue, chroma, and brightness for color and a direction, contrast, and a frequency for a frequency component as the image feature amount of each ROI. These are classified as in the classification illustrated in FIG. 4.

Then, the processing time and expected value evaluation unit 28 calculates an image defect detection time (processing time) $T1_i$ indicating a time required to detect a streak of each ROI of the original print image, and an expected image defect value $E1_i$ indicating a possibility of presence of the streak (step S34). i is an identification number i (i=1 to N) for identifying each of n ROIs. The processing time $T1_i$ is calculated on the basis of a streak calculation complexity according to the image feature amount (visibility of image defect) of each ROI. A relationship between the image feature amount and the streak calculation complexity is stored as a table in advance. The expected image defect value $E1_i$ is calculated on the basis of the image feature amount (visibility of image defect) of each ROI.

The processing time and expected value evaluation unit 28 classifies the processing time $T1_i$ and the expected image defect value $E1_i$, similar to the classification illustrated in FIGS. 4F and 4G.

A table in which a combination of all of hue and chroma of color of seven levels, brightness of color of four levels, a direction of a frequency component of four levels, contrast of the frequency component of three levels, and a frequency of the frequency component of three levels that are the image feature amounts of each ROI are associated with the processing time $T1_i$ and the expected image defect value $E1_i$ may be included in the storage unit (not illustrated). In this case, the processing time and expected value evaluation unit 28 can read the processing time $T1_i$ and the expected image defect value $E1_i$ from this table according to the image feature amount of each ROI. As this table, the same table as the table illustrated in FIG. 5 can be used.

Next, the streak setting unit 178 of the streak search unit 170 sets the streak determination condition (step S35). A method of setting the streak determination conditions in this streak setting unit 178 will be described with reference to FIG. 23.

First, the original print image input unit 172 acquires the original print image subjected to RIP processing from the RIP processing unit 14 of the streak detection unit 110 (step S51; an example of an original print image acquisition step).

Then, the original print image input unit 172 acquires customer information of the printed material (step S52). This customer information is acquired by causing the user to input the customer information using input means (not illustrated).

Further, the original print image input unit 172 acquires printing use of the printed material on which the acquired original print image is printed (step S53). This printing use is acquired by causing the user to input the printing use using input means (not illustrated). The printing use is classified similarly to the classification in the streak setting database 140.

Further, the original print image input unit 172 acquires a printing condition of the printed material (step S54). This printing condition is acquired by causing the user to input the printing use using input means (not illustrated), and is classified similarly to the classification in the streak setting database 140.

Then, the image feature amount calculation unit 174 calculates an image feature amount of each ROI of the original print image, and calculates a distribution of the image feature amount of the entire original print image (step S55; an example of an image feature amount analysis step). For the image feature amount, the same image feature amount as the image feature amount in the streak setting database 140 is used.

Subsequently, the similar image search unit 176 searches for the streak setting database 140 using the client information, the printing use, and the print condition acquired in the original print image input unit 172, and the image feature amount for each region of the original print image calculated by the image feature amount calculation unit 174 as a query, and acquires a streak determination condition of the image of which the customer information, the printing use, the printing condition, the color range, the ratio of the character region and the image region, the number and size of faces of persons, the area percentage of the substantially uniform region, and the distribution of the identity within the image match those of the original print image (S56; an example of step of a search step). In a case where there is no image satisfying the conditions in the streak setting database 140, the similar image search unit 176 acquires a streak determination condition of an image with the most similar conditions. When a degree of similarity is determined, any condition among the customer information, the printing use, the print conditions, the color range, the ratio of the character region and the image region, the number and size of faces of persons, the area percentage of substantially the uniform region, and the distribution of the identity within the image may be prioritized or weighted.

Finally, the streak determination condition acquired in step S36 is set in the streak setting unit 178 (step S57). The set streak determination condition is input to the streak determination unit 34 of the streak detection unit 110.

Referring back to FIG. 22, the image reading unit 16 reads the printed material that is a streak detection target to acquire the read image (step S36; an example of an image acquisition step). The comparative color space conversion unit 18a converts this read image into a color space (for example, L*a*b*space) for image comparison with the original print image (step S37).

Further, the image alignment unit 20 performs an alignment process on the original print image subjected to the color space conversion in step S12 and the read image subjected to the color space conversion in step S37, and the variation correction unit 22 removes a variation of the pixel signal at a low frequency caused by reading from the read image after the alignment process (step S38).

Then, the image comparison unit 24 divides the original print image and the read image after the alignment into ROIs and calculates an intensity (differential image contrast) of a differential signal between corresponding pixels of each ROI (step S39; an example of a region division step and an example of a differential strength extraction step). Here, the intensity of the differential signal is a square sum of a difference between pixels since the differential signal between pixels includes a positive or negative sign. The image comparison unit 24 performs the same classification as the classification illustrated in FIG. 6A on the differential image contrast.

Then, the processing time and expected value evaluation unit 28 calculates an image defect detection time (processing time) $T2_i$ indicating a time required to detect a streak and an expected image defect value $E2_i$ indicating a possibility of presence of the streak, of each ROI of the read image, on the basis of the intensity (differential image contrast) of the differential signal calculated by the image comparison unit 24 (step S40). The processing time and expected value evaluation unit 28 classifies the processing time T2i and the expected image defect value E2i similarly to the classification illustrated in FIGS. 6B and 6C.

The processing time and expected value evaluation unit 28 may include, in a storage unit (not illustrated), a table in which the processing time $T2_i$ is associated with the expected image defect value $E2_i$ as illustrated in FIG. 5, for the differential image contrast of five levels of each ROI.

Here, the processing time and expected value evaluation unit 28 adjusts the processing time $T2_i$ or the expected image defect value $E2_i$ to be assigned to each differential image contrast according to a previously input streak determination criterion. That is, in a case where the streak determination criterion is "severe", "sweet", and "normal", the processing time $T2_i$ and the expected image defect value $E2_i$ are assigned as illustrated in FIGS. 7A, 7B, and 7C.

Subsequently, the processing time and expected value evaluation unit 28 calculates a final (total) processing time $T_i$ and expected image defect value $E_i$ from the processing time $T1_i$ and the expected image defect value $E1_i$ for each ROI based on the image feature amount calculated in step S34 and the processing time $T2_i$ and the expected image defect value $E2_i$ for each ROI based on the differential signal calculated in step S40 (step S41; an example of an image defect detection time calculation step and an example of an expected image defect value calculation step).

For example, if color hue and chroma of color of any ROI is "low chroma", brightness of the color is "0 to 20", a direction of a frequency component is "None", contrast of the frequency component is "low (less than 0.1)", and a frequency of the frequency component is "low (less than 0.25 cycle/mm)", the processing time $T1_i$ is classified into "E: short" and the expected image defect value $E1_i$ is classified into "I: high", as illustrated in FIG. 5.

Further, in a case where the streak determination criterion of this ROI is "normal" and the differential image contrast is "C: normal", the processing time $T2_i$ is classified into "A: long" and the expected image defect value $E2_i$ is classified into "III: normal", as illustrated in FIG. 7C.

The processing time and expected value evaluation unit 28 sets the total processing time $T_i$ of this ROI to the longer of "E: short" of the processing time T1i and "A: long" of the processing time $T2_i$, and the total expected image defect value $E_i$ to a product "I×III" of $E1_i$ and $E2_i$.

Similarly, the processing time $T_i$ and the expected image defect value $E_i$ are calculated for all ROIs.

Then, the determination region priority assignment unit 30 assigns a priority for performing a streak determination process on each ROI of the read image (step S42; an example of an image defect detection order determination step). In this embodiment, a higher priority is assigned to the ROI in which the total expected image defect value $E_i$ of each ROI calculated in step S41 is greater (an example of an order of a descending expected image defect value).

Further, a quotient obtained by dividing the expected image defect value $E_i$ by the processing time $T_i$, that is, an image defect detection efficiency $V_i=E_i/T_i$ that is an expected image defect value per unit processing time may be calculated and a higher priority may be assigned to the ROI in which this image defect detection efficiency $V_i$ is higher.

The determination region setting unit 32 sets the ROI on which the streak determination unit 34 performs a streak determination among all the ROIs of the read image, on the basis of this priority (step S43).

The streak determination unit 34 sequentially performs the streak determination on the ROIs set in the determination region setting unit 32 on the basis of the streak determination condition set in the streak setting unit 178 of the streak search unit 170 (step S44; an example of an image defect detection step). Here, the determination region setting unit 32 measures a time from the start of the streak determination process using the timer 32-1. In a case where a test time has elapsed from the start of the streak determination process, the streak determination process in the streak determination unit 34 is caused to end. This test time is determined from, for example, a period in which the printed material is printed in the printing job in advance. Therefore, in the ROI on which the streak determination process is performed in the streak determination unit 34, a sum total $\Sigma E_i$ of expected image defect values $E_i$ is maximal and a total sum $\Sigma T_i$ of the processing times $T_i$ is equal to or less than the test time.

A streak determination result in the streak determination unit 34 is integrated in the streak determination integration unit 36, and the streak determination integration unit 36 determines a streak evaluation and a streak position of the printed material of the read image. The pass and fail determination unit 38 determines whether the printed material of the read image passes and fails on the basis of the integrated streak information (step S45). Although it is determined whether the printed material passes or fails on the basis of the integrated streak information in this embodiment, an aspect in which it is determined whether a printed material of the read image is a fail product at a point in time at which the streak is detected in the streak determination process of the streak determination unit 34 can be realized.

Further, the pass and fail determination unit 38 determines whether or not the streak determination process has been performed on all printed materials of the printing job (step S46). In a case where there is the printed material on which the streak determination process has not been performed, the process returns to step S36 in which the same process is performed. In a case where the streak determination process had ended for all the printed materials, the process proceeds to step S47.

Finally, the database setting unit 150 updates the database. Here, the streak setting unit 160 records the original print image acquired in step S51, the customer information acquired in step S52, the printing use acquired in step S53, the printing condition acquired in step S54, the image feature amount acquired in step S55, the strength of the streak determined in step S44, and the pass and fail determination for the printed material in step S45 in association with one another in the streak setting database 140 as the streak determination condition (step S47), and ends the process. The streak setting unit 160 may record at least the image feature amount, the strength of the streak, and the pass and fail determination for the printed material in association with one another.

Thus, according to this embodiment, since the streak setting database is searched for using the image feature amount of the original print image as a query to acquire the streak determination condition, and the streak determination process is performed on the basis of the acquired streak determination condition, it is possible to set an optimum condition corresponding to the printed material (original print image). Further, it is possible to further improve the accuracy of the streak setting database by updating the streak setting database in association with the information on the read image subjected to the streak determination process.

Sixth Embodiment

Even when some of functions of the streak detection device 100 are disposed in the server, it is possible to set optimal detection conditions corresponding to the printed material and perform the streak detection.

The streak detection system 190 illustrated in FIG. 24 includes a streak detection device 192 and a server 194. The same portions as in the streak detection device 100 illustrated in FIG. 16 are denoted with the same reference numerals, and detailed description thereof will be omitted.

The streak detection device 192 includes a streak detection unit 110, a database setting unit 150, a streak search unit 170, and a control unit 180. Further, the server 194 includes a streak setting database 140.

The streak detection device 192 and the server 194 are connected so that the streak detection device 192 and the server 194 can communicate over a network such as a LAN or a WAN, and can perform the same process as the streak detection device 100 by performing transmission and reception of information using a predetermined protocol. Therefore, it is possible to set optimal detection conditions according to the printed material and perform streak detection.

Figure 25:
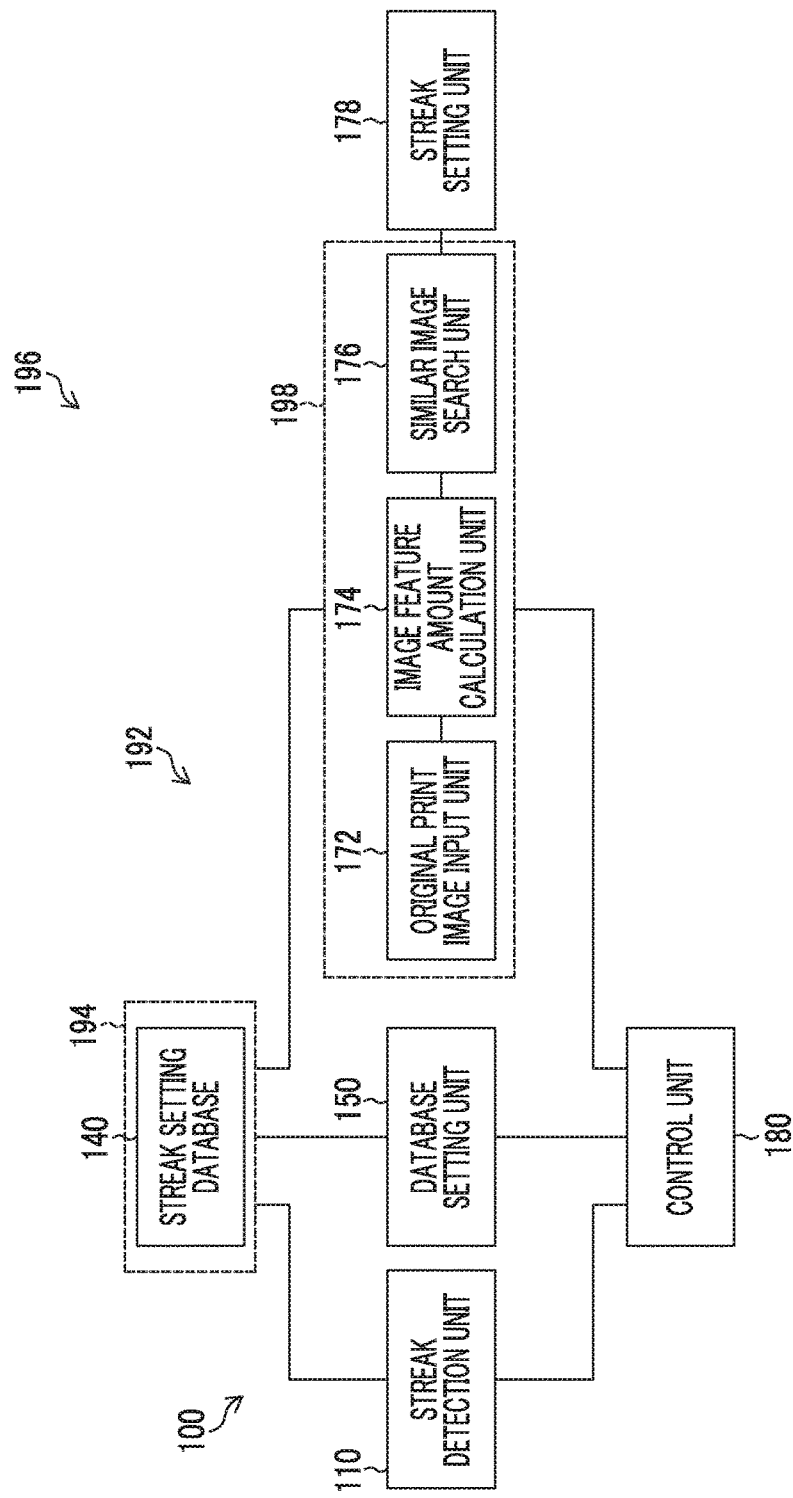
FIG. 25 is a block diagram illustrating a schematic configuration of the streak detection system.

Further, the streak detection system 196 illustrated in FIG. 25 includes a streak detection device 192, a server 194, and a server 198.

The streak detection device 192 includes a streak detection unit 110, a database setting unit 150, a streak setting unit 178, and a control unit 180. The server 194 includes a streak setting database 140, and the server 198 includes an original print image input unit 172, an image feature amount calculation unit 174, and a similar image search unit 176. Even in a case where such a configuration is adopted, it is possible to set the optimal detection condition according to printed material and perform streak detection.

Although one streak detection device 192 has been described for one server 194 in FIGS. 24 and 25, a plurality of streak detection devices 192 may be configured to access one server 194, and the plurality of streak detection devices 192 may share the streak setting database 140. Accordingly, it is possible to improve accuracy of the database and improve use efficiency.

Similarly, although one streak detection device 192 has been described for one server 198 in FIG. 25, a plurality of streak detection devices 192 may be configured to access one server 198, and the plurality of streak detection devices 192 may share the streak original print image input unit 172, the image feature amount calculation unit 174, and the similar image search unit 176. Accordingly, it is possible to set optimal streak determination conditions according to the printed material and perform the streak determination while downsizing the streak detection device 192.

In the streak detection device, an aspect in which some functions are caused to be performed by the server is not limited to the example illustrated in FIGS. 24 and 25, and functions to be performed by the server may be appropriately determined.

Further, the streak detection device 100 or the streak detection system 190 or 196 can constitute a printer in combination with various printing means.

Seventh Embodiment

A streak detection device 300 (an example of an image defect detection device) according to a seventh embodiment generates a streak-added image (artificial simulation sample) obtained by intentionally adding a streak to an original print image that is image data to be printed, acquires a result of a determination as to whether a streak of a printed material on which the streak-added image is printed is an image defect allowable in a printed material, and sets the streak detection conditions of the original print image from the image feature amount of the position of the streak and the determination result.

[Entire Configuration of Streak Detection Device]

Figure 26:
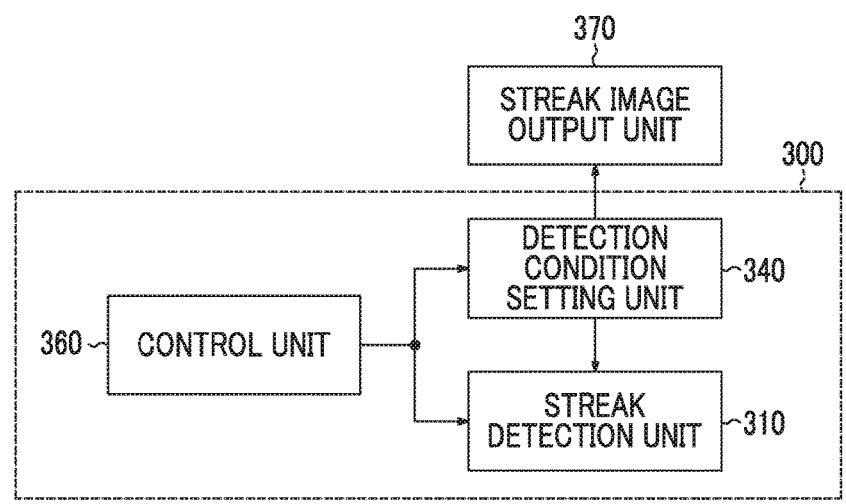
FIG. 26 is a block diagram illustrating a schematic configuration of the streak detection device.

As illustrated in FIG. 26, the streak detection device 300 includes a streak detection unit 310, a detection condition setting unit 340, and a control unit 360. Further, the streak detection device 300 is connected to the streak image output unit 370 outside the device.

The streak detection unit 310 compares the original print image with the read image of the printed material printed on the basis of the original print image to detect the streak of the printed material. The detection condition setting unit 340 sets the streak determination condition of the original print image on the basis of the determination result of the printed material of the streak-added image obtained by intentionally adding the streak to the original print image.

The control unit 360 controls all of the streak detection unit 310 and the detection condition setting unit 340.

Further, the streak image output unit 370 includes a printer, and prints a streak-added image generated in the detection condition setting unit 340 and outputs a printed material (streak image) on which the streak-added image is printed.

[Configuration of Streak Detection Unit]

Figure 27:
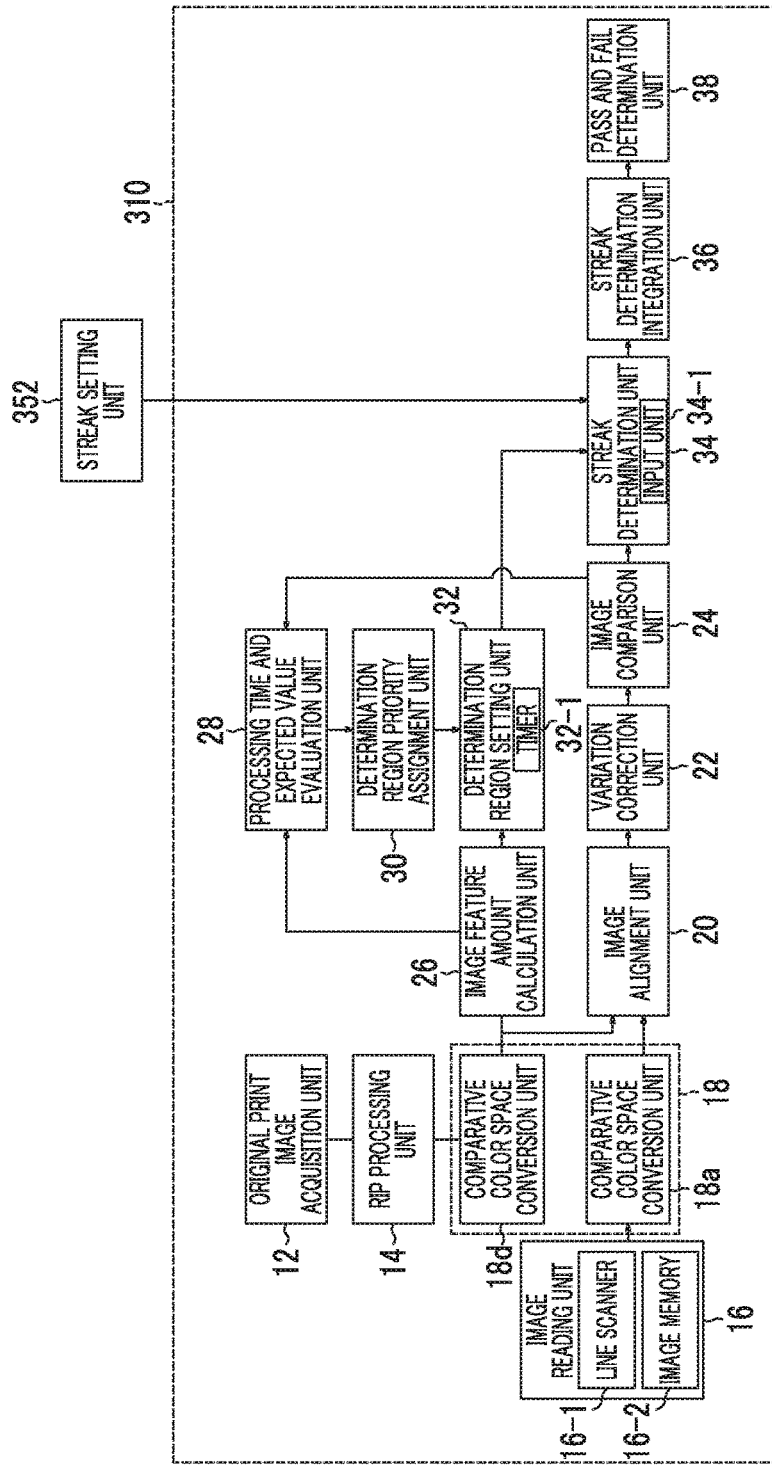
FIG. 27 is a block diagram illustrating a schematic configuration of the streak detection unit.

FIG. 27 illustrates a configuration of the streak detection unit 310. The same portions as in the FIG. 17 are denoted with the same reference numerals, and detailed description thereof will be omitted. As illustrated in FIG. 27, the streak detection unit 310 is configured similarly to the streak detection device 110 illustrated in FIG. 17.

The streak determination unit 34 (an example of image defect detection means) of the streak detection unit 310 performs a streak determination process on the ROI output in the determination region setting unit 32 for the read image. This streak determination process is performed on the basis of the streak determination condition set in the streak setting unit 352 of the detection condition setting unit 340 which will be described below.

[Configuration of Detection Condition Setting Unit]

Figure 28:
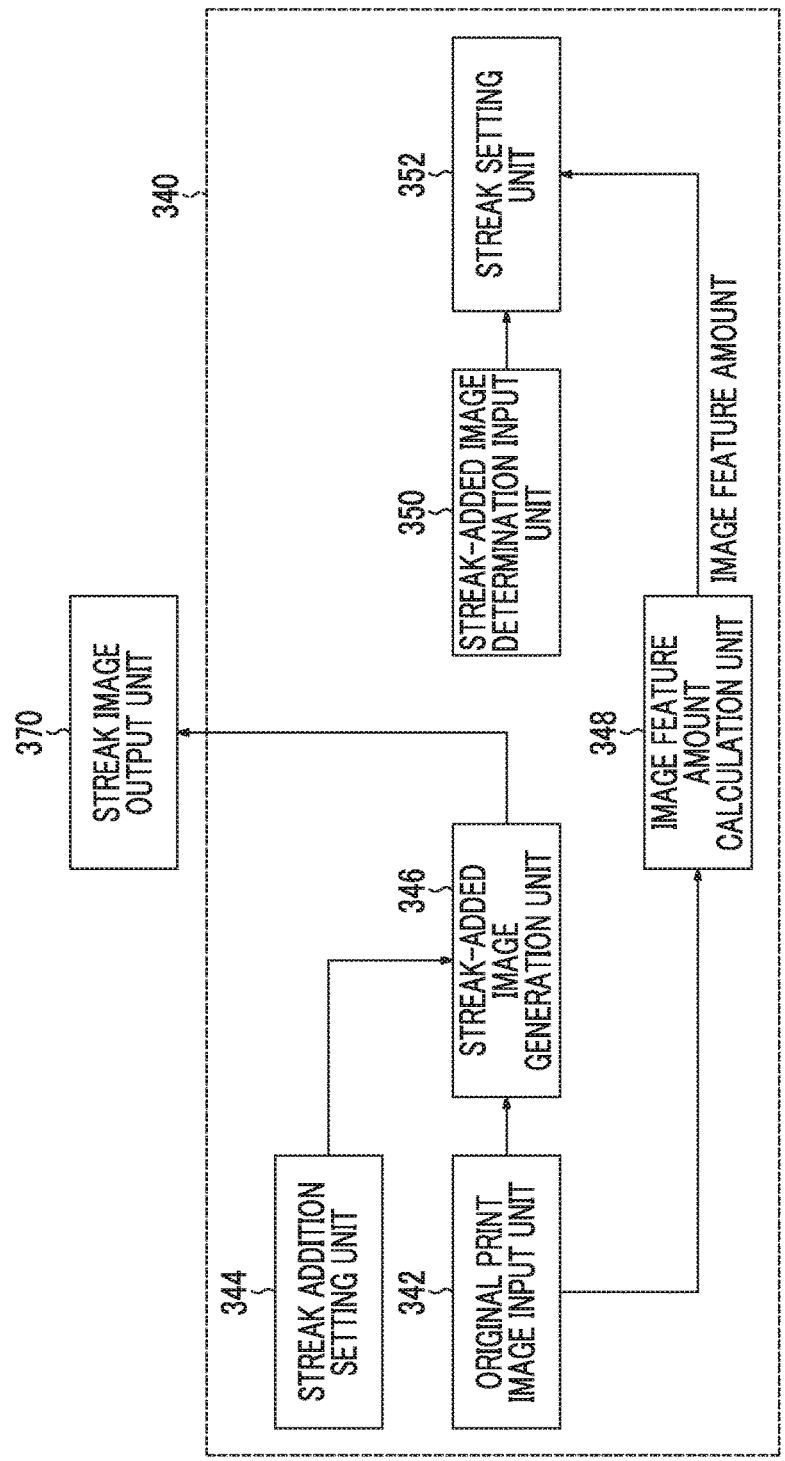
FIG. 28 is a block diagram illustrating a schematic configuration of a detection condition setting unit.

As illustrated in FIG. 28, the detection condition setting unit 340 includes an original print image input unit 342, a streak addition setting unit 344, a streak-added image generation unit 346, an image feature amount calculation unit 348, a streak-added image determination input unit 350, and a streak setting unit 352.

The original print image input unit 342 is input means for acquiring an original print image of the printing job which is a target of the streak detection process. Here, the original print image subjected to the RIP processing is acquired from the RIP processing unit 14 of the streak detection unit 310. Further, the original print image input unit 342 includes input means such as a keyboard, a mouse, or a touch panel (all not illustrated), and printing use or a printing condition of the original print image is input by the user. For the original print image input unit 342, the original print image acquisition unit 12 of the streak detection unit 310 may be used in common.

The streak addition setting unit 344 (an example of image defect addition setting means) is an input means for setting a strength, a length, and an added position of the streak that the user intentionally adds to the original print image. The streak addition setting unit 344 includes, for example, a monitor (not illustrated) that displays the original print image, and a keyboard, a mouse, or a touch panel (all not illustrated) that inputs a strength (color and thickness), a length, and a position of the streak.

The streak-added image generation unit 346 (an example of defect-added image generation means) generates a streak-added image obtained by adding the streak with the strength, length, and position set in the streak addition setting unit 344 to the original print image acquired in the original print image input unit 342. The streak-added image generated by the streak-added image generation unit 346 is input to the streak image output unit 370 outside the streak detection device 300. The streak image output unit 370 prints the streak-added image on a printing medium using a print head (not illustrated) and outputs the printing medium as a printed material. The streak image output unit 370 generates a large dot at the position at which the streak is added to add a black streak in the print head and generates a small dot at the position to add a white streak.

The image feature amount calculation unit 348 (an example of image feature amount acquisition means) calculates the image feature amount of each region of the original print image. For example, the image feature amount calculation unit 348 divides the original print image into ROIs that are minimum analysis units, and calculates the image feature amount of each ROI. Thus, it is possible to recognize a distribution of the image feature amount of the entire original print image. For the image feature amount calculation unit 348, the image feature amount calculation unit 26 of the streak detection unit 310 may be used in common.

The streak-added image determination input unit 350 (an example of determination result acquisition means) is input means to which a result of a determination as to whether the added streak is an image defect allowable in a printed material, and includes, for example, a keyboard or a mouse, and a touch panel (all not illustrated). The user views the printed material of the streak-added image printed by the streak image output unit 370 and inputs the result of a determination as to whether the added streak is an image defect allowable in a printed material.

The streak setting unit 352 (an example of detection condition setting means) sets the streak determination condition for the original print image (an example of a detection condition) on the basis of the image feature amount of the original print image acquired in the image feature amount calculation unit 348 and the information indicating whether the added streak is an image allowable in the printed material, which is acquired in the streak-added image determination input unit 350. For example, the image feature amount and the information indicating whether the added streak is the allowable image are stored as a table in association with each other.

[Streak Determination Condition Setting Method]

Figure 29:
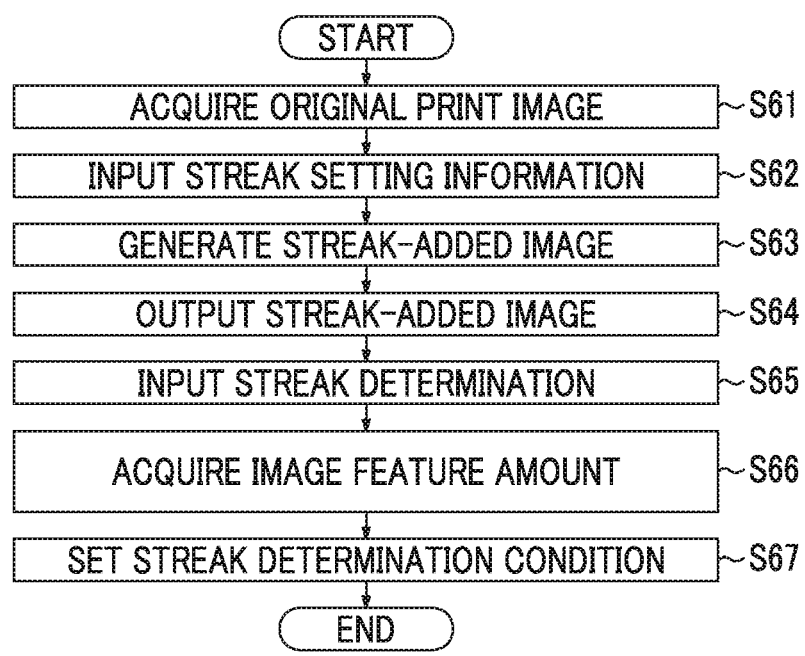
FIG. 29 is a flowchart illustrating a method of setting streak determination conditions of the detection condition setting unit.

A method of setting the streak determination conditions in the detection condition setting unit 340 will be described with reference to FIG. 29.

First, the original print image input unit 342 acquires the original print image subjected to the RIP processing from the RIP processing unit 14 of the streak detection unit 310 (step S61). Further, the user sets a strength, length, and position of the streak to be added to the original print image from the streak addition setting unit 344 (S62; an example of step of an image defect addition setting step).

Figure 30:
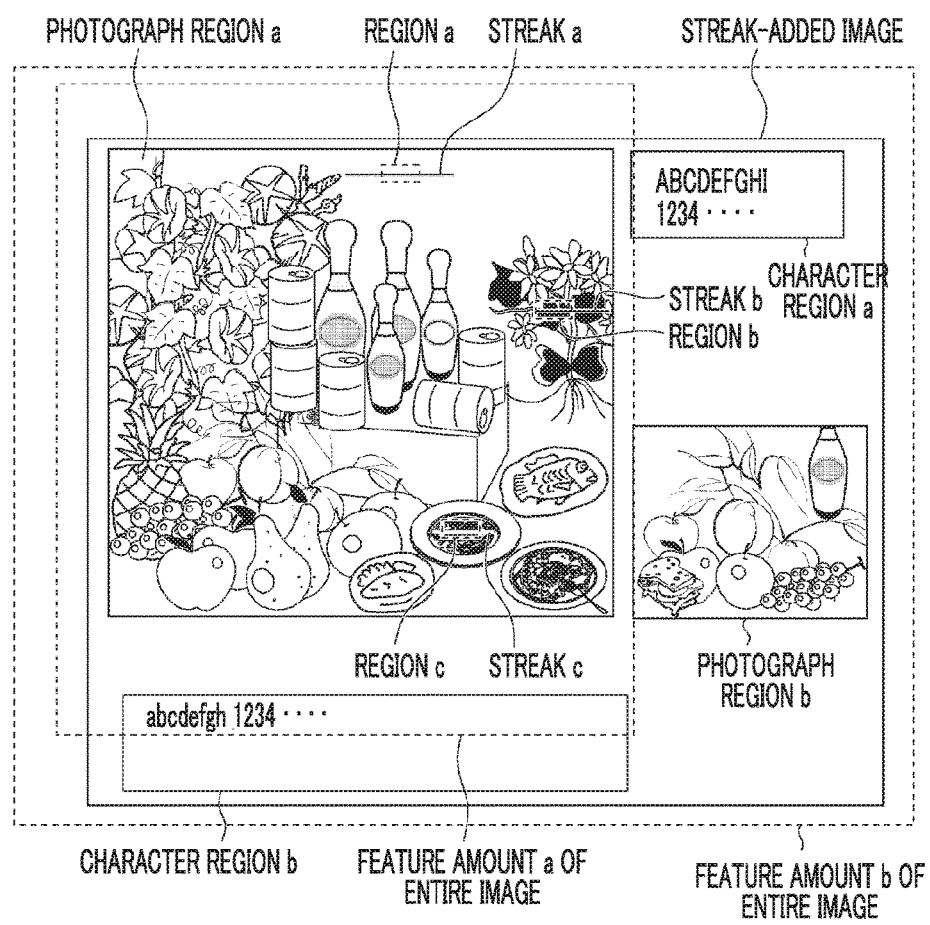
FIG. 30 is a diagram illustrating an example of a streak-added image.

Then, the streak-added image generation unit 346 generates the streak-added image obtained by adding the streak with the strength and length acquired in step S2 at a position acquired in the same step S2 to the original print image acquired in step S1 (step S63; an example of defect-added image generation step). FIG. 30 illustrates an example of the streak-added image. This streak-added image includes a photograph region a, a photograph region b, a character region a, and a character region b, and three streaks including a streak a that is a black streak, a streak b that is a black streak, and a streak c that is a white streak are added to the photographic region a.

Then, the streak-added image is printed and a printed material on which the streak-added image is printed is output in the streak image output unit 370 (step S64). The user views the printed material of the streak-added image output in step S64, and inputs whether the added streak is an image defect allowable in the printed material using the streak-added image determination input unit 350. The streak setting unit 352 acquires the determination result (step S65; an example of the determination result acquisition step). In the example of the streak-added image illustrated in FIG. 30, it is input whether the streak a, the streak b, and the streak c are allowable.

On the other hand, the image feature amount calculation unit 348 divides the original print image into ROIs that are minimum analysis units, and acquires the image feature amount of each ROI (step S66; an example of an image feature amount acquisition step). The image feature amount calculation unit 348 acquires hue, chroma, and brightness for color and a direction, contrast, and a frequency for a frequency component as the image feature amount of each ROI.

The image feature amount calculation unit 348 classifies hue and chroma of color into seven levels including "low chroma", "medium-high chroma, cyan", "medium-high chroma, magenta", "medium-high chroma, yellow", "medium-high chroma, red", "medium-high chroma, green", and "medium-high chroma, blue" according to a viewing rate of the streak, as illustrated in FIG. 4A. Further, the image feature amount calculation unit 348 classifies the brightness of the color into four levels including "0 to 20", "20 to 40", "40 to 60", and "60 or more" according to a viewing rate of the streak, as illustrated in FIG. 4B.

Further, the image feature amount calculation unit 348 classifies the direction of the frequency component into four levels including "−22.5 to 22.5°", "22.5 to 67.5°", "67.5 to 112.5°", and "none" according to a viewing rate of the streak, as illustrated in FIG. 4C. The direction of the frequency component indicates an angle in a case where a horizontal direction when an image or a character of a printed material is in a normal viewing direction is set to 0°. Further, the classification is similarly performed even when the direction of the frequency component is rotated by 180 degrees.

Further, the image feature amount calculation unit 348 classifies the contrast into three levels including "low" (less than 0.1 when expressed as a value from a minimum value 0 to a maximum value 1), "medium" (0.1 to 0.25), and "high" (0.25 or more) according to the viewing rate of the streak, as illustrated in FIG. 4D. Further, the image feature amount calculation unit 348 classifies the frequency into three levels including "low (less than 0.25 cycle/mm)", "medium (0.25 to 1 cycle/mm)", and "high (1 cycle/mm or more) according to the viewing rate of the streak, as illustrated in FIG. 4E.

The image feature amount calculation unit 348 acquires an image feature amount of a region a to which a streak a is added, an image feature amount of a region b to which a streak b is added, and an image feature amount of a region c to which a streak c is added, on the basis of the image feature amount of each ROI. Further, the image feature amount calculation unit 348 acquires an image feature amount a of a wide range of the region a, the region b, and the region c, and an image feature amount b of the entire original print image.

Finally, the streak setting unit 352 sets the streak determination condition on the basis of the result of the determination as to whether the added streak acquired in step S65 is an image defect allowable in the printed material, and the image feature amount of the original print image acquired in step S66 (step S67; an example of a detection condition setting step). For example, the streak determination condition is determined for a combination of respective classifications of hue, chroma, and brightness for color illustrated in FIG. 4, and a direction, contrast, and a frequency for a frequency component.

In a case where the streak determination condition is set for another position of the original print image, the streak addition setting unit 344 may designate strength, a length, and a position of the streak to generate a new streak-added image, and perform the same process.

Thus, since the image obtained by intentionally adding the streak to the original print image is generated and output as the printed material, the user is caused to determine whether or not the streak added on the basis of the printed material is allowable in the printed material, and the streak determination condition is set on the basis of the determination result and the image feature amount at the position at which the streak is added, it is possible to appropriately set the streak determination conditions that are used for the streak determination process of the printed material on which the original print image is printed. Thus, it is possible to appropriately perform the streak determination process of the printed material on which the original print image is printed.

Eighth Embodiment

Figure 31:
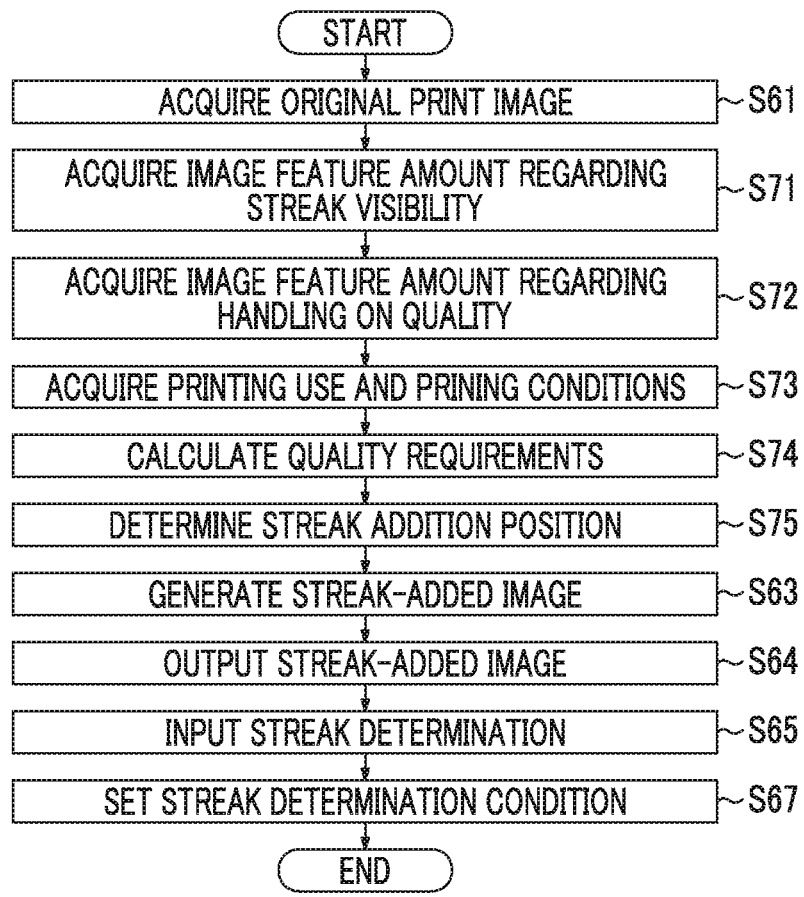
FIG. 31 is a flowchart illustrating a method of setting streak determination conditions of the detection condition setting unit.

A method of setting the streak determination condition according to an eighth embodiment will be described with reference to FIG. 31. The same portions as in the flowchart illustrated in FIG. 29 are denoted with the same reference numerals, and detailed description thereof will be omitted. In the eighth embodiment, the quality level (streak quality requirement) indicating the degree of quality required for the printed material is calculated according to features of the original print image, and the position at which the streak is added is determined according to the streak quality requirement.

First, the original print image input unit 342 acquires the original print image (step S61).

Then, the image feature amount calculation unit 348 (an example of analysis means) acquires the image feature amount in a point of view of the streak visibility of each ROI of the original print image, and evaluates a visibility level indicating a degree of visibility of the streak at each position of the original print image (step S71). Here, hue, chroma, brightness, and a direction, contrast, and a frequency of a frequency component illustrated in FIG. 4 are used as the image feature amount in a point of view of the streak visibility.

Then, the image feature amount calculation unit 348 acquires the image feature amount in a point of view regarding handling on quality of the streak (an image feature amount in which a value of the printed material is changed according whether or not there is a streak), and evaluates the entire image of the original print image (step S72).

As the image feature amount, a used color range, a ratio of the character region and the image region, the number and size of faces of persons, an area percentage of a substantially uniform region, and an identity within an image in the entire image are used, as illustrated in FIG. 32A. An aspect in which at least one of the used color range, the ratio of the character region and the image region, the number and size of faces of persons, the area percentage of a substantially uniform region, or the identity within an image in the entire image is used as the image feature amount may be adopted.

Here, the area percentage of the substantially uniform region is a percentage of a solid region within an image. Further, the identity within the image is a percentage at which a region with the same feature is present in the image. For example, this percentage increases in a case where the same image is imposed plural times in one image.

Further, although the entire image of the original print image has been evaluated, a wide range of region that is a primary region of the original print image may be evaluated. For example, a wide range of image feature amount illustrated in FIG. 30 may be used.

Then, the streak setting unit 352 acquires the printing use and printing conditions of the printed material on which the original print image is printed (step S73). The printing use and the printing conditions may be input by the user in the input means of the original print image input unit 342 or may be acquired from another input means (not illustrated) as additional information (printing job information) of the original print images.

As illustrated in FIG. 32B, the printing use is classified into, for example, three types including "catalog", "flyer", and "photo album" as large classification. Further, each of the large classification is classified into three types including "HI", "MID", and "LOW" in an order of descending demanded quality as medium classification. An aspect in which the large classification is classified into at least two of the types including "catalog", "flyer", and "photo album" as the printing use may be adopted.

Further, as illustrated in FIG. 32C, the printing conditions are classified into, for example, a type and a thickness of paper. Here, the type of paper is classified into three types including "coated paper", "matte paper", and "semi-coated paper". Further, each paper is classified into three types including "thick", "normal", and "thin". An aspect in which at least one of the type or the thickness of the paper is used as the printing conditions may be adopted.

Then, the streak setting unit 352 (an example of required quality level acquisition means) calculates a quality level (streak quality requirement) indicating a degree of quality required in the printed material on which the original print image is to be printed, on the basis of the image feature amount regarding handling on the quality of the streak acquired in step S72 and the printing use and the printing conditions acquired in step S73 (step S74). Here, the streak quality requirement is classified into five levels including "I: high", "II: slightly high", "III: normal", "IV: slightly low", and "V: low", as illustrated in FIG. 32D.

For example, in the case of a ratio of the character region and the image region of the image feature amount, it is considered that the streak quality requirement is high on the side of a high image region percentage. Further, it is considered that, for the printing use, a photo book has a higher streak quality requirement than a flyer. Further, it is considered that, for the printing conditions, a thick paper has a higher streak quality requirement than a thin paper. Therefore, the streak quality requirements are classified into five levels in consideration of these factors.

The streak quality requirement may be calculated on the basis of at least one of the image feature amount regarding handling on quality of the streak, the printing use, or the printing conditions.

Further, the streak setting unit 352 determines the position of the original print image at which a streak is added, on the basis of the streak quality requirement and the visibility level of each position calculated in step S71 (step S75). Here, the position at which the streak is added is set to a position at which the visibility level is lower (position at which it is difficult to view the streak) when the streak quality requirement is higher, and the position at which the streak is added is set to a position at which the visibility level is higher (position at which it is easy to view the streak) when the streak quality requirement is lower. That is, in a case where the quality requirement is a first quality level, a position of the first visibility level in the original print image is set as the position of the streak, and in a case where the required quality requirement is a second quality level relatively lower than the first quality level, a position of the second visibility level relatively higher than the first visibility level in the original print image is set as the position of the streak.

For example, in a case where the streak quality requirement is "I: high", a position at which the visibility of the streak is relatively low is set. Further, in a case where the streak quality requirement is "II: slightly high", a position at which the visibility of the streak is relatively slightly low is set. On the contrary, in a case where the streak quality requirement is "V: low", a position at which the visibility of the streak is relatively high is set. Further, in a case where the streak quality requirement is "IV: slightly low", a position at which the visibility of the streak is relatively slightly high is set.

Thus, the streak image in which the streak is added at the determined streak position is generated (step S63) and output as a printed material (step S64). The user views this printed material and inputs whether the added streak is an image defect allowable in the printed material using the streak-added image determination input unit 350 (step S65).

Finally, the streak setting unit 352 sets the streak determination condition on the basis of the result of the determination as to whether the added streak acquired in step S65 is an image defect allowable in the printed material, and the image feature amount of the original print image acquired in step S71 (step S67).

Thus, the position at which a streak is added is set as a position at which the streak visibility is lower when the streak quality requirement is higher, and the position at which a streak is added is set as a position at which the streak visibility is higher when the streak quality requirement is lower. Accordingly, when the streak quality requirement is high, the streak determination condition is set to a streak difficult to view, and when the streak quality requirement is low, the streak determination condition is set to a streak easy to view.

Ninth Embodiment

A streak detection device 302 (an example of an image defect detection device) according to a ninth embodiment acquires a result of a determination as to whether a streak of a printed material on which a chart image is printed is an image defect allowable in a printed material, and sets the streak detection conditions from the image feature amount of the position of the streak and the determination result.

[Entire Configuration of Streak Detection Device]

Figure 33:
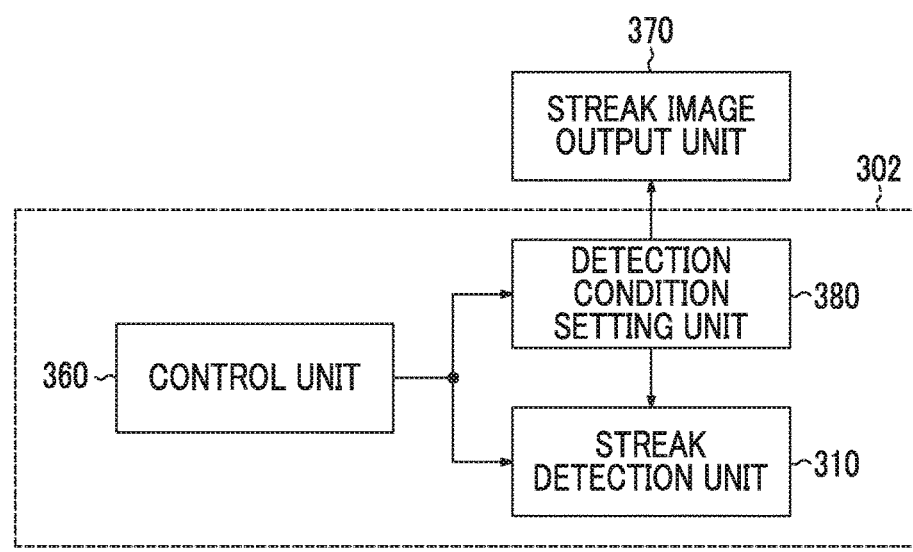
FIG. 33 is a block diagram illustrating a schematic configuration of a streak detection device.

As illustrated in FIG. 33, the streak detection device 302 includes a streak detection unit 310, a control unit 360, and a detection condition setting unit 380. The streak detection unit 310 and the control unit 360 have the same configuration as the streak detection unit 310 and the control unit 360 of the streak detection device 300.

[Configuration of Detection Condition Setting Unit]

Figure 34:
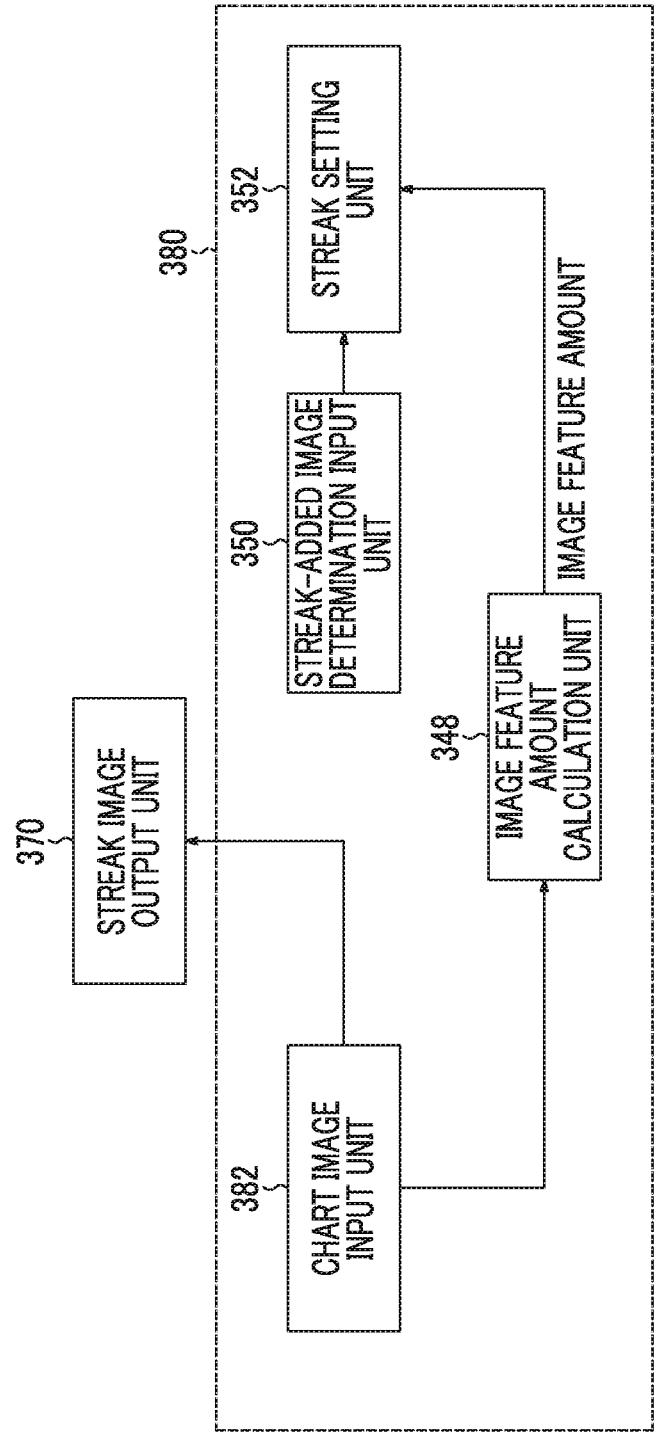
FIG. 34 is a block diagram illustrating a schematic configuration of a detection condition setting unit.

As illustrated in FIG. 34, the detection condition setting unit 380 according to the eighth embodiment includes an image feature amount calculation unit 348, a streak-added image determination input unit 350, a streak setting unit 352, and a chart image input unit 382.

The image feature amount calculation unit 348 has the same configuration as the streak-added image determination input unit 350, and the streak setting unit 352 has the same configuration as the image feature amount calculation unit 348, the streak-added image determination input unit 350, and the streak setting unit 352 of the detection condition setting unit 340.

The chart image input unit 382 is acquisition means for acquiring a chart image to which a streak is added at a predetermined position and strength. Here, the chart image is stored in a memory (not illustrated), and the chart image input unit 382 functions as reading means for reading the chart image from the memory. The chart image input unit 382 outputs the acquired chart image to the streak image output unit 370 outside the streak detection unit 302.

[Streak Determination Condition Setting Method]

Figure 35:
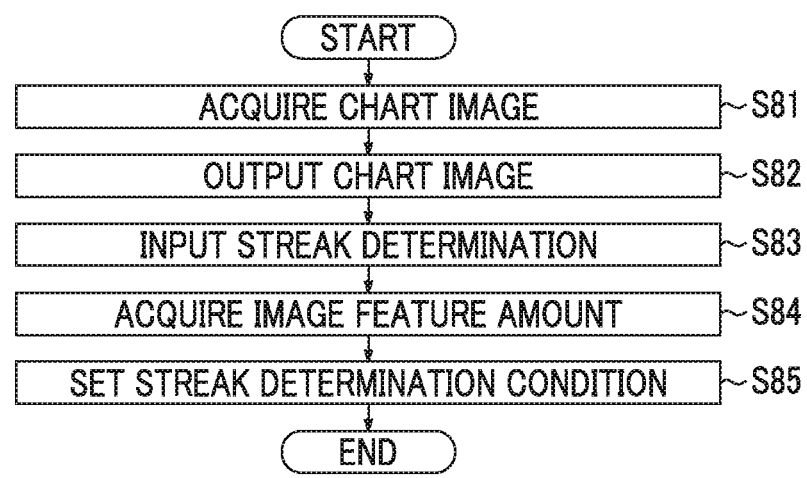
FIG. 35 is a flowchart illustrating a method of setting streak determination conditions of the detection condition setting unit.

A method of setting the streak determination condition in the detection condition setting unit 380 will be described with reference to FIG. 35.

First, the chart image input unit 382 acquires the chart image (step S81). Here, the chart image input unit 382 reads the chart images stored in the memory (not illustrated) as described above.

Figure 36:
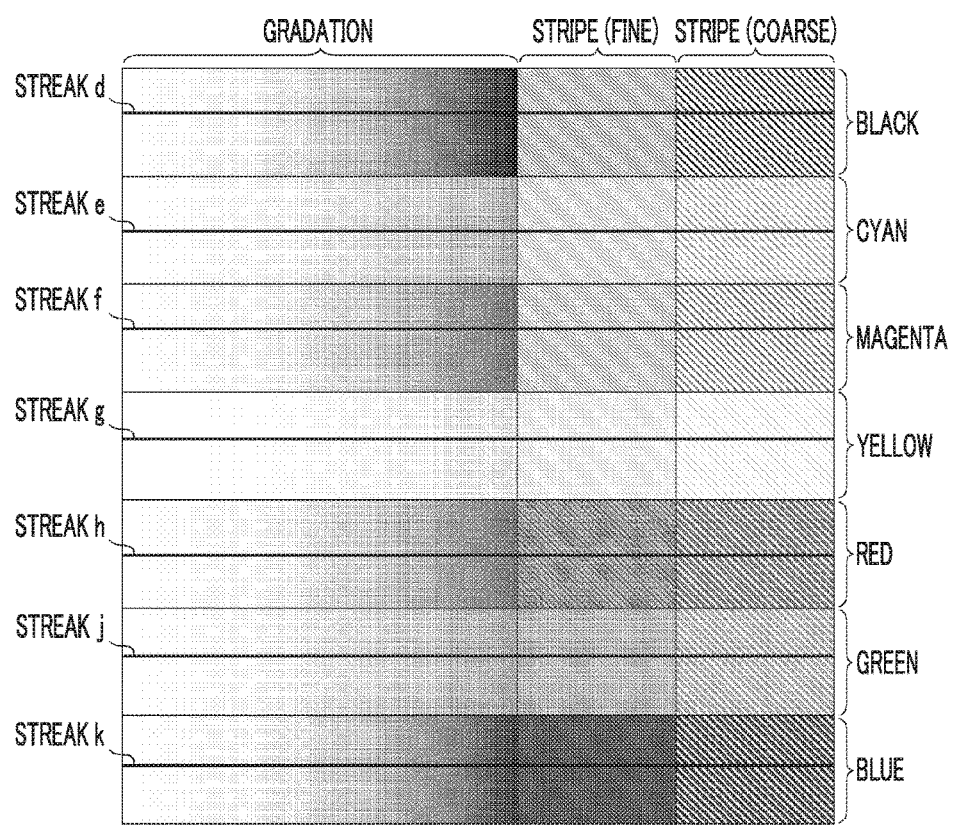
FIG. 36 is a diagram illustrating an example of a chart image.

As illustrated in FIG. 36, the chart image includes regions of respective colors including black (low chroma), cyan, magenta, yellow, red, green, and blue. Further, the regions of the respective colors include three regions including a gradation region in which a concentration gradually increases from the left to the right in FIG. 36, a fine stripe pattern region, and a coarse stripe pattern region.

Further, a streak d is added to the region of black (low chroma), a streak e to the region of cyan, a streak f to the region of magenta, a streak g to the region of yellow, a streak h to the region of red, and a streak j to the region of green, and a streak k to the region of blue at the predetermined position and strength.

Then, the streak image output unit 370 outputs (prints) the chart image (step S82).

The user views the printed material of the chart image output in step S82, and inputs whether the streak added to each region is an image defect allowable in a printed material using the streak-added image determination input unit 350. The streak setting unit 352 acquires a result of the determination (step S83; an example of a determination result acquisition step). The configuration may be adopted so that a boundary between allowable concentration and non-allowable concentration is designated since a determination as to whether the image defect is allowable may vary according to concentration in the gradation region.

On the other hand, the image feature amount calculation unit 348 divides the chart image into ROIs that are minimum analysis units, and acquires the image feature amount of each ROI (step S84; an example of an image feature amount acquisition step). The image feature amount calculation unit 348 acquires hue, chroma, and brightness for color and a direction, contrast, and a frequency for a frequency component as the image feature amount of each ROI. These are classified as in the classification illustrated in FIG. 4. The image feature amount calculation unit 348 may read the image feature amount of each ROI of the chart image stored in a memory (not illustrated) in advance, from the memory.

The image feature amount calculation unit 348 acquires the image feature amount of each of the regions to which the streak d to the streak k are added, on the basis of the image feature amount of each ROI.

Finally, the streak setting unit 352 sets the streak determination condition on the basis of the determination result acquired in step S83 and the image feature amount of the original print image acquired in step S84 (step S85; an example of detection condition setting step).

Thus, since the chart image to which the streak is added at the predetermined position and strength is printed by the print head, a result of a determination as to whether the streak of the printed material that has been printed is an image defect allowable in the printed material is acquired, and the streak detection conditions are set from the image feature amount of the position of the streak and the determination result, it is possible to appropriately set the streak determination conditions that is used for a streak determination process of a printed material. Thus, it is possible to appropriately perform the streak determination process of the printed material on which the original print image is printed. Further, the same process may be performed on a plurality of chart images with different strengths of the streak.

Tenth Embodiment

Even when some of the functions of the streak detection device 300 or the streak detection device 302 are disposed in the server, it is possible to set optimal streak determination conditions according to the original print image and perform the streak determination process. Here, a streak detection system in which some of the functions of the streak detection device 300 are disposed in the server will be described by way of example.

Figure 37:
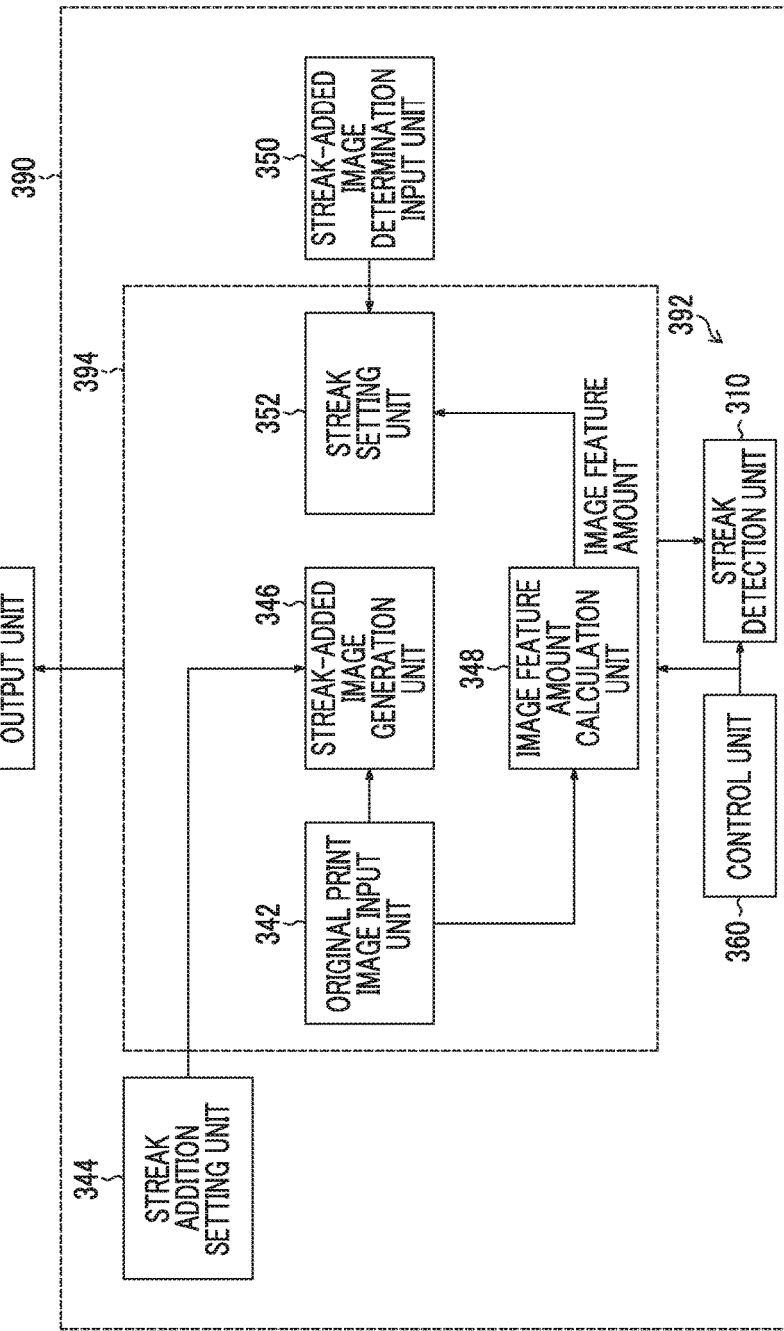
FIG. 37 is a block diagram illustrating a schematic configuration of the streak detection system.

The streak detection system 390 illustrated in FIG. 37 includes a streak detection device 392 and a detection condition setting server 394. The same portions as in the streak detection device 300 illustrated in FIG. 26 and the detection condition setting unit 340 illustrated in FIG. 28 are denoted with the same reference numerals, and detailed description thereof will be omitted.

The streak detection device 392 includes a streak addition setting unit 344 and a streak-added image determination input unit 350, in addition to the streak detection unit 310 and the control unit 360. Further, the detection condition setting server 394 includes an original print image input unit 342, a streak-added image generation unit 346, an image feature amount calculation unit 348, and a streak setting unit 352.

The streak detection device 392 and the server 92 are connected so that the streak detection device 392 and the server 92 can communicate over a network such as a LAN or a WAN, and can perform the same process as the streak detection device 300 by performing transmission and reception of information using a predetermined protocol. Therefore, it is possible to set optimal streak detection conditions according to original print image and perform the streak determination process.

Although one streak detection device 392 has been described for one detection condition setting server 394 in FIG. 37, a plurality of streak detection devices 392 may be configured to access one detection condition setting server 394, and the plurality of streak detection devices 392 may share the detection condition setting server 394. Accordingly, it is possible to set optimal streak determination conditions according to the original print image and perform the streak determination process while downsizing the streak detection device 392.

In the streak detection system, an aspect in which some functions are caused to be performed by the server is not limited to the example illustrated in FIG. 37, and functions to be performed by the server may be appropriately determined.

Eleventh Embodiment

The streak detection device 300 or 302 or the streak detection system 390 can constitute a printer in combination with various printing means. For example, the streak detection device 300 can be applied to the ink jet recording device 200 illustrated in FIGS. 14 and 15.

[Configuration of Ink Jet Head]

Here, configurations of the ink jet heads 230C, 230M, 230Y, and 230K will be described below. Since the configurations of the ink jet heads 230C, 230M, 230Y, and 230K are the same, a configuration of an ink jet head 230 will be described.

Figure 38:
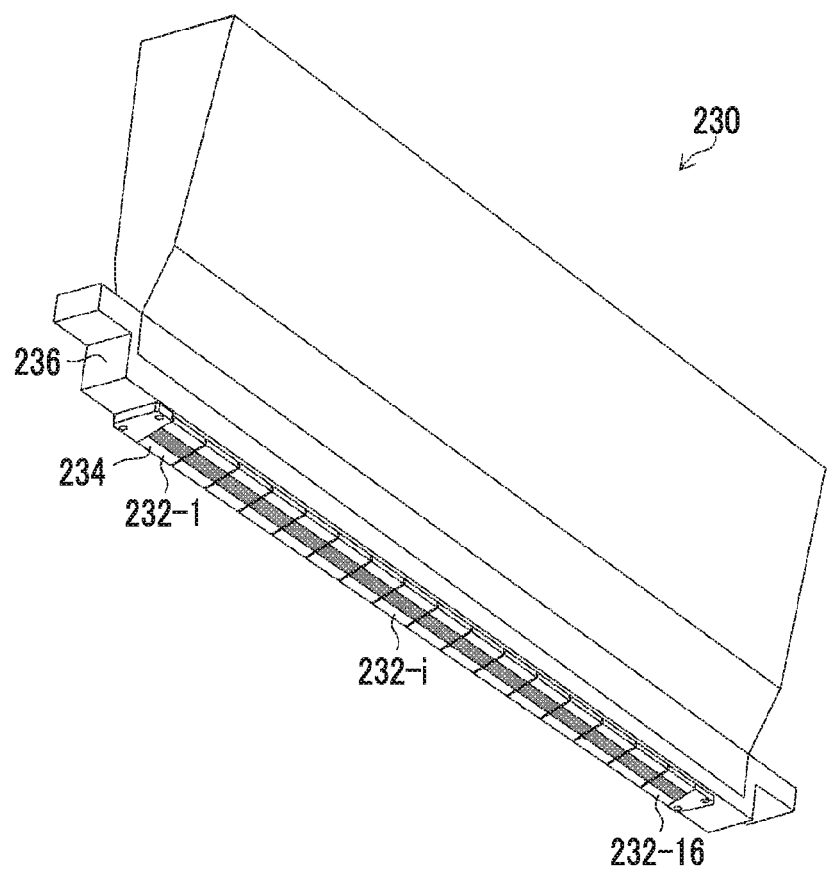
FIG. 38 is a perspective view illustrating a schematic configuration of an ink jet head.

As illustrated in FIG. 38, the ink jet head 230 (an example of a print head) includes a plurality of (in this embodiment, 16) head modules 232-$i$ ($i$=1, 2, . . . , 16) that are connected (linked) in a row.

The respective head modules 232-$i$ have the same structure, and are attached to a straight bar frame 236 and connected in a row. The bar frame 236 includes a mounting portion (not illustrated) for attaching each head module 232-$i$, and the head module 232-$i$ is detachably mounted in the mounting portion. The respective head modules 232-$i$ are attached to the bar frame 236, such that nozzle surfaces provided in a leading end are connected in a row to constitute one nozzle surface 234.

Figure 39:
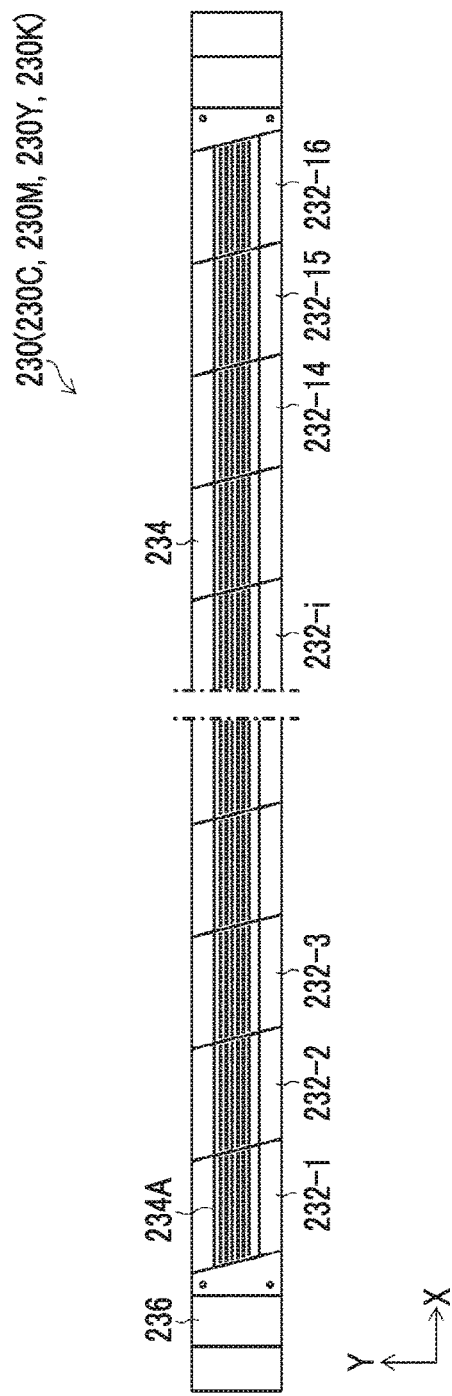
FIG. 39 is a plan view illustrating a schematic configuration of the ink jet head.
Figure 40:
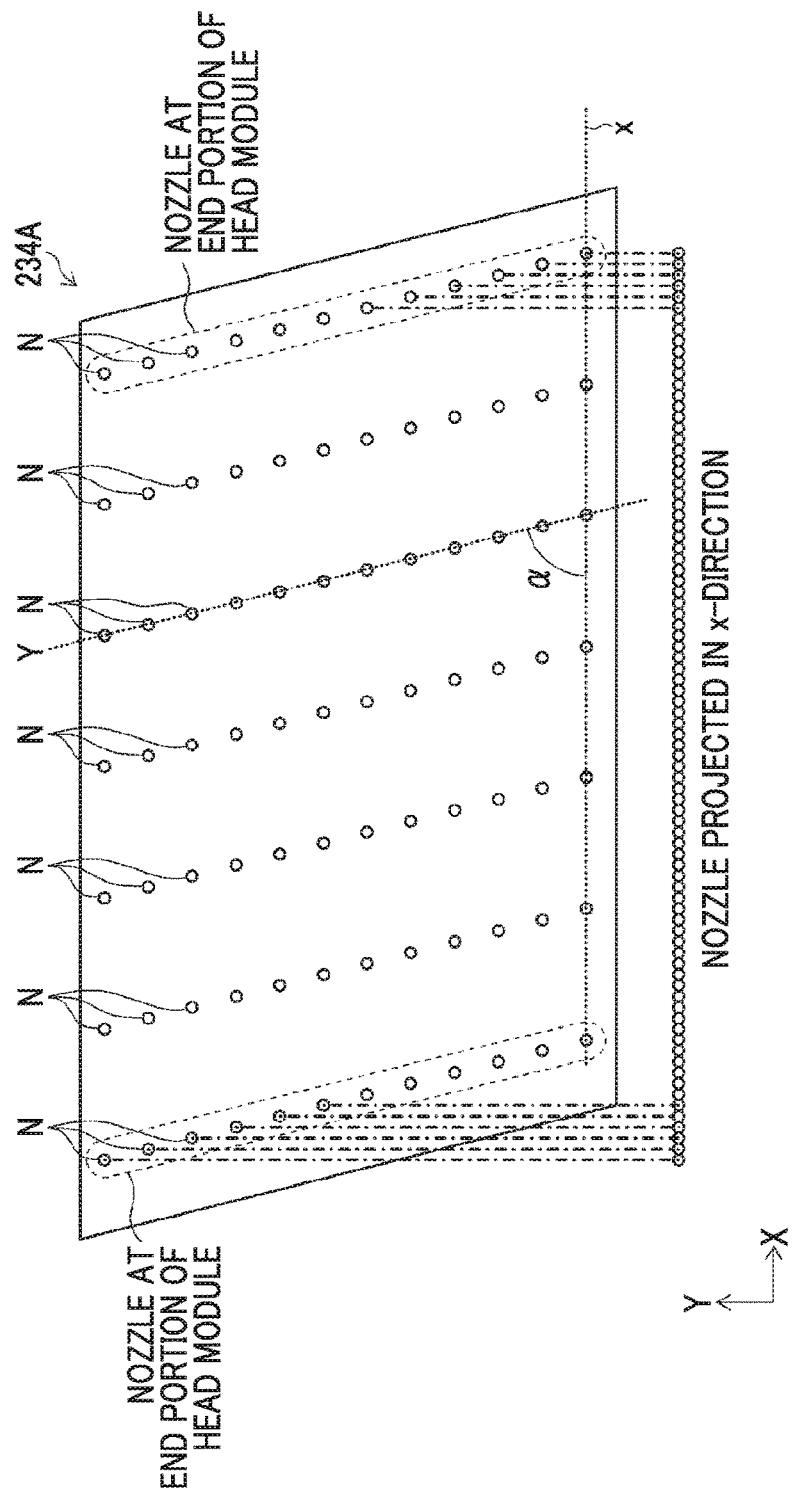
FIG. 40 is a plan view illustrating an arrangement of nozzles of the ink jet head.

In FIGS. 39 and 40, an arrow Y direction is a transporting direction of the paper P, and an arrow X direction is a width direction of the paper P (an axial direction of the recording drum 220). As illustrated in FIG. 39, the nozzle surface 234 of the ink jet head 230 has a rectangular shape as a whole, and a nozzle arrangement region 234A in a strip shape is included in a central portion. A nozzle N is included in the nozzle arrangement region 234A thereof.

Further, the nozzles N are arranged in a matrix form, as illustrated in FIG. 40. More specifically, the nozzles N are arranged with a constant pitch along a straight line x in parallel in the X direction, and the nozzles N are arranged with a constant pitch along a straight line y inclined at a predetermined angle ($\alpha$) with respect to the straight line x. By arranging the nozzles N as above, a substantial interval between the nozzles N projected in a longitudinal direction (X-direction) of the ink jet head 230 can be narrowed and the nozzle N can be arranged at a high density. A substantial arrangement direction of the nozzles N in this case is the X-direction. That is, the nozzles N is substantially arranged in the longitudinal direction of the ink jet head 230.

An ink supply port (not illustrated) is individually provided in each head module 232-$i$ and ink is individually supplied.

In the ink jet recording device 200 configured as above, the recording drum 220, the transport control unit 212, the ink jet head unit 228, and the recording control unit 238 also function as the streak image output unit 370 (an example of printing means) of the streak detection device 300 or 302 or the streak detection system 390.

According to the ink jet recording device 200 configured as described above, the streak-added image obtained by intentionally adding the streak to the original print image can be printed on the printing medium by the ink jet head unit 228 and output as a printed material, the result of the determination as to whether the streak of the printed material is an image defect allowable in the printed material can be acquired, and the streak detection condition can be set from the determination result and the image feature amount of the position of the streak.

Further, the streak can be detected from the printed material of the original print image printed by the ink jet head unit 228 on the basis of the detection conditions of the streak, and the good and bad determination of the printed material can be performed on the basis of a result of the detection.

Therefore, it is possible to set optimal detection conditions of the image defect according to the original print image, and to appropriately perform a good and bad determination.

According to the ink jet recording device 200, the chart image to which the image defect is added at the predetermined position and strength can be printed on the printing medium by the ink jet head unit 228 and output as a printed material, the result of the determination as to whether the streak of the printed material is an image defect allowable in the printed material can be acquired, and the streak detection condition can be set from the determination result and the image feature amount of the position of the streak.

Further, the streak can be detected from the printed material of the original print image printed by the ink jet head unit 228 on the basis of the detection conditions of the streak, and the good and bad determination of the printed material can be performed on the basis of a result of the detection.

Therefore, it is possible to set optimal detection conditions of the image defect according to the original print image, and to appropriately perform a good and bad determination.

Twelfth Embodiment

A position of a streak to be added in the streak-added image may also be determined according to features of the ink jet recording device 200 or the ink jet head 230.

The ink jet recording device 200 jets ink from the ink jet heads 230C, 230M, 230Y, and 230K that are line heads to the paper P transported by the recording drum 220 to record an image. Thus, the streak occurring in the ink jet recording device 200 occurs in a direction along the transporting direction of the paper P in the recording drum 220.

In the ink jet recording device 200, a jetting abnormality such as non-jetting or bending may occur due to causes such as an increase in ink viscosity inside the nozzle N. By the nozzle N with such a jetting abnormality, a streak occurs in a direction along a transporting direction of the paper P.

The nozzle N with a jetting abnormality can perform normal jetting by performing a recovery process such as forcible jetting of the ink. However, even when the nozzle N having a jetting abnormality returns from the jetting abnormality, the nozzle N is highly likely to cause the jetting abnormality again in comparison with other nozzles N that maintain a normal state.

Therefore, the system control unit 202 (an example of the recording element information acquisition means) acquires information on the nozzles N in which the jetting abnormality has occurred in the past, stores the information in a memory (not illustrated), and generates a streak-added image obtained by adding a streak at the position of the nozzle N having a history of generation of jetting abnormality in the past to the original print image, on the basis of the information in the memory. By setting the streak determination conditions using this streak-added image, it is possible to set the streak determination conditions according to the ink jet heads 230C, 230M, 230Y, and 230K to be used.

Further, as illustrated in FIGS. 38 and 39, each of the ink jet heads 230C, 230M, 230Y, and 230K includes a plurality of connected head modules 232-*i* (i=1, 2, ..., 16). Here, the connection region of the head module 232-*i* (an end portion of the head module 232-*i*) often has inferior jetting characteristics to a central portion of the head module 232-I in terms of structure. Accordingly, it is easy for jetting abnormality to occur near the connection region of head module 232-*i* of the ink jet heads 230C, 230M, 230Y, and 230K. As a result, a streak is highly likely to occur on the printed material.

Therefore, the system control unit 202 (an example of module information acquisition means) acquires information on a plurality of head modules 232-*i* constituting the ink jet heads 230C, 230M, 230Y, and 230K, and generates the streak-added image to which the streak is added at the position of the nozzle in the connection region of the head modules 232-*i* (connection position; a position of the nozzle in an end portion of the head module 232-*i*). By setting the streak determination conditions using this streak-added image, it is possible to set the streak determination conditions according to the ink jet heads 230C, 230M, 230Y, and 230K to be used.

In the streak detection method and the method of setting streak determination conditions described above, it is possible to constitute a program that causes a computer to execute the respective steps, and constitute a non-transitory recording medium (for example, a compact disk-read only memory (CD-ROM)) having the program stored therein.

The scope of the present invention is not limited to the scope described in the embodiments. Configurations or the like in the respective embodiments may be appropriately combined among the embodiments without departing from the scope of the present invention.

EXPLANATION OF REFERENCES 10, 40, 50: streak detection device
12: original print image acquisition unit
14: RIP processing unit
16: image reading unit
18: comparative color space conversion unit
20: image alignment unit
22: variation correction unit
24: image comparison unit
26: image feature amount calculation unit
28: processing time and expected value evaluation unit
30: determination region priority assignment unit
32: determination region setting unit
34: streak determination unit
36: streak determination integration unit
38: pass and fail determination unit
60, 62: streak detection server
64: first streak detection server
66: second streak detection server
70, 80, 90: streak detection system
100, 192: streak detection device
110: streak detection unit
140: streak determination database
150: database setting unit
158: streak indication unit
160, 178: streak setting unit
170: streak search unit
176: similar image search unit
180: control unit
190, 196: streak detection system
194, 198: server
200: ink jet recording device
220: recording drum
230: ink jet head unit
240: in-line sensor
250: chain gripper
270: stamper
290: streak detection unit
292: input unit
300, 302: streak detection device
310: streak detection unit
340, 380: detection condition setting unit
342: original print image input unit
344: streak addition setting unit
346: streak-added image generation unit
348: image feature amount calculation unit
350: streak-added image determination input unit
352: streak setting unit
360: control unit
370: streak image output unit
382: chart image input unit
390: streak detection system
394: detection condition setting server

What is claimed is:

1. An image defect detection device, comprising:
image acquisition means for acquiring an original print image and a print image printed on the basis of the original print image;
region division means for dividing the original print image and the print image into corresponding regions;
image feature amount acquisition means for acquiring an image feature amount of each divided region;
differential strength extraction means for extracting a strength of a difference of each divided region between the original print image and the print image;
expected image defect value calculation means for calculating a first expected image defect value from the image feature amount of each divided region of the original print image, calculating a second expected image defect value from the strength of the difference of each divided region between the original print image and the print image, and calculating a total expected image defect value indicating a possibility of presence of a defect in each divided region of the print image from the first expected image defect value and the second expected image defect value;
image defect detection order determination means for determining an order of detection of the image defect of the divided region of the print image from the total expected image defect value; and
image defect detection means for detecting an image defect of the print image in the determined order.

2. An image defect detection device, comprising:
image acquisition means for acquiring an original print image and a print image printed on the basis of the original print image;
region division means for dividing the original print image and the print image into corresponding regions;
image feature amount acquisition means for acquiring an image feature amount of each divided region;
differential strength extraction means for extracting a strength of a difference of each divided region between the original print image and the print image;

expected image defect value calculation means for calculating a expected image defect value indicating a possibility of presence of a defect in each divided region of the print image from the image feature amount and the strength of the difference of each divided region;

image defect detection order determination means for determining an order of detection of the image defect of the divided region of the print image from the expected image defect value;

image defect detection means for detecting an image defect of the print image in the determined order; and image defect detection time calculation means for calculating an image defect detection time indicating a time required to detect a defect of each divided region of the print image from the image feature amount and the strength of the difference of each divided region, wherein the image defect detection order determination means determines an order of detection of an image defect of the divided region of the print image from the image defect detection time and the expected image defect value.

3. The image defect detection device according to claim 2, wherein the image defect detection order determination means determines the order as a descending order of image defect detection efficiency that is a quotient obtained by dividing the expected image defect value by the image defect detection time.

4. The image defect detection device according to claim 2, wherein the image defect detection time calculation means calculates the image defect detection time from an image feature amount of the image defect of each divided region.

5. The image defect detection device according to claim 1, wherein the image defect detection order determination means determines the order as a descending order of the total expected image defect value.

6. The image defect detection device according to claim 1, wherein the expected image defect value calculation means calculates the total expected image defect value from the image feature amount of the image defect of each divided region.

7. The image defect detection device according to claim 1, wherein the region division means performs division into a region for each the image feature amount.

8. The image defect detection device according to claim 7, wherein the region division means performs the division using at least one of chroma or brightness of color as the image feature amount.

9. The image defect detection device according to claim 7, wherein the region division means performs the division using at least one of a direction, contrast, or a frequency of a frequency component as the image feature amount.

10. The image defect detection device according to claim 1, wherein the image acquisition means acquires a reading result in reading means of the image printed on the basis of the original print image as a print image.

11. The image defect detection device according to claim 10, wherein the image acquisition means acquires a dividing and reading result in a plurality of reading means of the image printed on the basis of the original print image as a divided print image, the image defect detection order determination unit determines an order of detection of an image defect of the divided region of the print image for each divided print image, and the image defect detection means detects an image defect in the determined order for each divided print image.

12. The image defect detection device according to claim 11, wherein a plurality of image defect detection means are included for each of the divided print image and detect an image defect of the corresponding divided print image, and the image defect detection means that has ended the detection of the image defect of the corresponding divided print image among the plurality of image defect detection means performs detection of the image defect of the divided print image of which the detection of the defect does not end.

13. An image recording device, comprising:

original print image acquisition means for acquiring an original print image;

transport means for transporting a plurality of print media at first time intervals;

printing means for printing an image on the printing medium transported by the transport means on the basis of the original print image;

reading means for reading the printed image to acquire a print image;

region division means for dividing the original print image and the print image into corresponding regions;

image feature amount acquisition means for acquiring an image feature amount of each divided region;

differential strength extraction means for extracting strength of a difference in each divided region between the original print image and the print image;

expected image defect value calculation means for calculating a first expected image defect value from the image feature amount of each divided region of the original print image, calculating a second expected image defect value from the strength of the difference of each divided region between the original print image and the print image, and calculating a total expected image defect value indicating a possibility of presence of a defect in each divided region of the print image from the first expected image defect value and the second expected image defect value;

image defect detection order determination means for determining an order of detection of the image defect of the divided region of the print image from the total expected image defect value;

image defect detection means for detecting an image defect of the print image in the determined order, the image defect being detected in a time shorter than the first time interval for one recording medium;

determination means for performing a good and bad determination of the print image on the basis of the detected image defect; and output means for outputting a result of the determination of the determination means.

14. An image defect detection method, comprising:
- an image acquisition step of acquiring an original print image and a print image printed on the basis of the original print image;
- a region division step of dividing the original print image and the print image into corresponding regions;
- an image feature amount acquisition step of acquiring an image feature amount of each divided region;
- a differential strength extraction step of extracting a strength of a difference of each divided region between the original print image and the print image;
- an expected image defect value calculation step of calculating a first expected image defect value from the image feature amount of each divided region of the original print image, calculating a second expected image defect value from the strength of the difference of each divided region between the original print image and the print image, and calculating a total expected image defect value indicating a possibility of presence of a defect in each divided region of the print image from the first expected image defect value and the second expected image defect value;
- an image defect detection order determination step of determining an order of detection of the image defect of the divided region of the print image from the total expected image defect value; and
- an image defect detection step of detecting an image defect of the print image in the determined order.

15. A non-transitory computer-readable tangible medium having a program that causes a computer to execute an image defect detection method, comprising:
- an image acquisition step of acquiring an original print image and a print image printed on the basis of the original print image;
- a region division step of dividing the original print image and the print image into corresponding regions;
- an image feature amount acquisition step of acquiring an image feature amount of each divided region;
- a differential strength extraction step of extracting a strength of a difference of each divided region between the original print image and the print image;
- an expected image defect value calculation step of calculating a first expected image defect value from the image feature amount of each divided region of the original print image, calculating a second expected image defect value from the strength of the difference of each divided region between the original print image and the print image, and calculating a total expected image defect value indicating a possibility of presence of a defect in each divided region of the print image from the first expected image defect value and the second expected image defect value;
- an image defect detection order determination step of determining an order of detection of the image defect of the divided region of the print image from the total expected image defect value; and
- an image defect detection step of detecting an image defect of the print image in the determined order.

16. The image defect detection device according to claim 1,
- wherein the expected image defect value calculation means calculates the total expected image defect value that is a product obtained by multiplying the first expected image defect value and the second expected image defect value together.

17. The image recording device according to claim 13,
- wherein the expected image defect value calculation means calculates the total expected image defect value that is a product obtained by multiplying the first expected image defect value and the second expected image defect value together.

18. The image defect detection method according to claim 14,
- wherein in the expected image defect value calculation step, the total expected image defect value is calculated as a product obtained by multiplying the first expected image defect value and the second expected image defect value together.

19. The non-transitory computer-readable tangible medium according to claim 15,
- wherein in the expected image defect value calculation step, the total expected image defect value is calculated as a product obtained by multiplying the first expected image defect value and the second expected image defect value together.

* * * * *